US012759290B2

(12) United States Patent
Yamada

(10) Patent No.: US 12,759,290 B2
(45) Date of Patent: Oct. 13, 2026

(54) HEAD UNIT AND LIQUID EJECTION APPARATUS

(71) Applicant: SEIKO EPSON CORPORATION, Tokyo (JP)

(72) Inventor: Toshimichi Yamada, Chino (JP)

(73) Assignee: SEIKO EPSON CORPORATION (JP)

( * ) Notice: Subject to any disclaimer, the term of this patent is extended or adjusted under 35 U.S.C. 154(b) by 175 days.

(21) Appl. No.: 18/925,249

(22) Filed: Oct. 24, 2024

(65) Prior Publication Data

US 2025/0135770 A1 May 1, 2025

(30) Foreign Application Priority Data

Oct. 25, 2023 (JP) ................................ 2023-183061

(51) Int. Cl.
*B41J 2/045* (2006.01)
*B41J 2/14* (2006.01)

(52) U.S. Cl.
CPC ....... *B41J 2/04581* (2013.01); *B41J 2/04541* (2013.01); *B41J 2/04588* (2013.01); *B41J 2/14* (2013.01); *B41J 2002/14491* (2013.01)

(58) Field of Classification Search
CPC ........ B41J 2/04581; B41J 2002/14491; G06K 15/105
See application file for complete search history.

(56) References Cited

U.S. PATENT DOCUMENTS

| | | | | |
|---|---|---|---|---|
| 2002/0109752 | A1* | 8/2002 | Sato | B41J 2/2132 347/41 |
| 2004/0090489 | A1* | 5/2004 | Hayashi | B41J 2/2132 347/41 |
| 2006/0119632 | A1* | 6/2006 | Ochiai | B41J 2/04543 347/15 |
| 2019/0283421 | A1* | 9/2019 | Miyazawa | B41J 2/14233 |
| 2019/0291419 | A1* | 9/2019 | Yamada | B41J 2/04596 |
| 2020/0307198 | A1* | 10/2020 | Mizuta | B41J 2/14072 |
| 2022/0097362 | A1* | 3/2022 | Fujisawa | B41J 2/04541 |
| 2023/0127392 | A1 | 4/2023 | Kashimura | |
| 2023/0311485 | A1* | 10/2023 | Arakane | B41J 2/04536 |

FOREIGN PATENT DOCUMENTS

JP 2023-063708 A 5/2023

* cited by examiner

*Primary Examiner* — John P Zimmermann
(74) *Attorney, Agent, or Firm* — Harness, Dickey & Pierce, P.L.C.

(57) ABSTRACT

A head unit includes an ejection unit which is configured to eject a liquid due to drive of a piezoelectric element, and a drive signal output circuit includes a first switch circuit configured to switch whether to supply a first DC voltage signal to the ejection unit, a second switch circuit configured to switch whether to supply a second DC voltage signal to the ejection unit, and a selection control circuit configured to control the first switch circuit and the second switch circuit, and the first switch circuit includes a first switch element one end of which is supplied with the first DC voltage signal, and another end of which is electrically coupled to the ejection unit, and a second switch element one end of which is supplied with the first DC voltage signal, and another end of which is electrically coupled to the ejection unit.

18 Claims, 13 Drawing Sheets

HEAD UNIT AND LIQUID EJECTION APPARATUS

The present application is based on, and claims priority from JP Application Serial Number 2023-183061, filed Oct. 25, 2023, the disclosure of which is hereby incorporated by reference herein in its entirety.

BACKGROUND

1. Technical Field

The present disclosure relates to a head unit and a liquid ejection apparatus.

2. Related Art

As a liquid ejection apparatus that ejects a liquid, those using a drive element such as a piezoelectric element are known. In such a liquid ejection apparatus, the piezoelectric element is driven in accordance with a potential difference between a drive signal supplied to one end and a reference potential supplied to the other end, and ejects an amount of liquid according to the drive of the piezoelectric element.

For example, JP-A-2023-063708 discloses a liquid ejection apparatus including a plurality of drive circuits each including a modulation circuit that modulates a base drive signal and a plurality of power amplifier circuits power-amplify a signal output by the modulation circuit as a drive circuit that outputs a drive signal.

JP-A-2023-063708 is an example of the related art.

However, the technology described in JP-A-2023-063708 is not sufficient as a configuration of a liquid ejection apparatus and a head unit including a drive circuit for driving a piezoelectric element, and there is room for improvement.

SUMMARY

One aspect of the head unit according to the present disclosure includes an ejection unit which includes a piezoelectric element driven by a drive signal, and which is configured to eject a liquid due to drive of the piezoelectric element, and a drive signal output circuit to which a first DC voltage signal having a first voltage value, a second DC voltage signal having a second voltage value, and an ejection control signal are input, and which is configured to output the drive signal, wherein the drive signal output circuit includes a first switch circuit configured to switch whether to supply the first DC voltage signal to the ejection unit, a second switch circuit configured to switch whether to supply the second DC voltage signal to the ejection unit, and a selection control circuit configured to control the first switch circuit and the second switch circuit based on the ejection control signal, and the first switch circuit includes a first switch element one end of which is supplied with the first DC voltage signal, and another end of which is electrically coupled to the ejection unit, and a second switch element one end of which is supplied with the first DC voltage signal, and another end of which is electrically coupled to the ejection unit.

One aspect of the liquid ejection apparatus according to the present disclosure includes an ejection unit which includes a piezoelectric element driven by a drive signal, and which is configured to eject a liquid due to drive of the piezoelectric element, a drive signal output circuit to which a first DC voltage signal having a first voltage value, a second DC voltage signal having a second voltage value, and an ejection control signal are input, and which is configured to output the drive signal, and a control circuit configured to output the ejection control signal, wherein the drive signal output circuit includes a first switch circuit configured to switch whether to supply the first DC voltage signal to the ejection unit, a second switch circuit configured to switch whether to supply the second DC voltage signal to the ejection unit, and a selection control circuit configured to control the first switch circuit and the second switch circuit based on the ejection control signal, and the first switch circuit includes a first switch element one end of which is supplied with the first DC voltage signal, and another end of which is electrically coupled to the ejection unit, and a second switch element one end of which is supplied with the first DC voltage signal, and another end of which is electrically coupled to the ejection unit.

DESCRIPTION OF EMBODIMENTS

A preferred embodiment of the present disclosure will hereinafter be described using the drawings. The drawings to be used are for the sake of convenience of explanation. Note that the embodiment to be described below do not unreasonably limit the content of the present disclosure set forth in the appended claims. Further, it is not necessarily true that all the configurations to be described below are essential elements of the present disclosure.

1. First Embodiment

1.1 Overview of Liquid Ejection Apparatus

Figure 1:
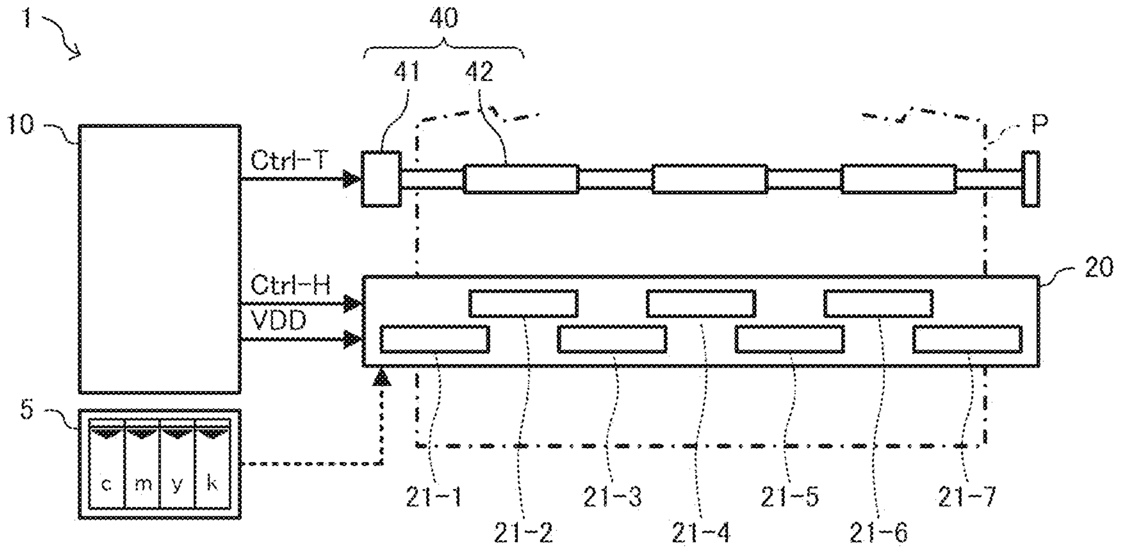
FIG. 1 is a diagram showing an example of a schematic structure of a liquid ejection apparatus.

FIG. 1 is a diagram showing an example of a schematic structure of a liquid ejection apparatus 1. The liquid ejection apparatus 1 according to the first embodiment is a so-called line printing-type inkjet printer which conveys a medium P along a conveyance direction, and ejects ink as an example of a liquid to the medium P thus conveyed with print heads 21-1 to 21-7 provided side by side along a main scanning direction crossing the conveyance direction to thereby form an image on the medium P. Such a liquid ejection apparatus 1 can use any printing target such as print paper, a resin film, or a fabric as the medium P. Note that the liquid ejection apparatus 1 is not limited to the line printing-type inkjet printer, but may be a serial printing-type inkjet printer.

As illustrated in FIG. 1, the liquid ejection apparatus 1 includes an ink container 5, a control unit 10, a head unit 20, and a conveyance unit 40.

The ink container 5 stores ink of a plurality of colors to be ejected onto the medium P. Examples of the color of the ink stored in the ink container 5 include black k, cyan c, magenta m, and yellow y. As such an ink container 5, an ink cartridge, an ink pack that is shaped like a bag, and is formed of a flexible film, an ink tank in which the ink can be replenished, or the like may be used.

The control unit 10 includes, for example, a processing circuit such as a central processing unit (CPU) or a field programmable gate array (FPGA), and a storage circuit such as a semiconductor memory device. The control unit 10 controls each element of the liquid ejection apparatus 1 including the head unit 20.

The head unit 20 includes the print heads 21-1 to 21-7. The print heads 21-1 to 21-7 are arranged in a staggered manner in the order of the print head 21-1, the print head 21-2, the print head 21-3, the print head 21-4, the print head 21-5, the print head 21-6, and the print head 21-7 along a scanning direction crossing the conveyance direction in which the medium P is conveyed.

A control signal Ctrl-H and a voltage signal VDD output by the control unit 10 are input to the head unit 20. The control signal Ctrl-H and the voltage signal VDD are input to each of the print heads 21-1 to 21-7. Further, the ink stored in the ink container 5 is supplied to each of the print heads 21-1 to 21-7 via a tube (not shown) or the like. Based on the input control signal Ctrl-H and the voltage signal VDD, each of the print heads 21-1 to 21-7 ejects the ink supplied from the ink container 5.

The conveyance unit 40 includes a conveyance motor 41 and conveyance rollers 42. The conveyance motor 41 is rotationally driven based on the control signal Ctrl-T input from the control unit 10. The conveyance rollers 42 rotate in accordance with the rotational drive of the conveyance motor 41. Due to the rotation of the conveyance rollers 42, the medium P is conveyed along the conveyance direction.

As described above, in the liquid ejection apparatus 1 according to the first embodiment, the control unit 10 controls the conveyance of the medium P and the ejection of the ink from the head unit 20. This makes the print heads 21-1 to 21-7 provided to the head unit 20 eject the ink at a timing interlocked with the conveyance of the medium P by the conveyance unit 40. As a result, the ink ejected from the head unit 20 lands at a desired position on the medium P, and a desired image is formed on the medium P.

1.2 Functional Configuration of Liquid Ejection Apparatus

Figure 2:
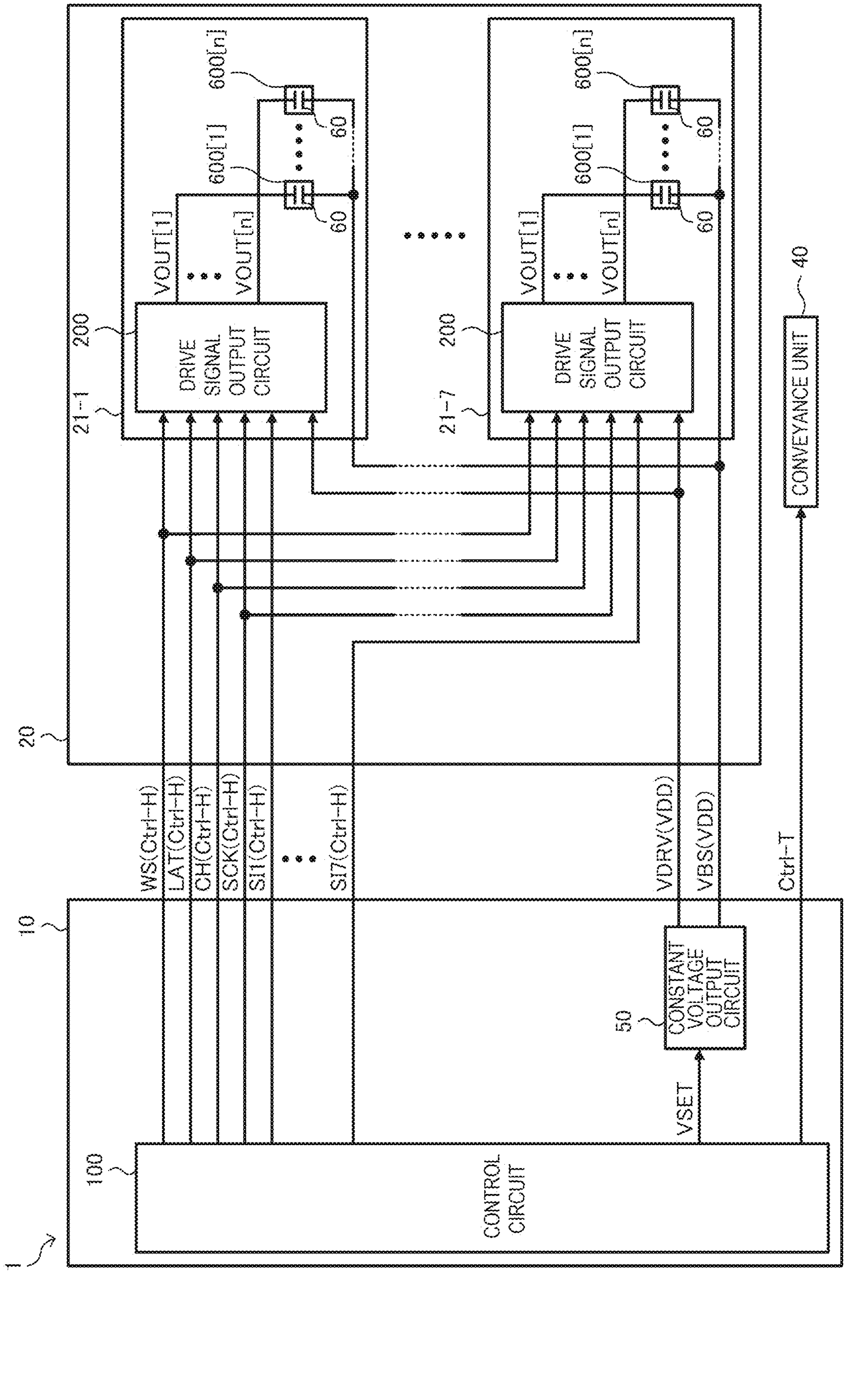
FIG. 2 is a diagram showings an example of a functional configuration of the liquid ejection apparatus.

Then, a functional configuration of the liquid ejection apparatus 1 will be described. FIG. 2 is a diagram showing an example of the functional configuration of the liquid ejection apparatus 1. As illustrated in FIG. 2, the liquid ejection apparatus 1 includes the control unit 10, the head unit 20, and the conveyance unit 40.

The control unit 10 includes a constant voltage output circuit 50 and a control circuit 100.

The control circuit 100 includes a processor such as a microcontroller, and is communicably coupled to an external device such as a host computer (not shown) provided outside the liquid ejection apparatus 1. An image information signal including image data to be formed on the medium P is input from the external device to the control circuit 100. The control circuit 100 performs predetermined image processing on the image information signal thus input to generate various data and signals corresponding to the data for controlling the liquid ejection apparatus 1, and outputs the data and the signals thus generated to corresponding elements.

The control circuit 100 generates a control signal Ctrl-T for controlling the conveyance of the medium P, and outputs the control signal Ctrl-T to the conveyance unit 40. This rotationally drives the conveyance motor 41 provided to the conveyance unit 40 to control the conveyance along the conveyance direction of the medium P. Here, the control signal Ctrl-T output by the control circuit 100 may be subjected to a signal conversion in a driver circuit (not shown) and then input to the conveyance motor 41.

Further, the control circuit 100 generates a latch signal LAT, a change signal CH, a clock signal SCK, print data signals SI1 to SI7, and a waveform selection signal WS as the control signal Ctrl-H for controlling the head unit 20 based on the image information signal input to the control circuit 100, and outputs the signals thus generated to the head unit 20.

Further, the control circuit 100 outputs a voltage value setting signal VSET to the constant voltage output circuit 50. The constant voltage output circuit 50 generates a drive voltage signal VDRV constant at a voltage value defined by the voltage value setting signal VSET as the voltage signal VDD, and outputs the drive voltage signal VDRV to the head unit 20. Such a constant voltage output circuit 50 may be configured including an AC/DC converter that converts an AC voltage supplied to the liquid ejection apparatus 1 into a DC voltage, or may be configured including a DC/DC converter that converts a voltage value of a DC voltage used in the liquid ejection apparatus 1. Here, the constant voltage output circuit 50 in the first embodiment may output a plurality of drive voltage signals VDRV different in voltage value from each other. That is, the constant voltage output circuit 50 may be configured including a plurality of at least one of the AC/DC converters and the DC/DC converters.

Further, the constant voltage output circuit 50 generates, as the voltage signal VDD, a reference voltage signal VBS serving as a reference potential for driving piezoelectric elements 60 described later and provided to the head unit 20, and outputs the reference voltage signal VBS to the head unit 20. The voltage value of the reference voltage signal VBS output by the constant voltage output circuit 50 may be a constant value defined by the voltage value setting signal VSET, or may be a constant value such as 5.5 V or 6 V defined regardless of the voltage value setting signal VSET.

Here, the description that the voltage values of the drive voltage signal VDRV and the reference voltage signal VBS as the voltage signal VDD output by the constant voltage output circuit 50 are constant includes when the voltage values can be considered constant when considering a ripple and noise superimposed on the voltage signal VDD, and a variation and temperature characteristics of electronic components constituting the constant t voltage output circuit 50.

The head unit 20 includes the print heads 21-1 to 21-7. The print head 21-*i* (i is any one of 1 to 7) includes a drive signal output circuit 200 and ejection units 600[1] to 600[*n*].

The drive signal output circuit 200 is configured including an integrated circuit device. The latch signal LAT, the change signal CH, the clock signal SCK, the print data signal SIi, the waveform selection signal WS, and the drive voltage signal VDRV are input to the drive signal output circuit 200 provided to the print head 21-*i*. The drive signal output circuit 200 generates drive signals VOUT[1] to VOUT[n] individually corresponding respectively to the ejection units 600[1] to 600[*n*] based on the latch signal LAT, the change signal CH, the clock signal SCK, the print data signal SIi, the waveform selection signal WS, and the drive voltage signal VDRV input to the drive signal output circuit 200, and outputs the drive signals VOUT[1] to VOUT[n] to the ejection units 600[1] to 600[*n*] corresponding thereto. Note that the details of the configuration and the operation of the drive signal output circuit 200 will be described later.

The drive signal VOUT[j] (j is any one of 1 to n) output by the drive signal output circuit 200 is input to one end of the piezoelectric element 60 provided to the ejection unit 600[*j*]. The reference voltage signal VBS output by the constant voltage output circuit 50 is input to the other end of the piezoelectric element 60 provided to the ejection unit 600[*j*]. The piezoelectric element 60 provided to the ejection unit 600[*j*] is driven in accordance with a potential difference between the drive signal VOUT[j] input to the one end and the reference voltage signal VBS input to the other end. Then, a corresponding amount of ink to the drive of the piezoelectric element 60 provided to the ejection unit 600[*j*] is ejected from the ejection unit 600[*j*]. By the ink ejected from the ejection unit 600[*j*] landing on the medium P, a dot is formed at a desired position on the medium P.

That is, the head unit 20 in the present embodiment includes the ejection unit 600[1] that includes the piezoelectric element 60 driven by the drive signal VOUT[1] and ejects the ink by driving the piezoelectric element 60, the ejection unit 600[2] that includes the piezoelectric element 60 driven by the drive signal VOUT[2] and ejects the ink by driving the piezoelectric element 60, and the ejection unit 600[*j*] that includes the piezoelectric element 60 driven by the drive signal VOUT[j] and ejects the ink by driving the piezoelectric element 60.

Here, the print heads 21-1 to 21-7 are substantially the same in configuration, and are referred to as print heads 21 in some cases when there is no need to distinguish them from each other. On this occasion, the description will be presented assuming that the print data signals SI as the print data signals SI1 to SI7 are input to the print head 21. Further, the ejection units 600[1] to 600[*n*] provided to the print head 21 are the same in configuration as each other, and may be simply referred to as the ejection units 600 in some cases when there is no need to distinguish them from each other. The description will be presented assuming that on this occasion, the drive signals VOUT as the drive signals VOUT[1] to VOUT[n] are supplied to the ejection units 600.

1.3 Structure of Print Head

Then, an example of a structure of the print head 21 provided to the head unit 20 will be described. Here, in the following description, the X axis, the Y axis, and the Z axis orthogonal to each other will be used. Further, when defining a direction along the X axis, the starting side of an arrow along the X axis shown in the drawing is referred to as −X side, the tip side is referred to as +X side, and when defining a direction along the Y axis, the starting side of the arrow along the Y axis shown in the drawing is referred to as −Y side, the tip side is referred to as +Y side, and when defining a direction along the Z axis, the starting side of the arrow along the Z axis shown in the drawing is referred to as −Z side, and the tip side is referred to as +Z side in some cases.

Figure 3:
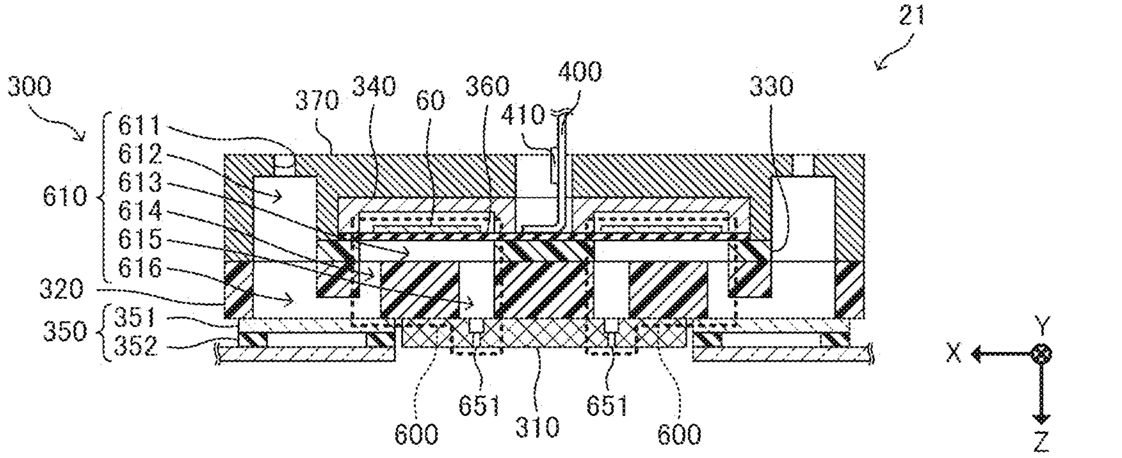
FIG. 3 is a diagram showing an example of a structure of a print head.

FIG. 3 is a diagram illustrating an example of the structure of the print head 21. Here, FIG. 3 illustrates a cross section of the print head 21 when the print head 21 including the plurality of ejection units 600 arranged in two rows along the Y axis is cut along the X axis so as to include at least one ejection unit 600.

As illustrated in FIG. 3, the print head 21 includes a head chip 300 including the plurality of ejection units 600, and a flexible wiring board 400 electrically coupled to the head chip 300. Further, the head chip 300 includes a nozzle plate 310, a flow path forming substrate 320, a pressure chamber substrate 330, a protective substrate 340, a compliance unit 350, a vibration plate 360, a case 370, and the piezoelectric elements 60.

Nozzles 651 from which the ink is ejected are provided to the nozzle plate 310 so as to be arranged in parallel in two rows along the Y axis. The flow path forming substrate 320 defines individual flow paths 614, communication flow paths 615, and reservoirs 616. The pressure chamber substrate 330 defines pressure chambers 613. The case 370 defines reservoirs 612 and liquid introduction openings 611.

The ink stored in the ink container 5 is supplied to the head chip 300 via the liquid introduction openings 611. The ink supplied to the head chip 300 reaches the nozzle 651 via the ink flow path 610 configured including the reservoirs 612, 616, the individual flow path 614, the pressure chamber 613, and the communication flow path 615. The ink that reaches the nozzle 651 is ejected due to the drive of the piezoelectric element 60.

Specifically, the ink flow path 610 is defined by the flow path forming substrate 320, the pressure chamber substrate 330, and the case 370 stacked on one another along the Z axis. The ink introduced from the liquid introduction opening 611 is stored in the reservoir 612 defined by the case 370 and the reservoir 616 defined by the flow path forming substrate 320. The reservoirs 612, 616 are commonly provided to the plurality of nozzles 651 provided to the nozzle plate 310. The ink stored in the reservoirs 612, 616 is supplied to the pressure chambers 613 individually provided corresponding to the respective nozzles 651 via the individual flow paths 614 individually provided corresponding to the respective nozzles 651. Then, by the pressure being applied to the ink supplied to the pressure chamber 613, the ink stored in the pressure chamber 613 is discharged from the nozzle 651 via the communication flow path 615.

That is, the ink flow path 610 has the liquid introduction opening 611 and the reservoirs 612, 616 which are commonly provided to the plurality of nozzles 651, and the individual flow path 614, the pressure chamber 613, and the communication flow path 615 which are branched from the reservoir 616 and are individually provided corresponding to the plurality of nozzles 651.

The vibration plate 360 is located at the −Z side of the pressure chamber substrate 330 and is provided to seal the pressure chamber 613. Further, the piezoelectric element 60 is provided at the −Z side of the vibration plate 360. The piezoelectric element 60 includes a piezoelectric body and a pair of electrodes formed on both surfaces of the piezoelectric body. The drive signal VOUT output by the drive signal output circuit 200 is supplied to one of the pair of electrodes provided to the piezoelectric element 60, and the reference voltage signal VBS output by the constant voltage output circuit 50 is supplied to the other of the pair of electrodes provided to the piezoelectric element 60. Then, the piezoelectric body provided to the piezoelectric element 60 is displaced in accordance with the potential difference generated between the pair of electrodes provided to the piezoelectric element 60. That is, the piezoelectric element 60 is driven in accordance with a potential difference between the drive signal VOUT and the reference voltage signal VBS. Due to the drive of the piezoelectric element 60, the vibration plate 360 provided with the piezoelectric element 60 is deformed. Then, the internal pressure of the pressure chamber 613 changes due to the deformation of the vibration plate 360. This applies pressure to the ink supplied to the pressure chamber 613. As a result, the ink stored in the pressure chamber 613 is discharged from the nozzle 651 via the communication flow path 615.

The nozzle plate 310 is positioned at the +Z side of the flow path forming substrate 320, and the plurality of nozzles 651 provided to the nozzle plate 310 is fixed to the flow path forming substrate 320 so as to communicate with the communication flow paths 615 which are provided to the flow path forming substrate 320 and correspond to the nozzles 651. Further, the compliance unit 350 is also fixed to the +Z side of the flow path forming substrate 320. The compliance unit 350 is located at the +Z side of the reservoir 616 and the individual flow path 614, and includes a sealing film 351 and a support 352. The sealing film 351 is a flexible film-like member and seals the +Z side of the reservoir 616 and the individual flow path 614. The support 352 supports an outer peripheral edge of the sealing film 351 in a frame shape. The compliance unit 350 configured as described above protects the head chip 300 and reduces fluctuations in the pressure applied to the ink in the reservoir 616 or in the communication flow path 615.

Here, a configuration including the piezoelectric element 60, the vibration plate 360, the pressure chamber 613, the individual flow path 614, the communication flow path 615, and the nozzle 651 corresponds to the ejection unit 600.

One end of the flexible wiring board 400 is electrically coupled to the vibration plate 360, and the other end thereof is electrically coupled to a head board (not shown). That is, the other end of the flexible wiring board 400 provided to each of the print heads 21-1 to 21-7 is electrically coupled to the head board. A semiconductor device 410 is Chip On Film (COF)-mounted on the flexible wiring board 400. The semiconductor device 410 includes the drive signal output circuit 200 described above.

The print head 21 includes the flexible wiring board 400 electrically coupled to the ejection units 600[1] to 600[*n*], and the drive signal output circuit 200 is provided on the flexible wiring board 400. This can shorten propagation paths of the drive signals VOUT[1] to VOUT[n] which are output by the drive signal output circuit 200 to the ejection units 600[1] to 600[*n*], and a possibility that a waveform distortion occurs in the drive signals VOUT[1] to VOUT[n] due to an influence of an impedance of the propagation paths is reduced. Therefore, the driving accuracy of the piezoelectric element 60 provided to each of the ejection units 600[1] to 600[*n*] is improved, and the ejection accuracy of the ink from the ejection units 600[1] to 600[*n*] is improved.

Further, by shortening the propagation paths of the drive signals VOUT[1] to VOUT[n], the lengths of the propagation paths of the drive signals VOUT[1] to VOUT[n] can be made substantially equal to each other. That is, the propagation distance at which the drive signal VOUT[1] is propagated from the drive signal output circuit 200 to the ejection unit 600[1], the propagation distance at which the drive signal VOUT[2] is propagated from the drive signal output circuit 200 to the ejection unit 600[2], and the propagation distance at which the drive signal VOUT[j] is propagated from the drive signal output circuit 200 to the ejection unit 600[*j*] become substantially equal to each other. This reduces the possibility that a variation occurs in the impedance making a contribution to each of the drive signals VOUT[1] to VOUT[n]. As a result, the possibility that a variation occurs in the drive of the piezoelectric element 60 provided to each of the ejection units 600[1] to 600[*n*] is reduced, and the possibility that a variation occurs in the ejection of the ink from the ejection units 600[1] to 600[*n*] is reduced.

The latch signal LAT, the change signal CH, the clock signal SCK, the print data signals SI1 to SI7, the waveform selection signal WS, the drive voltage signal VDRV, and the reference voltage signal VBS input to the head unit 20 propagate through the head board and are then input to the flexible wiring board 400 provided to the print head 21 corresponding to the flexible wiring board 400. Then, the latch signal LAT, the change signal CH, the clock signal SCK, the print data signals SI, the waveform selection signal WS, and the drive voltage signal VDRV propagate through the flexible wiring board 400 and are then input to the semiconductor device 410 including the drive signal output circuit 200.

The semiconductor device 410 including the drive signal output circuit 200 generates and then outputs the drive signals VOUT[1] to VOUT[n] corresponding to the ejection units 600[1] to 600[*n*] based on the latch signal LAT, the change signal CH, the clock signal SCK, the print data signals SI, the waveform selection signal WS, and the drive voltage signal VDRV input to the semiconductor device 410.

The drive signal VOUT output by the semiconductor device 410 propagate through wiring patterns (not shown) formed on the flexible wiring board 400 and the vibration plate 360, and is supplied to one of a pair of electrodes provided to the piezoelectric element 60. The reference voltage signal VBS propagating through wiring patterns (not shown) formed on the flexible wiring board 400 and the vibration plate 360 is supplied to the other of the pair of electrodes provided to the piezoelectric element 60. This drives the piezoelectric element 60 in accordance with the potential difference between the drive signal VOUT and the reference voltage signal VBS. Then, a corresponding amount of ink to the drive of the piezoelectric element 60 is ejected from the nozzle 651 of the ejection unit 600.

1.4 Configuration and Operation of Drive Signal Output Circuit 1.4.1 Configuration of Drive Signal Output Circuit The drive signal output circuit 200 generates the drive signals VOUT[1] to VOUT[n] corresponding to the respective ejection units 600[1] to 600[*n*] from the drive voltage signal VDRV based on the latch signal LAT, the change signal CH, the clock signal SCK, corresponding one of the print data signals SI1 to SI7, and the waveform selection signal WS, and then outputs the drive signals VOUT[1] to VOUT[n] to the ejection units 600[1] to 600[*n*].

Figure 4:
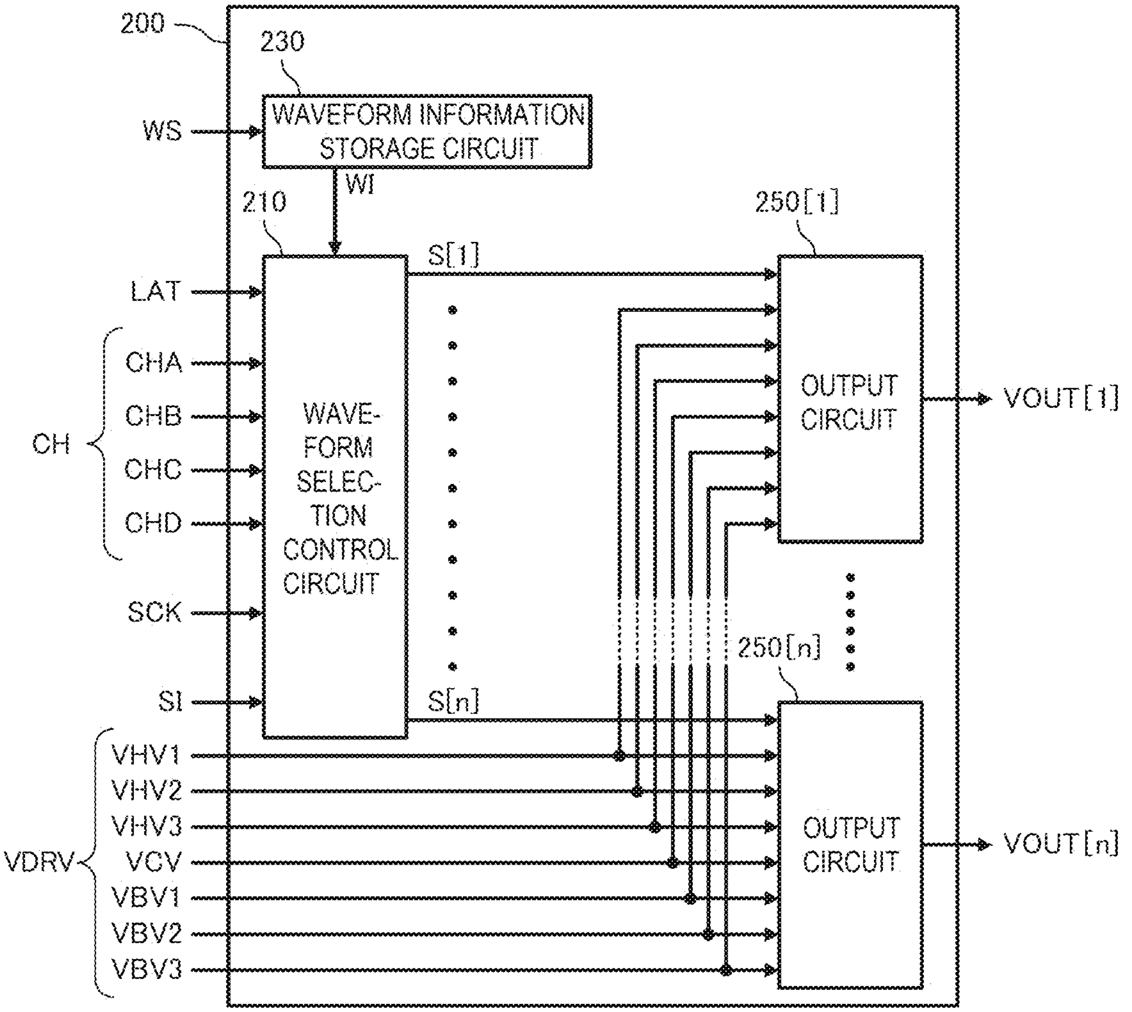
FIG. 4 is a diagram illustrating an example of a configuration of a drive signal output circuit.

FIG. 4 is a diagram illustrating an example of a configuration of the drive signal output circuit 200. As illustrated in FIG. 4, the drive signal output circuit 200 includes a waveform selection control circuit 210, a waveform information storage circuit 230, and output circuits 250[1] to 250[*n*].

The waveform information storage circuit 230 includes a nonvolatile memory such as a flash memory or an EEPROM (Electronically Erasable Programmable Read Only Memory). The waveform information storage circuit 230 stores waveform information that defines decoded content in a decoder 216 described later, in accordance with, for example, the signal waveform of the drive signal VOUT output by the drive signal output circuit 200 that is information of the signal waveform of the drive signal VOUT output by the drive signal output circuit 200. The waveform information storage circuit 230 reads out the waveform information selected by the waveform selection signal WS input thereto, and then generates the waveform information signal WI including the waveform information thus read out. Then, the waveform information storage circuit 230 outputs the waveform information signal WI thus generated to the waveform selection control circuit 210. That is, the drive signal output circuit 200 includes a waveform information storage circuit 230 in which the waveform information of the drive signals VOUT[1] to VOUT[n] is stored.

The latch signal LAT, change signals CHA, CHB, CHC, and CHD as the change signal CH, the clock signal SCK, and the print data signal SI, and the waveform information signal WI output by the waveform information storage circuit 230 are input to the waveform selection control circuit 210. Then, the waveform selection control circuit 210 generates and then outputs voltage selection signals S[1] to S[n] based on the latch signal LAT, the change signals CHA, CHB, CHC, and CHD, the clock signal SCK, the print data signal SI, and the waveform information signal WI input thereto.

The output circuits 250[1] to 250[*n*] are provided corresponding to the ejection units 600[1] to 600[*n*] provided to the print head 21. The voltage selection signals S[1] to S[n] output by the waveform selection control circuit 210 are input to the output circuits 250[1] to 250[*n*]. Further, drive voltage signals VHV1, VHV2, VHV3, VCV, VBV1, VBV2, and VBV3 as the drive voltage signal VDRV are input to the output circuits 250[1] to 250[*n*]. The output circuits 250[1] to 250[*n*] generate the drive signals VOUT[1] to VOUT[n] by selecting or deselecting the drive voltage signal VHV1, VHV2, VHV3, VCV, VBV1, VBV2, and VBV3 based on the voltage selection signals S[1] to S[n] corresponding thereto, and then output the drive signals VOUT[1] to VOUT[n] to the ejection units 600[1] to 600[*n*] corresponding thereto.

Specifically, the voltage selection signal S[1] output by the waveform selection control circuit 210 is input to the output circuit 250[1]. The output circuit 250[1] generates the drive signal VOUT[1] by selecting or deselecting the drive voltage signals VHV1, VHV2, VHV3, VCV, VBV1, VBV2, and VBV3 based on the voltage selection signal S[1] input thereto, and then outputs the drive signal VOUT[1] to the ejection unit 600[1]. Further, the voltage selection signal S[j] output by the waveform selection control circuit 210 is input to the output circuit 250[*j*]. The output circuit 250[*j*] generates the drive signal VOUT[j] by selecting or deselecting the drive voltage signals VHV1, VHV2, VHV3, VCV, VBV1, VBV2, and VBV3 based on the voltage selection signal S[j] input thereto, and then outputs the drive signal VOUT[j] to the ejection unit 600[*j*].

Here, in the following description, the voltage value of the drive voltage signal VDRV is defined by the voltage value setting signal VSET, and a voltage value of the drive voltage signal VHV1 as the voltage value of the drive voltage signal VDRV is referred to as a voltage Vh1, a voltage value of the drive voltage signal VHV2 as the voltage value of the drive voltage signal VDRV is referred to as a voltage Vh2, a voltage value of the drive voltage signal VHV3 as the voltage value of the drive voltage signal VDRV is referred to as a voltage Vh3, a voltage value of the drive voltage signal VCV as the voltage value of the drive voltage signal VDRV is referred to as a voltage Vc, a voltage value of the drive voltage signal VBV1 as the voltage value of the drive voltage signal VDRV is referred to as a voltage Vb1, a voltage value of the drive voltage signal VBV2 as the voltage value of the drive voltage signal VDRV is referred to as a voltage Vb2, and a voltage value of the drive voltage signal VBV3 as the voltage value of the drive voltage signal VDRV is referred to as a voltage Vb3. Then, the description will be presented assuming that the voltage values of the voltages Vh1, Vh2, Vh3, Vc, Vb1, Vb2, and Vb3 descend in the order of the voltages Vh3, Vh2, Vh1, Vc, Vb1, Vb2, and Vb3. That is, such voltages Vh1, Vh2, Vh3, Vc, Vb1, Vb2, and Vb3 as to satisfy that the voltage Vc is higher than the voltages Vb1, Vb2, and Vb3, and the voltages Vh1, Vh2, and Vh3 are higher than the voltage Vc can be changed by the voltage value setting signal VSET.

Further, in the following description, the output circuits 250[1] to 250[*n*] corresponding to the ejection unit 600 may be referred to as output circuits 250 in some cases. In this case, the description will be presented assuming that the voltage selection signal S as the voltage selection signal S[j] is input to the output circuit 250.

As described above, the drive voltage signal VHV1 having a voltage value of the voltage Vh1, the drive voltage signal VHV2 having a voltage value of the voltage Vh2, the drive voltage signal VHV3 having a voltage value of the voltage Vh3, the drive voltage signal VCV having a voltage value of the voltage Vc, the drive voltage signal VBV1 having a voltage value of the voltage Vb1, the drive voltage signal VBV2 having a voltage value of the voltage Vb2, the drive voltage signal VBV3 having a voltage value of the voltage Vb3, and the print data signal SI are input to the drive signal output circuit 200 of the first embodiment. Then, the drive signal output circuit 200 outputs the drive signals VOUT[1] to VOUT[n] based on the drive voltage signal VBV1 having the voltage value of the voltage Vh1, the drive voltage signal VHV2 having the voltage value of the voltage Vh2, the drive voltage signal VHV3 having the voltage value of the voltage Vh3, the drive voltage signal VCV having the voltage value of the voltage Vc, the drive voltage signal VBV1 having the voltage value of the voltage Vb1, the drive voltage signal VBV2 having the voltage value of the voltage Vb2, the drive voltage signal VBV3 having the voltage value of the voltage Vb3, and the print data signal SI.

Specifically, the drive signal output circuit 200 outputs the drive signals VOUT[1] to VOUT[n] by selecting or deselecting the drive voltage signal VHV1, selecting or deselecting the drive voltage signal VHV2, selecting or deselecting the drive voltage signal VHV3, selecting or deselecting the drive voltage signal VCV, selecting or deselecting the drive voltage signal VBV1, selecting or deselecting the drive voltage signal VBV2, and selecting or deselecting the drive voltage signal VBV3 based on the print data signal SI.

1.4.2 Functions of Latch Signal and Change Signal CH

Then, the latch signal: LAT and the change signals CHA, CHB, CHC, and CHD input to the drive signal output circuit 200 will be described.

Figure 5:
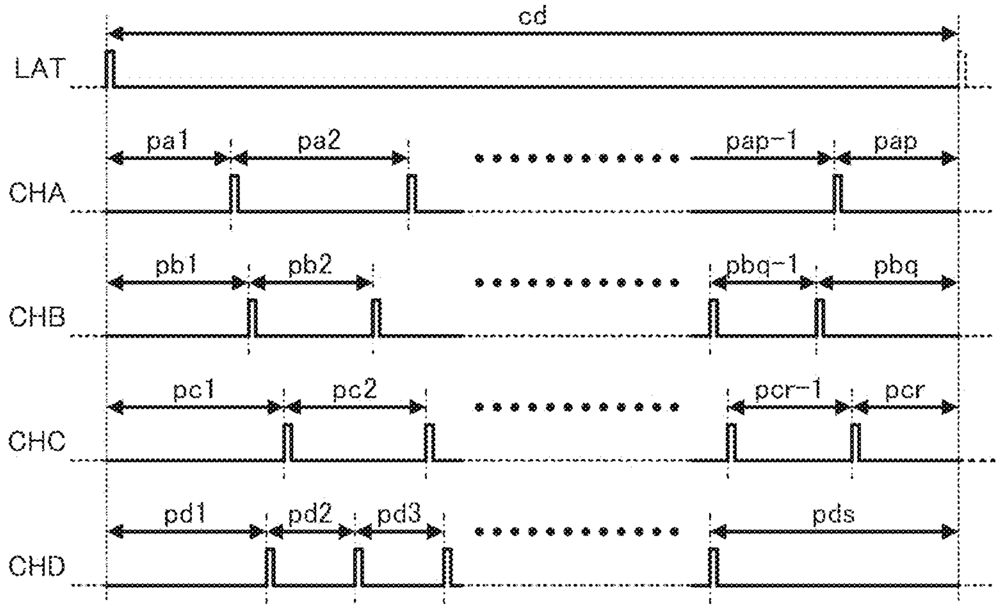
FIG. 5 is a diagram illustrating a latch signal and a change signal.

FIG. 5 is a diagram illustrating the latch signal LAT and the change signals CHA, CHB, CHC, and CHD. As illustrated in FIG. 5, the latch signal LAT is a pulse signal that defines a dot formation period cd in which a dot is formed on the medium P. Specifically, the control circuit 100 acquires the conveyance position of the medium P by using an encoder (not shown) or the like. Then, the control circuit 100 outputs the latch signal LAT which temporarily becomes the H level at a predetermined timing synchronized with the conveyance position of the medium P thus acquired to thereby define the dot formation period cd in which a dot is formed on the medium P in accordance with the conveyance position of the medium P. Note that when the liquid ejection apparatus 1 is a serial printing type inkjet printer, the control circuit 100 may define the dot formation period cd by outputting the latch signal that temporarily becomes the H level at the predetermined timing synchronized with a scanning position of a carriage or the like on which the print head 21 is mounted and which moves in the scanning direction, in addition to the conveyance position of the medium P.

The change signal CHA is a pulse signal that divides the dot formation period cd into p (p is an integer equal to or greater than 1) periods pa1 to pap. The change signal CHB is a pulse signal that divides the dot formation period cd into q (q is an integer equal to or greater than 1) periods pb1 to pbq. The change signal CHC is a pulse signal that divides the dot formation period cd into r (r is an integer equal to or greater than 1) periods pc1 to pcr. The change signal CHD is a pulse signal that divides the dot formation period cd into s (s is an integer equal to or greater than 1) periods pd1 to pds. The timing and the number of times at which the change signals CHA, CHB, CHC, and CHD are at the H level are controlled by the control circuit 100 in accordance with the signal waveform defined by the waveform selection signal WS. That is, the control circuit 100 controls the timing at which the change signals CHA, CHB, CHC, and CHD temporarily take the H level in the dot formation period cd and the number of times the change signals CHA, CHB, CHC, and CHD temporarily become the H level in the dot formation period cd to thereby independently control the number of divisions of the dot formation period cd and the lengths of the periods pa1 to pap, pb1 to pbq, pc1 to pcr, and pd1 to pds.

1.4.3 Example of Drive Signal VOUT

Figure 6:
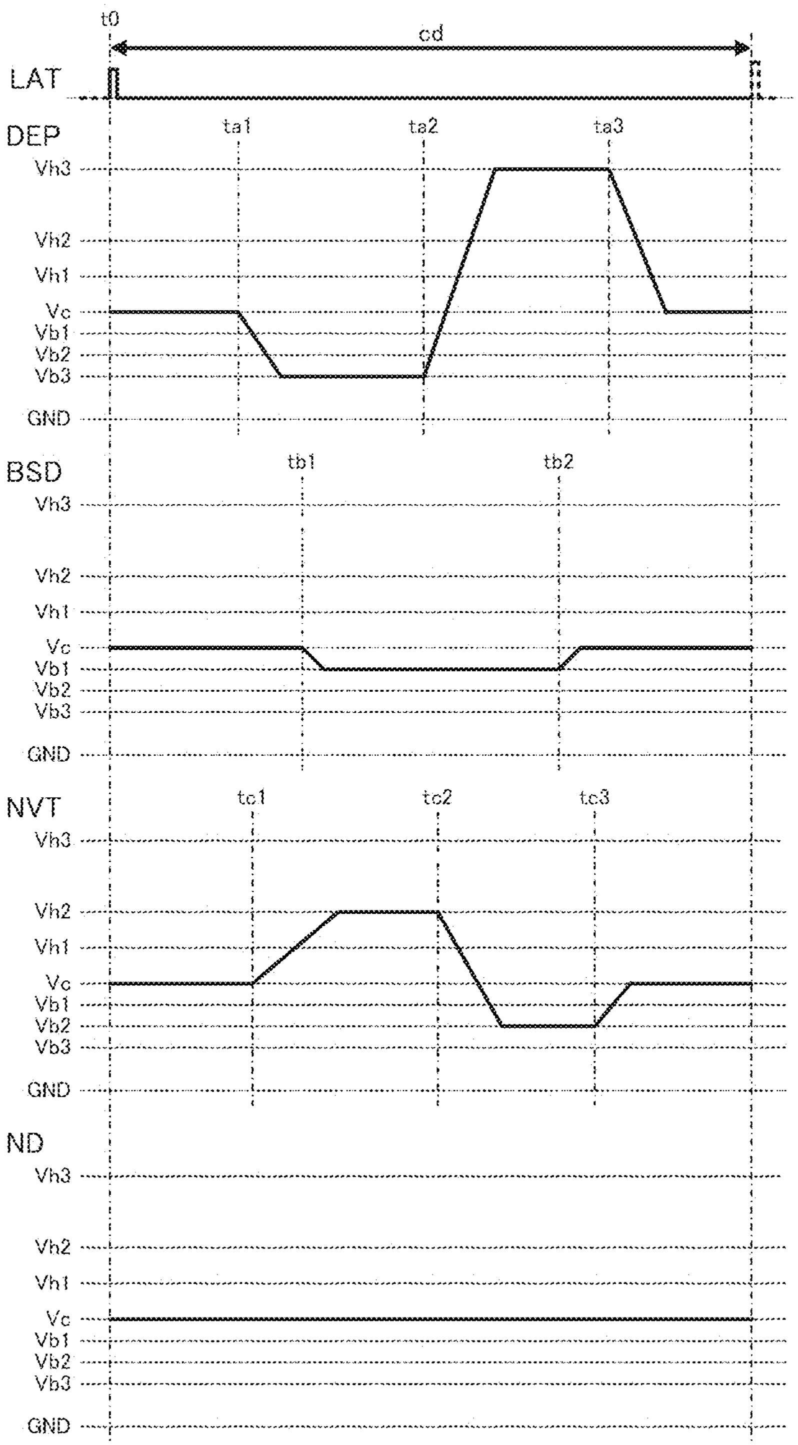
FIG. 6 is a diagram showing an example of a drive signal.

Then, an example of the drive signal VOUT output by the drive signal output circuit 200 will be described. FIG. 6 is a diagram illustrating an example of the drive signal VOUT. As illustrated in FIG. 6, the drive signal output circuit 200 of the first embodiment outputs a drive signal VOUT including a drive waveform DEP, a drive signal VOUT including a drive waveform BSD, a drive signal VOUT including a drive waveform NVT, and a drive signal VOUT including a drive waveform ND.

The drive waveform DEP has a voltage value constant at the voltage Vc at a time to at which the latch signal LAT rises, the voltage value decreases at a time ta1 after the time to, then becomes constant at the voltage Vb3, the voltage value rises at a time ta2 after the time ta1, then becomes constant at the voltage Vh3, and the voltage value decreases at a time ta3 after the time ta2, and then becomes constant at the voltage Vc. That is, the drive waveform DEP is a signal waveform in which the voltage value changes in the order of the voltage Vc, the voltage Vb3, the voltage Vh3, and the voltage Vc in the dot formation period cd. When the drive signal VOUT including such a drive waveform DEP is input to the ejection unit 600, the piezoelectric element 60 is driven so as to draw the ink from the reservoir 616 into the pressure chamber 613 during the period from the time ta1 to the time ta2, and is driven so that the ink thus drawn is ejected from the nozzle 651 during the period from the time ta2 to the time ta3. That is, the drive waveform DEP is a signal waveform for driving the piezoelectric element 60 so that the ink is ejected from the ejection unit 600.

In the drive waveform BSD, the voltage value is constant at the voltage Vc at the time to at which the latch signal LAT rises, the voltage value decreases at a time tb1 after the time to, and then becomes constant at the voltage Vb1, the voltage value rises at a time tb2 after the time tb1, and then becomes constant at the voltage Vc. That is, the drive waveform BSD is a signal waveform in which the voltage value changes in the order of the voltage Vc, the voltage Vb1, and the voltage Vc in the dot formation period cd. When the drive signal VOUT including such a drive waveform BSD is input to the ejection unit 600, the piezoelectric element 60 is driven to the extent that the liquid is not ejected from the nozzle 651. As a result, the ink in the vicinity of the nozzle 651 vibrates. This reduces the possibility that the ink in the vicinity of the nozzle 651 of the ejection unit 600 dries and increases in viscosity. That is, the drive waveform BSD is a signal waveform for driving the piezoelectric element 60 so that the ink is not ejected from the ejection unit 600.

The drive waveform NVT has a voltage value constant at the voltage Vc at the time to at which the latch signal LAT rises, the voltage value rises at a time tc1 after the time to, and then becomes constant at the voltage Vh2, the voltage value decreases at a time tc2 after the time tc1, then becomes constant at the voltage Vb2, and the voltage value rises at a time tc3 after the time tc2, and then becomes constant at the voltage Vc. That is, the drive waveform NVT is a signal waveform in which the voltage value changes in the order of the voltage Vc, the voltage Vh2, the voltage Vb2, and the voltage Vc in the dot formation period cd. When the drive signal VOUT including such a drive waveform NVT is input to the ejection unit 600, the piezoelectric element 60 is driven to the extent that the liquid is not ejected from the nozzle 651 during the period from the time ta2 to the time ta3 to thereby cause a predetermined residual vibration in the ink stored in the pressure chamber 613. On this occasion, back electromotive force due to that residual vibration is generated in the piezoelectric element 60. It is known that the amplitude and the period of the back electromotive force generated in the piezoelectric element 60 change depending on the state of the ejection unit 600. The drive signal output circuit 200 determines the state of the ejection unit 600 by acquiring the back electromotive force due to the residual vibration generated in the piezoelectric element 60. That is, the drive waveform NVT is a signal waveform for inspecting the state of the ejection unit 600.

The drive waveform ND is a signal waveform in which the voltage value is constant at the voltage Vc in the dot formation period cd. When the drive signal VOUT including such a drive waveform ND is input to the ejection unit 600, the piezoelectric element 60 is not driven, and no ink is ejected from the nozzle 651. That is, the drive waveform ND is a signal waveform which does not drive the piezoelectric element 60 provided to the ejection unit 600, but holds the piezoelectric element 60 in a constant state.

That is, the drive signal output circuit 200 outputs the drive signal VOUT[1] including the drive waveform DEP for driving the piezoelectric element 60 provided to the ejection unit 600[1] so that the ink is ejected from the ejection unit 600[1], the drive signal VOUT[1] including the drive waveform BSD for driving the piezoelectric element 60 provided to the ejection unit 600[1] so that the ink is not ejected from the ejection unit 600[1], and the drive signal VOUT[1] including the drive waveform NVT for inspecting the state of the ejection unit 600[1].

As described above, the drive signal output circuit 200 in the present embodiment generates the drive signal VOUT including any one of the drive waveform DEP for ejecting the ink from the ejection unit 600, the drive waveform BSD for generating a microvibration in the ejection unit 600 to the extent that the ink is not ejected, the drive waveform NVT for determining the state of the ejection unit 600, and the drive waveform ND that does not drive the piezoelectric element 60 provided to the ejection unit 600, and then outputs the drive signal VOUT to the ejection unit 600 corresponding to the drive signal VOUT. Note that the signal waveform of the drive signal VOUT illustrated in FIG. 6 is illustrative only, and is not a limitation. Further, the drive signal output circuit 200 may output a plurality of types of drive waveforms DEP for ejecting the ink from the ejection unit 600.

1.4.4 Configuration of Waveform Selection Control Circuit

Figure 7:
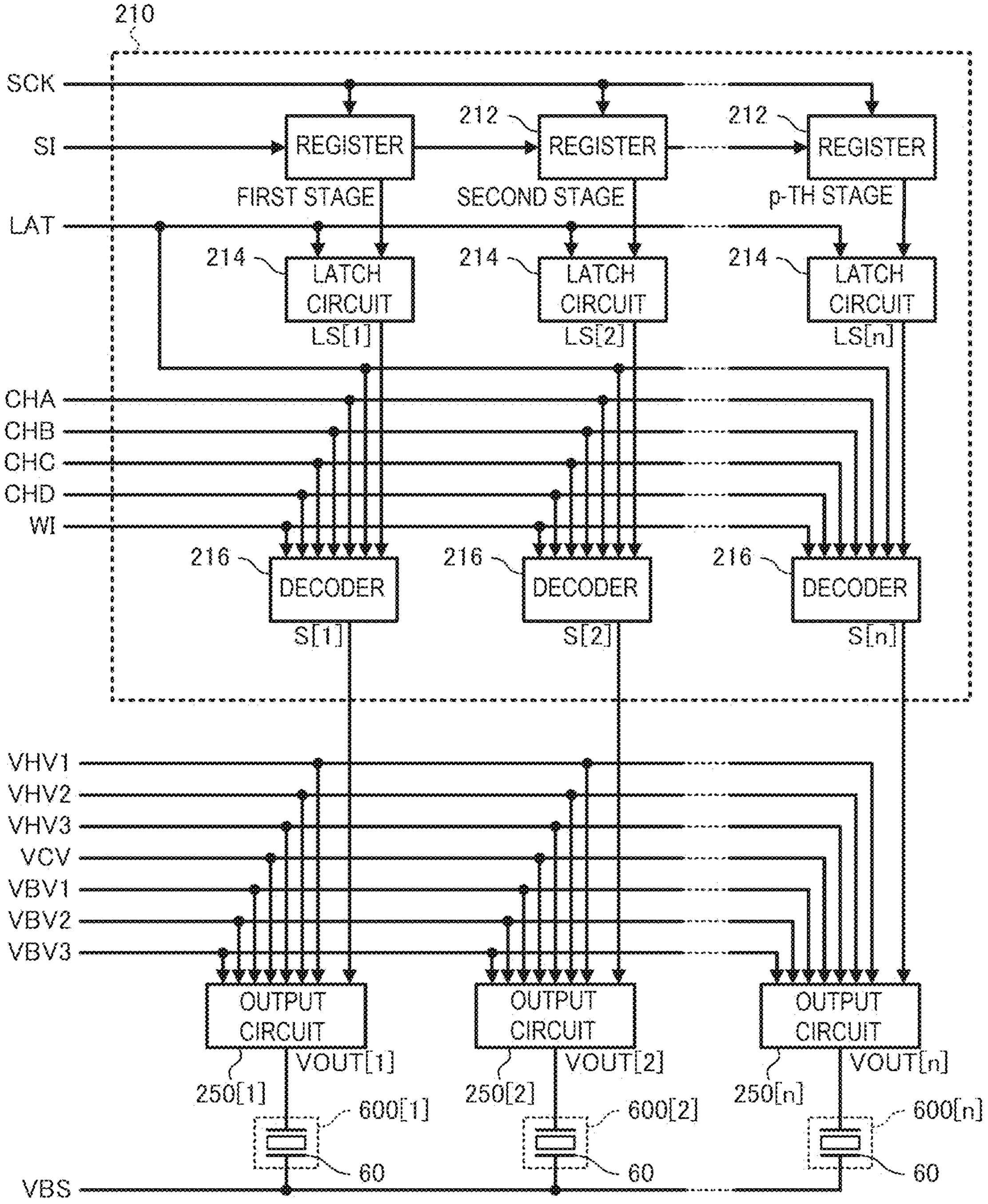
FIG. 7 is a diagram illustrating an example of a configuration of a waveform selection control circuit.

Then, a configuration of the waveform selection control circuit 210 will be described. FIG. 7 is a diagram illustrating an example of the configuration of the waveform selection control circuit 210. Here, in addition to the configuration of the waveform selection control circuit 210, FIG. 7 illustrates the output circuits 250[1] to 250[*n*] to which the voltage selection signals S[1] to S[n] output by the waveform selection control circuit 210 are input, and the ejection units 600[1] to 600[*n*].

As shown in FIG. 7, the clock signal SCK, the print data signal SI, the latch signal LAT, the change signals CHA, CHB, CHC, and CHD, and the waveform information signal WI are input to the waveform selection control circuit 210. Further, in the waveform selection control circuit 210, a set of a register 212, a latch circuit 214, and the decoder 216 is provided corresponding to each of the ejection units 600[1] to 600[*n*]. That is, the waveform selection control circuit 210 includes the same number of sets of the register 212, the latch circuit 214, and the decoder 216 as the n ejection units 600.

The print data signal SI is a signal synchronized with the clock signal SCK, and serially includes 2-bit print data [SIH, SIL] for selecting a signal waveform provided to the drive signal VOUT output to each of the n ejection units 600 from the drive waveforms DEP, BSD, NVT, and ND. That is, the print data signal SI includes a signal of at least 2n bits. Print data [SIH, SIL] provided to the print data signal SI is held in the register 212 so as to correspond to the n ejection units 600.

Specifically, in the waveform selection control circuit 210, the registers 212 are cascade-coupled to each other to form an n-stage shift register. Print data [SIH, SIL] serially input as the print data signal SI is sequentially transferred to the subsequent register 212 in accordance with the clock signal SCK. Then, when the supply of the clock signal SCK is stopped, the print data [SIH, SIL] corresponding to each of the n ejection units 600 is held in the register 212 corresponding to each of the n ejection units 600. Note that in the following description, in order to distinguish the n registers 212 constituting the shift register from each other, the print data signal SI may be referred to as a first stage, a second stage, . . . , and an n-th stage in series from upstream to downstream of the propagation of the print data signal SI.

The n latch circuits 214 are provided to correspond respectively to the n registers 212. The latch circuits 214 simultaneously latches the print data [SIH, SIL] held in the n registers 212, respectively, at the rising edge of the latch signal LAT. Then, the n latch circuits 214 respectively output the signals thus latched as latched signals LS[1], LS[2], . . . . LS[n] to the corresponding decoders 216. Here, in the following description, the signal latched by the latch circuit 214 out of the n latch circuits 214 may be referred to as the latched signal LS as the latched signals LS[1], LS[2], . . . , LS[n] in some cases.

In addition to the latched signal LS latched by the latch circuit 214, the latch signal LAT, the change signals CHA, CHB, CHC, and CHD, and the waveform information signal WI are input to the decoder 216. The decoder 216 decodes the print data [SIH, SIL] provided to the latched signal LS input to the decoder 216 with the content based on the waveform information signal WI to thereby generate the voltage selection signal S at a predetermined logic level in each of the periods pa1 to pap, pb1 to pbq, pc1 to pcr, and pd1 to pds defined by the latch signal LAT and the change signals CHA, CHB, CHC, and CHD, and then output the voltage selection signal S to the output circuit 250. On this occasion, the decoder 216 outputs the voltage selection signal S the L level of which is the ground potential, and the H level of which is a voltage value of the voltage Vh3 or a voltage value obtained by shifting the voltage Vh3 to a higher voltage value.

1.4.5 Configuration of Output Circuit

Figure 8:
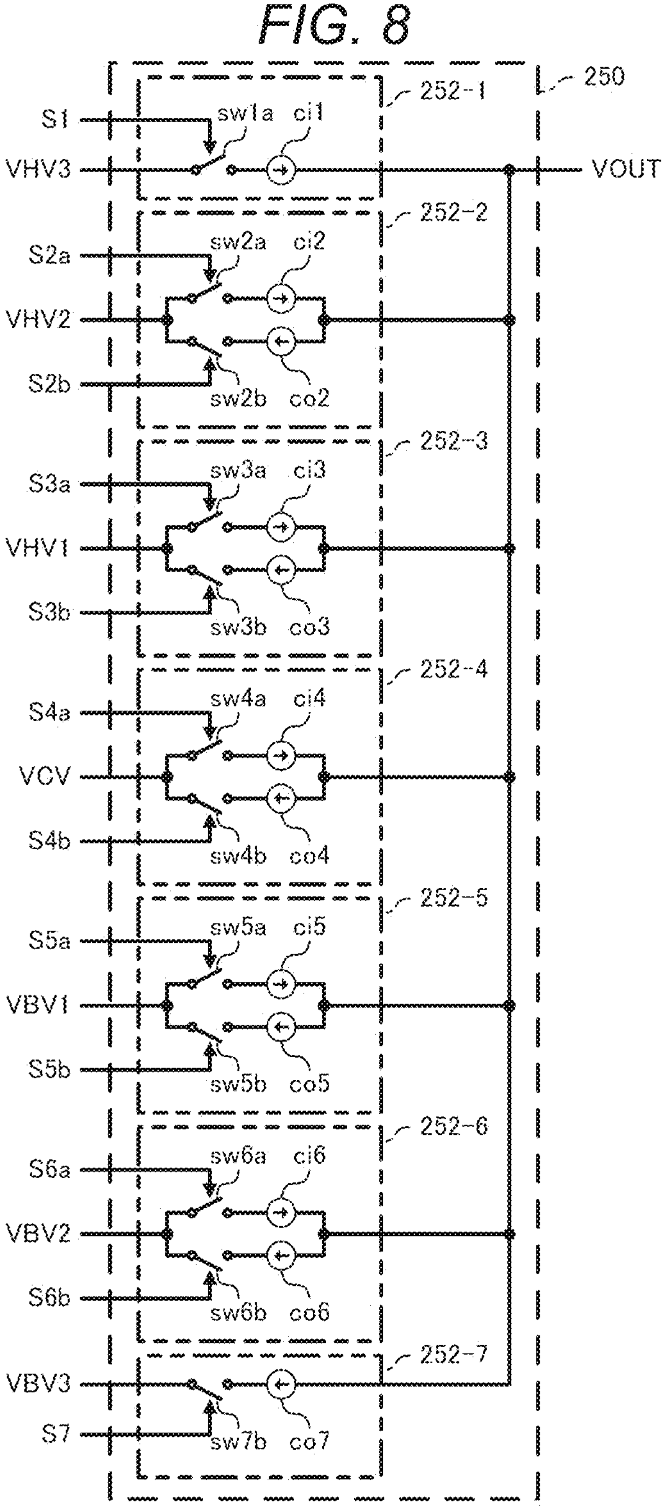
FIG. 8 is a diagram illustrating an example of a configuration of an output circuit.

Then, a configuration of the output circuit 250 to which the voltage selection signal S output by the waveform selection control circuit 210 is input will be described. FIG. 8 is a diagram illustrating an example of the configuration of the output circuit 250. As illustrated in FIG. 8, the output circuit 250 includes output switching circuits 252-1 to 252-7.

The output switching circuit 252-1 includes a switch sw1*a* and a constant current circuit ci1. The voltage selection signal S1 as the voltage selection signal S and the drive voltage signal VHV3 are input to the output switching circuit 252-1. The voltage selection signal S1 is input to a control terminal of the switch sw1*a*. The drive voltage signal VHV3 is input to one end of the switch sw1*a*. The other end of the switch sw1*a* is electrically coupled to an input terminal of the constant current circuit ci1.

Then, when the voltage selection signal S1 at the H level is input to the control terminal of the switch sw1*a*, the switch sw1*a* is controlled to make the one end and the other end conductive. As a result, the drive voltage signal VHV3 is supplied to the input terminal of the constant current circuit ci1. This makes the constant current circuit ci1 output, from an output terminal, a signal constant in current value based on the voltage Vh3, which is the voltage value of the drive voltage signal VHV3 supplied to the input terminal, and the voltage value at the output terminal. Here, the switch sw1*a* and the constant current circuit ci1 may be configured with individual circuit elements, or may be configured with a single circuit element.

The output switching circuit 252-2 includes switches sw2*a*, sw2*b* and constant current circuits ci2, co2. The voltage selection signals S2*a*, S2*b* as the voltage selection signal S and the drive voltage signal VHV2 are input to the output switching circuit 252-2. The voltage selection signal S2*a* is input to a control terminal of the switch sw2*a*. The voltage selection signal S2*b* is input to a control terminal of the switch sw2*b*. The drive voltage signal VHV2 is input to one end of the switch sw2*a* and one end of the switch sw2*b*. The other end of the switch sw2*a* is electrically coupled to an input terminal of the constant current circuit ci2. The other end of the switch sw2*b* is electrically coupled to an output terminal of the constant current circuit co2.

Then, when the voltage selection signal S2*a* at the H level is input to the control terminal of the switch sw2*a*, the switch sw2*a* is controlled to make the one end and the other end conductive. As a result, the drive voltage signal VHV2 is supplied to the input terminal of the constant current circuit ci2. This makes the constant current circuit ci2 output, from an output terminal, a signal constant in current value based on the voltage Vh2, which is the voltage value of the drive voltage signal VHV2 supplied to the input terminal, and the voltage value at the output terminal. Further, when the voltage selection signal S2*b* at the H level is input to the control terminal of the switch sw2*b*, the switch sw2*b* is controlled to make the one end and the other end conductive. As a result, the drive voltage signal VHV2 is supplied to an output terminal of the constant current circuit co2. This makes the constant current circuit co2 output a signal, which has a constant current value based on the voltage value at the input terminal and the voltage Vh2 supplied to the output terminal, from the output terminal. Here, the switch sw2*a* and the constant current circuit ci2 may be configured with individual circuit elements, or may be configured with a single circuit element. Similarly, the switch sw2*b* and the constant current circuit co2 may be configured with individual circuit elements, or may be configured with a single circuit element.

The output switching circuit 252-3 includes switches sw3*a*, sw3*b* and constant current circuits ci3, co3. The voltage selection signals S3*a*, S3*b* as the voltage selection signal S and the drive voltage signal VHV1 are input to the output switching circuit 252-3. The voltage selection signal S3*a* is input to a control terminal of the switch sw3*a*. The voltage selection signal S3*b* is input to a control terminal of the switch sw3*b*. The drive voltage signal VHV1 is input to one end of the switch sw3*a* and one end of the switch sw3*b*. The other end of the switch sw3*a* is electrically coupled to an input terminal of the constant current circuit ci3. The other end of the switch sw3*b* is electrically coupled to an output terminal of the constant current circuit co3.

Then, when the voltage selection signal S3*a* at the H level is input to the control terminal of the switch sw3*a*, the switch sw3*a* is controlled to make the one end and the other end conductive. As a result, the drive voltage signal VHV1 is supplied to the input terminal of the constant current circuit ci3. This makes the constant current circuit ci3 output, from an output terminal, a signal constant in current value based on the voltage Vh1, which is the voltage value of the drive voltage signal VHV1 supplied to the input terminal, and the voltage value at the output terminal. Further, when the voltage selection signal S3*b* at the H level is input to a control terminal of the switch sw3*b*, the switch sw3*b* is controlled to make the one end and the other end conductive. As a result, the drive voltage signal VHV1 is supplied to the output terminal of the constant current circuit co3. This makes the constant current circuit co3 output a signal, which has a constant current value based on the voltage value at the input terminal and the voltage Vh1 supplied to the output terminal, from the output terminal. Here, the switch sw3*a* and the constant current circuit ci3 may be configured with individual circuit elements, or may be configured with a single circuit element. Similarly, the switch sw3*b* and the constant current circuit co3 may be configured with individual circuit elements, or may be configured with a single circuit element.

The output switching circuit 252-4 includes switches sw4*a*, sw4*b* and constant current circuits ci4, co4. The voltage selection signals S4*a*, S4*b* as the voltage selection signal S and the drive voltage signal VCV are input to the output switching circuit 252-4. The voltage selection signal S4*a* is input to a control terminal of the switch sw4*a*. The voltage selection signal S4*b* is input to a control terminal of the switch sw4*b*. The drive voltage signal VCV is input to one end of the switch sw4*a* and one end of the switch sw4*b*. The other end of the switch sw4*a* is electrically coupled to an input terminal of the constant current circuit ci4. The other end of the switch sw4*b* is electrically coupled to an output terminal of the constant current circuit co4.

Then, when the voltage selection signal S4*a* at the H level is input to the control terminal of the switch sw4*a*, the switch sw4*a* is controlled to make the one end and the other end conductive. As a result, the drive voltage signal VCV is supplied to the input terminal of the constant current circuit ci4. This makes the constant current circuit ci4 output, from an output terminal, a signal constant in current value based on the voltage Vc, which is the voltage value of the drive voltage signal VCV supplied to the input terminal, and the voltage value at the output terminal. Further, when the voltage selection signal S4*b* at the H level is input to a control terminal of the switch sw4*b*, the switch sw4*b* is controlled to make the one end and the other end conductive. As a result, the drive voltage signal VCV is supplied to the output terminal of the constant current circuit co4. This makes the constant current circuit co4 output a signal, which has a constant current value based on the voltage value at the input terminal and the voltage Vc supplied to the output terminal, from the output terminal. Here, the switch sw4*a* and the constant current circuit ci4 may be configured with individual circuit elements, or may be configured with a single circuit element. Similarly, the switch sw4*b* and the constant current circuit co4 may be configured with individual circuit elements, or may be configured with a single circuit element.

The output switching circuit 252-5 includes switches sw5*a*, sw5*b* and constant current circuits ci5, co5. The voltage selection signals S5*a*, S5*b* as the voltage selection signal S and the drive voltage signal VBV1 are input to the output switching circuit 252-5. The voltage selection signal S5*a* is input to a control terminal of the switch sw5*a*. The voltage selection signal S5*b* is input to a control terminal of the switch sw5*b*. The drive voltage signal VBV1 is input to one end of the switch sw5*a* and one end of the switch sw5*b*.

The other end of the switch sw5*a* is electrically coupled to an input terminal of the constant current circuit ci5. The other end of the switch sw5*b* is electrically coupled to an output terminal of the constant current circuit co5.

Then, when the voltage selection signal S5*a* at the H level is input to the control terminal of the switch sw5*a*, the switch sw5*a* is controlled to make the one end and the other end conductive. As a result, the drive voltage signal VBV1 is supplied to the input terminal of the constant current circuit ci5. This makes the constant current circuit ci5 output, from an output terminal, a signal constant in current value based on the voltage Vb1, which is the voltage value of the drive voltage signal VBV1 supplied to the input terminal, and the voltage value at the output terminal. Further, when the voltage selection signal S5*b* at the H level is input to a control terminal of the switch sw5*b*, the switch sw5*b* is controlled to make the one end and the other end conductive. As a result, the drive voltage signal VBV1 is supplied to the output terminal of the constant current circuit co5. This makes the constant current circuit co5 output a signal, which has a constant current value based on the voltage value at the input terminal and the voltage Vb1 supplied to the output terminal, from the output terminal. Here, the switch sw5*a* and the constant current circuit ci5 may be configured with individual circuit elements, or may be configured with a single circuit element. Similarly, the switch sw5*b* and the constant current circuit co5 may be configured with individual circuit elements, or may be configured with a single circuit element.

The output switching circuit 252-6 includes switches sw6*a*, sw6*b* and constant current circuits ci6, co6. The voltage selection signals S6*a*, S6*b* as the voltage selection signal S and the drive voltage signal VBV2 are input to the output switching circuit 252-6. The voltage selection signal S6*a* is input to a control terminal of the switch sw6*a*. The voltage selection signal S6*b* is input to a control terminal of the switch sw6*b*. The drive voltage signal VBV2 is input to one end of the switch sw6*a* and one end of the switch sw6*b*. The other end of the switch sw6*a* is electrically coupled to an input terminal of the constant current circuit ci6. The other end of the switch sw6*b* is electrically coupled to an output terminal of the constant current circuit co6.

Then, when the voltage selection signal S6*a* at the H level is input to the control terminal of the switch sw6*a*, the switch swa is controlled to make the one end and the other end conductive. As a result, the drive voltage signal VBV2 is supplied to the input terminal of the constant current circuit ci6. This makes the constant current circuit ci6 output, from an output terminal, a signal constant in current value based on the voltage Vb2, which is the voltage value of the drive voltage signal VBV2 supplied to the input terminal, and the voltage value of the output terminal. Further, when the voltage selection signal S6*b* at the H level is input to a control terminal of the switch sw6*b*, the switch sw6*b* is controlled to make the one end and the other end conductive. As a result, the drive voltage signal VBV2 is supplied to the output terminal of the constant current circuit co6. This makes the constant current circuit co6 output a signal, which has a constant current value based on the voltage value at the input terminal and the voltage Vb2 supplied to the output terminal, from the output terminal. Here, the switch sw6*a* and the constant current circuit ci6 may be configured with individual circuit elements, or may be configured with a single circuit element. Similarly, the switch sw6*b* and the constant current circuit co6 may be configured with individual circuit elements, or may be configured with a single circuit element.

The output switching circuit 252-7 includes a switch sw7*b* and a constant current circuit co7. The voltage selection signal S7 as the voltage selection signal S and the drive voltage signal VBV3 are input to the output switching circuit 252-7. The voltage selection signal S7 is input to a control terminal of the switch sw7*b*. The drive voltage signal VBV3 is input to one end of the switch sw7*b*. The other end of the switch sw7*b* is electrically coupled to an output terminal of the constant current circuit co7.

Further, when the voltage selection signal S7 at the H level is input to a control terminal of the switch sw7*b*, the switch sw7*b* is controlled to make the one end and the other end conductive. As a result, the drive voltage signal VBV3 is supplied to the output terminal of the constant current circuit co7. This makes the constant current circuit co7 output, from an output terminal, a signal constant in current value based on the voltage value at the input terminal and the voltage Vb3, which is the voltage value of the drive voltage signal VBV3 supplied to the output terminal. Here, the switch sw7*b* and the constant current circuit co7 may be configured with individual circuit elements, or may be configured with a single circuit element.

Further, the outputs of the output switching circuits 252-1 to 252-7 are coupled in common. The output circuit 250 outputs a signal, which is generated at the output of each of the output switching circuits 252-1 to 252-7 commonly coupled to each other, as the drive signal VOUT.

As described above, the output circuit 250 generates the drive signal VOUT by the output switching circuits 252-1 to 252-7 each switching whether to output the drive voltage signals VHV1, VHV2, VHV3, VCV, VBV1, VBV2, and VBV3 input thereto based on the logic level of corresponding one of the voltage selection signals S, and then outputs the drive signal VOUT to the ejection unit 600 corresponding thereto. That is, the constant current circuits ci1, ci2, ci3, ci4, ci5, and ci6 output a current based on the voltage value of each of the drive voltage signals VHV3, VHV2, VHV1, VCV, VBV1, VBV2 and the voltage value of the drive signal VOUT toward the ejection unit 600. Such constant current circuits ci1, ci2, ci3, ci4, ci5, and ci6 can be configured including, for example, P-channel FETs (Field Effect Transistors). Further, the constant current circuits co2, co3, co4, co5, co6, and co7 draw a current based on the voltage value of the drive signal VOUT and the voltage value of each of the drive voltage signals VHV3, VHV2, VHV1, VCV, VBV1, and VBV2 from the ejection unit 600. Such a constant current circuits co2, co3, co4, co5, co6, and co7 may be configured including, for example, N-channel FETs (Field Effect Transistors).

That is, the output switching circuit 252-1 includes the P-channel FET, the output switching circuits 252-2 to 252-6 include the P-channel FETs and the N-channel FETs, and the output switching circuit 252-7 includes the N-channel FET.

As described above, the drive signal output circuit 200 includes the output switching circuit 252-1 that outputs a signal having a constant current value based on the drive voltage signal VHV3, the output switching circuit 252-2 that outputs a signal having a constant current value based on the drive voltage signal VHV2, the output switching circuit 252-3 that outputs a signal having a constant current value based on the drive voltage signal VHV1, the output switching circuit 252-4 that outputs a signal having a constant current value based on the drive voltage signal VCV, the output switching circuit 252-5 that outputs a signal having a constant current value based on the drive voltage signal VBV1, the output switching circuit 252-6 that outputs a signal having a constant current value based on the drive voltage signal VBV2, and the output switching circuit 252-7 that outputs a signal having a constant current value based on the drive voltage signal VBV3.

Further, based on the print data signals SI, the waveform selection control circuit 210 controls whether the output switching circuit 252-1 outputs a signal having a constant current value based on the drive voltage signal VHV3, controls whether the output switching circuit 252-2 outputs a signal having a constant current value based on the drive voltage signal VHV2, controls whether the output switching circuit 252-3 outputs a signal having a constant current value based on the drive voltage signal VHV1, controls whether the output switching circuit 252-4 outputs a signal having a constant current value based on the drive voltage signal VCV, controls whether the output switching circuit 252-5 outputs a signal having a constant current value based on the drive voltage signal VBV1, controls whether the output switching circuit 252-6 outputs a signal having a constant current value based on the drive voltage signal VBV2, and controls whether the output switching circuit 252-7 outputs a signal having a constant current value based on the drive voltage signal VBV3. In other words, the waveform selection control circuit 210 acquires the waveform information signal WI to control the output switching circuits 252-1 to 252-7 based on the waveform information signal WI thus acquired and the print data signal SI.

Thus, the output switching circuit 252-1 switches whether to output the signal having the constant current value based on the drive voltage signal VHV3 by selecting or deselecting the drive voltage signal VHV3, the output switching circuit 252-2 switches whether to output the signal having the constant current value based on the drive voltage signal VHV2 by selecting or deselecting the drive voltage signal VHV2, the output switching circuit 252-3 switches whether to output the signal having the constant current value based on the drive voltage signal VHV3 by selecting or deselecting the drive voltage signal VHV3, the output switching circuit 252-4 switches whether to output the signal having the constant current value based on the drive voltage signal VCV by selecting or deselecting the drive voltage signal VCV, the output switching circuit 252-5 switches whether to output the signal having the constant current value based on the drive voltage signal VBV1 by selecting or deselecting the drive voltage signal VBV1, the output switching circuit 252-6 switches whether to output the signal having the constant current value based on the drive voltage signal VBV2 by selecting or deselecting the drive voltage signal VBV2, and the output switching circuit 252-7 switches whether to output the signal having the constant current value based on the drive voltage signal VBV3 by selecting or deselecting the drive voltage signal VBV3.

This makes the drive signal output circuit 200 output the signal having the constant current value based on the drive voltage signal VHV3, the signal having the constant current value based on the drive voltage signal VHV2, the signal having the constant current value based on the drive voltage signal VHV1, the signal having the constant current value based on the drive voltage signal VCV, the signal having the constant current value based on the drive voltage signal VBV1, the signal having the constant current value based on the drive voltage signal VBV2, and drive signals VOUT[1] to VOUT[n] corresponding to the signal having the constant current value based on the drive voltage signal VBV3.

Here, the output switching circuit 252-1 that switches whether to output a signal based on the drive voltage signal VHV3 the highest in voltage value of the drive voltage signals VHV1, VHV2, VHV3, VCV, VBV1, VBV2, and VBV3 may include a circuit for outputting, from an output terminal, a signal having a constant current value based on the voltage value at the input terminal and the voltage Vh3 supplied to the output terminal, in addition to the constant current circuit ci1 which outputs, from the output terminal, a signal having a constant current value based on the voltage Vh3 supplied to the input terminal and the voltage at the output terminal. Further, the output switching circuit 252-7 for switching whether to output a signal based on the drive voltage signal VBV3 the lowest in voltage value of the drive voltage signals VHV1, VHV2, VHV3, VCV, VBV1, VBV2, and VBV3 may include a circuit for outputting, from an output terminal, a signal having a constant current value based on the voltage Vb3 supplied to the input terminal and the voltage value at the output terminal, in addition to the constant current circuit co7 for outputting, from the output terminal, a signal having a constant current value based on voltage value at the input terminal and the voltage Vb3 supplied to the output terminal. This can make the output switching circuits 252-1 to 252-7 substantially the same in configuration, and can reduce the manufacturing cost of the semiconductor device 410 including the output switching circuits 252-1 to 252-7.

1.4.6 Operation of Drive Signal Output Circuit

Figure 9:
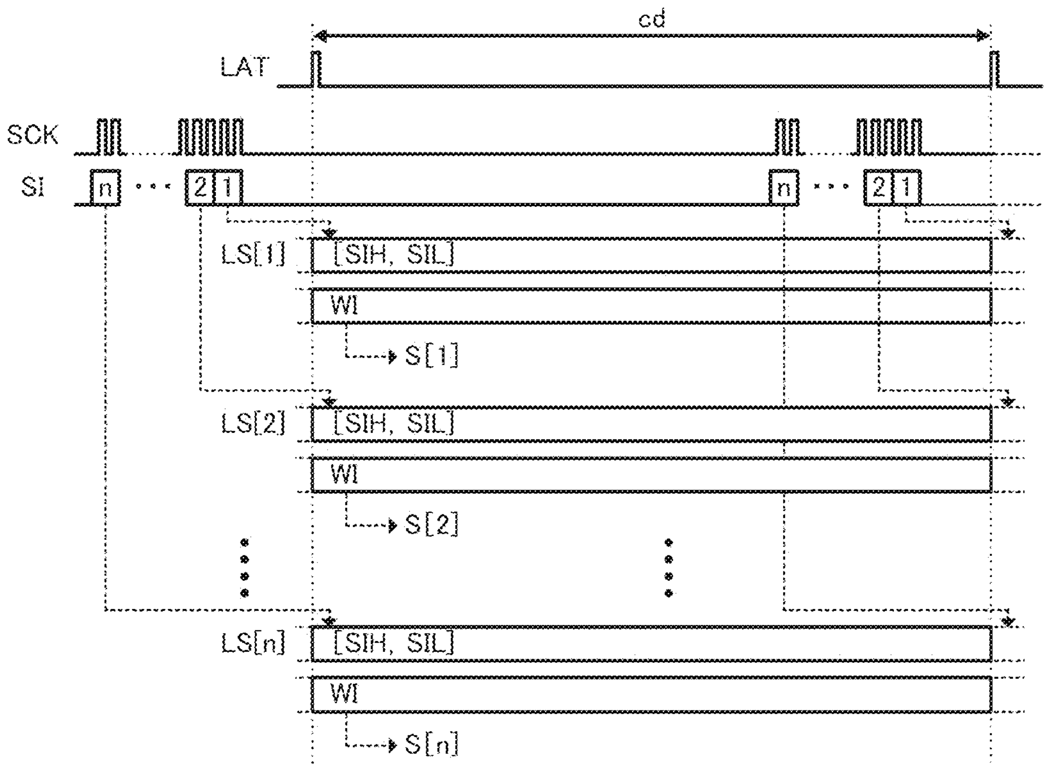
FIG. 9 is a diagram illustrating an operation of the drive signal output circuit.

The operation of the drive signal output circuit 200 will be described. FIG. 9 is a diagram illustrating the operation of the drive signal output circuit 200. The print data [SIH, SIL] provided to the print data signal SI is serially input to the drive signal output circuit 200 in synchronization with the clock signal SCK. The print data [SIH, SIL] input to the drive signal output circuit 200 is sequentially transferred by the registers 212 corresponding to the ejection units 600[1] to 600[*n*] in synchronization with the clock signal SCK. Subsequently, when the supply of the clock signal SCK is stopped, the print data [SIH, SIL] corresponding to each of the ejection units 600[1] to 600[*n*] is held in each of the registers 212. Note that in the first embodiment, the print data [SIH, SIL] provided to the print data signal SI is input in the order corresponding to the ejection unit 600[*n*], the ejection unit 600[*n*−1], . . . , the ejection unit 600[2], and the ejection unit 600[1].

Subsequently, when the latch signal LAT rises, the latch circuits 214 simultaneously latch the print data [SIH, SIL] held in the register 212 as the latched signals LS. Then, the latch circuit 214 inputs the latched signal LS including the print data [SIH, SIL] thus latched to the decoder 216 corresponding thereto. Each of the decoders 216 decodes the latched signal LS input thereto based on the waveform information signal WI input from the waveform information storage circuit 230 to thereby generate the voltage selection signal S, and then output the voltage selection signal S to the output circuit 250.

Specifically, the latch circuit 214 corresponding to the ejection unit 600[1] latches the print data [SIH, SIL] held in the register 212 corresponding to the ejection unit 600[1] as the latched signal LS[1], and then inputs the latched signal LS[1] thus latched to the decoder 216 corresponding to the ejection unit 600[1]. The decoder 216 corresponding to the ejection unit 600[1] decodes the latched signal LS[1] based on the waveform information signal WI input from the waveform information storage circuit 230 to thereby generate the voltage selection signals S1, S2*a*, S2*b*, S3*a*, S3*b*, S4*a*, S4*b*, S5*a*, S5*b*, S6*a*, S6*b*, and S7 as the voltage selection signal S[1] and then output the voltage selection signals S1, S2*a*, S2*b*, S3*a*, S3*b*, S4*a*, S4*b*, S5*a*, S5*b*, S6*a*, S6*b*, and S7 to the output circuit 250[1].

Similarly, the latch circuit 214 corresponding to the ejection unit 600[*j*] latches the print data [SIH, SIL] held in the register 212 corresponding to the ejection unit 600[*j*] as the latched signal LS[j], and then inputs the latched signal LS[j] thus latched to the decoder 216 corresponding to the ejection unit 600[*j*]. The decoder 216 corresponding to the ejection unit 600[*j*] decodes the latched signal LS[j] based on the waveform information signal WI input from the waveform information storage circuit 230 to thereby generate the voltage selection signals S1, S2*a*, S2*b*, S3*a*, S3*b*, S4*a*, S4*b*, S5*a*, S5*b*, S6*a*, S6*b*, and S7 as the voltage selection signal S[j], and then output the voltage selection signals S1, S2*a*, S2*b*, S3*a*, S3*b*, S4*a*, S4*b*, S5*a*, S5*b*, S6*a*, S6*b*, and S7 to the output circuit 250[*j*].

Then, a specific example of the decoding content in the decoder 216 will be described. Here, the description will be presented assuming that the drive signal output circuit 200 provided to the liquid ejection apparatus 1 according to the first embodiment outputs the drive signal VOUT including the drive waveform DEP to the ejection unit 600 corresponding thereto when the print data [SIH, SIL]=[1, 1], outputs the drive signal VOUT including the drive waveform BSD to the ejection unit 600 corresponding thereto when the print data [SIH, SIL]=[1, 0], outputs the drive signal VOUT including the drive waveform NVT to the ejection unit 600 corresponding thereto when the print data [SIH, SIL]=[0, 1], outputs the drive signal VOUT including the drive waveform ND to the ejection unit 600 corresponding thereto when the print data [SIH, SIL]=[0, 0].

Figure 10:
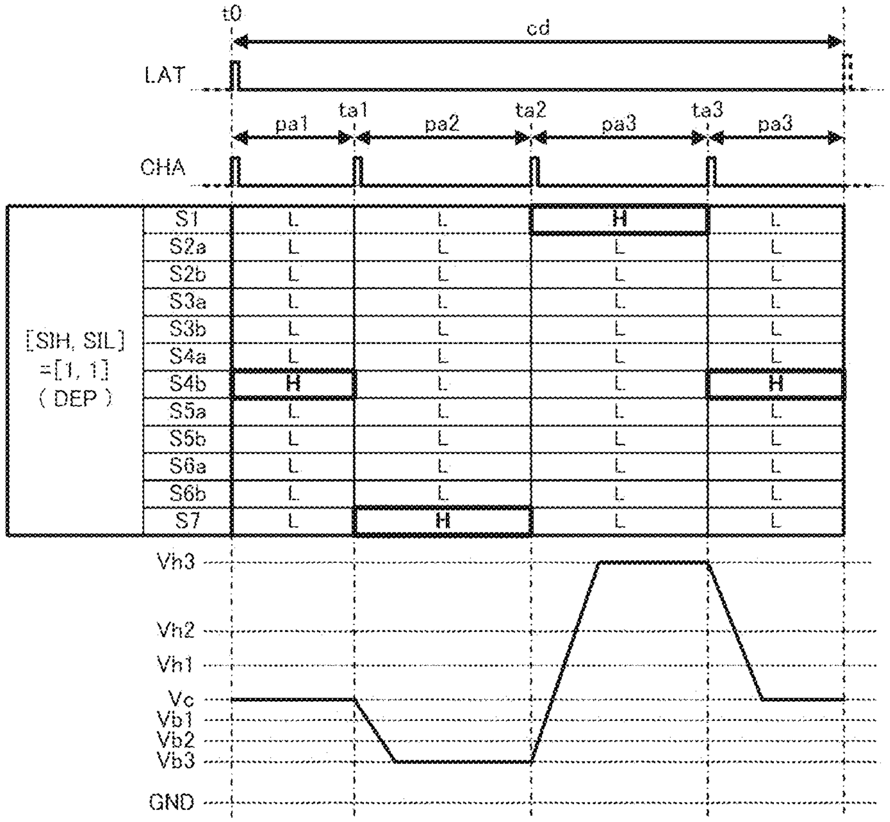
FIG. 10 is a diagram illustrating an example of an operation of a decoder and a signal waveform of a drive signal when print data [SIH, SIL]=[1, 1] is input.

FIG. 10 is a diagram illustrating an example of an operation of the decoder 216 and a signal waveform of the drive signal VOUT when the print data [SIH, SIL]=[1, 1] is input. As illustrated in FIG. 10, when the latched signal LS including the print data [SIH, SIL]=[1, 1] is input, the decoder 216 generates the voltage selection signals S1, S2*a*, S2*b*, S3*a*, S3*b*, S4*a*, S4*b*, S5*a*, S5*b*, S6*a*, S6*b*, and S7 as the voltage selection signal S in a predetermined logic level in each of the periods pa1 to pa4 defined by the latch signal LAT and the change signal CHA, and then outputs the voltage selection signals S1, S2*a*, S2*b*, S3*a*, S3*b*, S4*a*, S4*b*, S5*a*, S5*b*, S6*a*, S6*b*, and S7 to the output circuit 250.

Specifically, when the latch signal LAT rises, the period pa1 starts. In the period pa1, the decoder 216 sets the logic level of the voltage selection signal S4*b* to be output to the H level and sets the rest to the L level. That is, in the period pa1, the switch sw4*b* provided to the output switching circuit 252-4 is controlled to make one end and the other end conductive. As a result, the output circuit 250 outputs the drive signal VOUT having the voltage value constant at the voltage Vc. Note that in the period pa1, the decoder 216 may set the logic level of the voltage selection signal S4*a* to be output to the H level, and may set the rest to the L level. That is, in the period pa1, the switch sw4*a* provided to the output switching circuit 252-4 may be controlled to make one end and the other end conductive.

Then, when the change signal CHA rises after the latch signal LAT rises, the period pa1 starts. In the period pa2, the decoder 216 sets the logic level of the voltage selection signal S7 to be output to the H level, and sets the rest to the L level. That is, in the period pa2, the switch sw4*b* provided to the output switching circuit 252-4 is controlled to make one end and the other end non-conductive, and the switch sw7*b* provided to the output switching circuit 252-7 is controlled to make one end and the other end conductive. Therefore, the constant current circuit co7 outputs a signal having a constant current value based on a potential difference between the voltage value of the drive signal VOUT supplied to the input terminal and the voltage Vb3 supplied to the output terminal. In other words, the output switching circuit 252-7 draws the signal having the constant current value based on the potential difference between the voltage value of the drive signal VOUT and the voltage Vb3. As a result, the output circuit 250 outputs the drive signal VOUT having the voltage value decreasing from the voltage Vc toward the voltage Vb3. Then, when the voltage value of the drive signal VOUT supplied to the input terminal of the constant current circuit co7 becomes the voltage Vb3, the constant current circuit co7 stops outputting the signal having the constant current value. This makes the voltage value of the drive signal VOUT output by the output circuit 250 constant at the voltage Vb3.

Then, when the change signal CHA subsequently rises, the period pa3 starts. In the period pa3, the decoder 216 sets the logic level of the voltage selection signal S1 to be output to the H level, and sets the rest to the L level. That is, in the period pa3, the switch sw7*b* provided to the output switching circuit 252-7 is controlled to make one end and the other end non-conductive, and the switch sw1*a* provided to the output switching circuit 252-1 is controlled to make one end and the other end conductive. Therefore, the constant current circuit ci1 outputs a signal having a constant current value based on a potential difference between the voltage Vh3 as the voltage value of the signal supplied to the input terminal and the voltage value of the drive signal VOUT supplied to the output terminal. In other words, the output switching circuit 252-1 outputs the signal having the constant current value based on the potential difference between the voltage Vh3 and the voltage value of the drive signal VOUT. As a result, the output circuit 250 outputs the drive signal VOUT having the voltage value rising from the voltage Vb3 toward the voltage Vh3. Then, when the voltage value of the drive signal VOUT supplied to the output terminal of the constant current circuit ci1 becomes the voltage Vh3, the constant current circuit ci1 stops outputting the signal having the constant current value. This makes the voltage value of the drive signal VOUT output by the output circuit 250 constant at the voltage Vh3.

Then, when the change signal CHA subsequently rises, the period pa4 starts. In the period pa4, the decoder 216 sets the logic level of the voltage selection signal S4*b* to be output to the H level and sets the rest to the L level. That is, in the period pa4, the switch sw1*a* provided to the output switching circuit 252-1 is controlled to make one end and the other end non-conductive, and the switch sw4*b* provided to the output switching circuit 252-4 is controlled to make one end and the other end conductive. Therefore, the constant current circuit co4 outputs a signal having a constant current value based on a potential difference between the voltage value of the drive signal VOUT supplied to the input terminal and the voltage Vc as the voltage value of the signal supplied to the output terminal. In other words, the output switching circuit 252-4 draws the signal having the constant current value based on the potential difference between the voltage value of the drive signal VOUT and the voltage Vc. As a result, the output circuit 250 outputs the drive signal VOUT having the voltage value decreasing from the voltage Vh3 toward the voltage Vc. Then, when the voltage value of the drive signal VOUT supplied to the input terminal of the constant current circuit co4 becomes the voltage Vc, the constant current circuit co4 stops outputting the signal having the constant current value. This makes the voltage value of the drive signal VOUT output by the output circuit 250 constant at the voltage Vc.

When the latch signal LAT subsequently rises, the dot formation period cd ends. Accordingly, when the print data [SIH, SIL]=[1, 1] is input, the drive signal output circuit 200 generates the drive signal VOUT including the drive waveform DEP illustrated in FIG. 6 in the dot formation period cd, and then outputs the drive signal VOUT to the ejection unit 600 corresponding thereto. Here, as shown in FIG. 10, the timing at which the change signal CHA rises to define the end of the period pa1 corresponds to the time ta1 shown in FIG. 6, the timing at which the change signal CHA rises to define the end of the period pa2 corresponds to the time ta2 shown in FIG. 6, and the timing at which the change signal CHA rises to define the end of the period pa3 corresponds to the time ta3 shown in FIG. 6.

Figure 11:
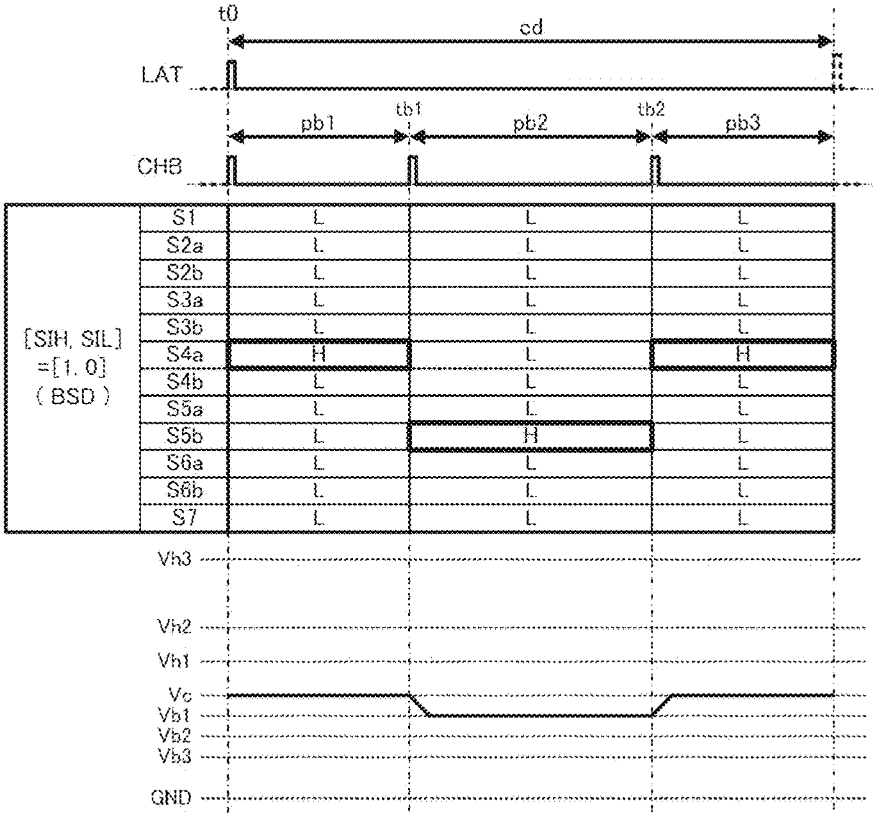
FIG. 11 is a diagram illustrating an example of the operation of the decoder and the signal waveform of the drive signal when the print data [SIH, SIL]=[1, 0] is input.

FIG. 11 is a diagram illustrating an example of the operation of the decoder 216 and the signal waveform of the drive signal VOUT when the print data [SIH, SIL]=[1, 0] is input. As illustrated in FIG. 11, when the latched signal LS including the print data [SIH, SIL]=[1, 0] is input, the decoder 216 generates the voltage selection signals S1, S2*a*, S2*b*, S3*a*, S3*b*, S4*a*, S4*b*, S5*a*, S5*b*, S6*a*, S6*b*, and S7 as the voltage selection signal S in a predetermined logic level in each of the periods pb1 to pb3 defined by the latch signal LAT and the change signal CHB, and then outputs the voltage selection signals S1, S2*a*, S2*b*, S3*a*, S3*b*, S4*a*, S4*b*, S5*a*, S5*b*, S6*a*, S6*b*, and S7 to the output circuit 250.

Specifically, when the latch signal LAT rises, the period pb1 starts. In the period pb1, the decoder 216 sets the logic level of the voltage selection signal S4*a* to be output to the H level and sets the rest to the L level. That is, in the period pb1, the switch sw4*a* provided to the output switching circuit 252-4 is controlled to make one end and the other end conductive. As a result, the output circuit 250 outputs the drive signal VOUT having the voltage value constant at the voltage Vc. Note that in the period pb1, the decoder 216 may set the logic level of the voltage selection signal S4*b* to be output to the H level, and may set the rest to the L level. That is, in the period pb1, the switch sw4*b* provided to the output switching circuit 252-4 may be controlled to make one end and the other end conductive.

Then, when the change signal CHB rises after the latch signal LAT rises, the period pb2 starts. In the period pb2, the decoder 216 sets the logic level of the voltage selection signal S5*b* to be output to the H level and sets the rest to the L level. That is, in the period pb2, the switch sw4*a* provided to the output switching circuit 252-4 is controlled to make one end and the other end non-conductive, and the switch sw5*b* provided to the output switching circuit 252-5 is controlled to make one end and the other end conductive. Therefore, the constant current circuit co5 outputs a signal having a constant current value based on a potential difference between the voltage value of the drive signal VOUT supplied to the input terminal and the voltage Vb1 supplied to the output terminal. In other words, the output switching circuit 252-5 draws the signal having the constant current value based on the potential difference between the voltage value of the drive signal VOUT and the voltage Vb1. As a result, the output circuit 250 outputs the drive signal VOUT having the voltage value decreasing from the voltage Vc toward the voltage Vb1. Then, when the voltage value of the drive signal VOUT supplied to the input terminal of the constant current circuit co5 becomes the voltage Vb1, the constant current circuit co5 stops outputting the signal having the constant current value. This makes the voltage value of the drive signal VOUT output by the output circuit 250 constant at the voltage Vb1.

Then, when the change signal CHB subsequently rises, the period pb3 starts. In the period pb3, the decoder 216 sets the logic level of the voltage selection signal S4*a* to be output to the H level and sets the rest to the L level. That is, in the period pb3, the switch sw5*b* provided to the output switching circuit 252-5 is controlled to make one end and the other end non-conductive, and the switch sw4*a* provided to the output switching circuit 252-4 is controlled to make one end and the other end conductive. Therefore, the constant current circuit ci4 outputs a signal having a constant current value based on a potential difference between the voltage Vb1 as the voltage value of the signal supplied to the input terminal and the voltage value of the drive signal VOUT supplied to the output terminal. In other words, the output switching circuit 252-4 outputs the signal having the constant current value based on the potential difference between the voltage Vc and the voltage value of the drive signal VOUT. As a result, the output circuit 250 outputs the drive signal VOUT having the voltage value rising from the voltage Vb1 toward the voltage Vc. Then, when the voltage value of the drive signal VOUT supplied to the output terminal of the constant current circuit ci4 becomes the voltage Vc, the constant current circuit ci4 stops outputting the signal having the constant current value. This makes the voltage value of the drive signal VOUT output by the output circuit 250 constant at the voltage Vc.

When the latch signal LAT subsequently rises, the dot formation period cd ends. Accordingly, when the print data [SIH, SIL]=[1, 0] is input, the drive signal output circuit 200 generates the drive signal VOUT including the drive waveform BSD illustrated in FIG. 6 in the dot formation period cd, and then outputs the drive signal VOUT to the ejection unit 600 corresponding thereto. Here, as illustrated in FIG. 11, the timing at which the change signal CHB rises to define the end of the period pb1 corresponds to the time tb1 illustrated in FIG. 6, and the timing at which the change signal CHB rises to define the end of the period pb2 corresponds to the time tb2 illustrated in FIG. 6.

Figure 12:
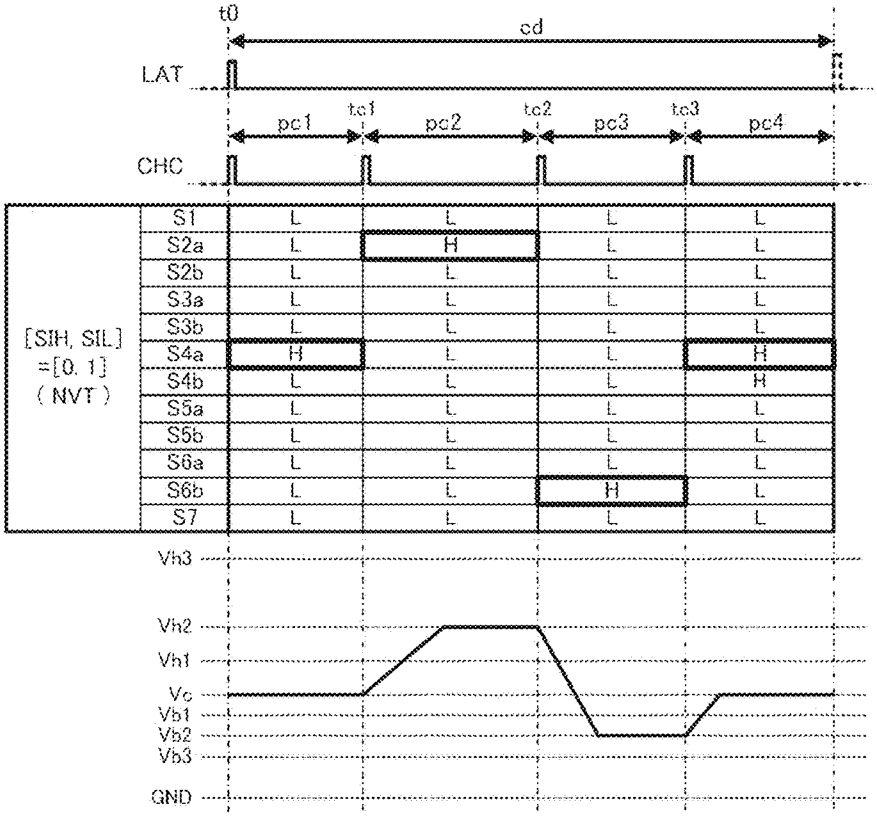
FIG. 12 is a diagram illustrating an example of the operation of the decoder and the signal waveform of the drive signal when the print data [SIH, SIL]=[0, 1] is input.

FIG. 12 is a diagram illustrating an example of the operation of the decoder 216 and the signal waveform of the drive signal VOUT when the print data [SIH, SIL]=[0, 1] is input. As illustrated in FIG. 12, when the latched signal LS including the print data [SIH, SIL]=[0, 1] is input, the decoder 216 generates the voltage selection signals S1, S2*a*, S2*b*, S3*a*, S3*b*, S4*a*, S4*b*, S5*a*, S5*b*, S6*a*, S6*b*, and S7 as the voltage selection signal S in a predetermined logic level in each of the periods pc1 to pc4 defined by the latch signal LAT and the change signal CHC, and then outputs the voltage selection signals S1, S2*a*, S2*b*, S3*a*, S3*b*, S4*a*, S4*b*, S5*a*, S5*b*, S6*a*, S6*b*, and S7 to the output circuit 250.

Specifically, when the latch signal LAT rises, the period pc1 starts. In the period pc1, the decoder 216 sets the logic level of the voltage selection signal S4*a* to be output to the H level and sets the rest to the L level. That is, in the period pc1, the switch sw4*a* provided to the output switching circuit 252-4 is controlled to make one end and the other end conductive. As a result, the output circuit 250 outputs the drive signal VOUT having the voltage value constant at the voltage Vc. Note that in the period pc1, the decoder 216 may set the logic level of the voltage selection signal S4*b* to be output to the H level, and may set the rest to the L level. That is, in the period pc1, the switch sw4*b* provided to the output switching circuit 252-4 may be controlled to make one end and the other end conductive.

Then, when the change signal CHC rises after the latch signal LAT rises, the period pc2 starts. In the period pc2, the decoder 216 sets the logic level of the voltage selection signal S2*a* to be output to the H level and sets the rest to the L level. That is, in the period pc2, the switch sw4*a* provided to the output switching circuit 252-4 is controlled to make one end and the other end non-conductive, and the switch sw2*a* provided to the output switching circuit 252-2 is controlled to make one end and the other end conductive. Therefore, the constant current circuit ci2 outputs a signal having a constant current value based on a potential difference between the voltage Vh2 supplied to the input terminal and the voltage value of the drive signal VOUT supplied to the output terminal. In other words, the output switching circuit 252-2 outputs the signal having the constant current value based on the potential difference between the voltage Vh2 and the voltage value of the drive signal VOUT. As a result, the output circuit 250 outputs the drive signal VOUT having the voltage value rising from the voltage Vc toward the voltage Vh2. Then, when the voltage value of the drive signal VOUT supplied to the input terminal of the constant current circuit ci2 becomes the voltage Vh2, the constant current circuit ci2 stops outputting the signal having the constant current value. This makes the voltage value of the drive signal VOUT output by the output circuit 250 constant at the voltage Vh2.

Then, when the change signal CHC subsequently rises, the period pc3 starts. In the period pc3, the decoder 216 sets the logic level of the voltage selection signal S6*b* to be output to the H level and sets the rest to the L level. That is, in the period pc3, the switch sw2*a* provided to the output switching circuit 252-2 is controlled to make one end and the other end non-conductive, and the switch sw6*b* provided to the output switching circuit 252-6 is controlled to make one end and the other end conductive. Therefore, the constant current circuit co6 outputs a signal having a constant current value based on a potential difference between the voltage value of the drive signal VOUT supplied to the input terminal and the voltage Vb2 as a voltage value supplied to the output terminal. In other words, the output switching circuit 252-6 draws the signal having the constant current value based on the potential difference between the voltage value of the drive signal VOUT and the voltage Vb2. As a result, the output circuit 250 outputs the drive signal VOUT having the voltage value decreasing from the voltage Vh2 toward the voltage Vb2. Then, when the voltage value of the drive signal VOUT supplied to the output terminal of the constant current circuit co6 becomes the voltage Vb2, the constant current circuit co6 stops outputting the signal having the constant current value. This makes the voltage value of the drive signal VOUT output by the output circuit 250 constant at the voltage Vb2.

Then, when the change signal CHC subsequently rises, the period pc4 starts. In the period pc4, the decoder 216 sets the logic level of the voltage selection signal S4*a* to be output to the H level and sets the rest to the L level. That is, in the period pc4, the switch sw6*b* provided to the output switching circuit 252-6 is controlled to make one end and the other end non-conductive, and the switch sw4*a* provided to the output switching circuit 252-4 is controlled to make one end and the other end conductive. Therefore, the constant current circuit ci4 outputs a signal having a constant current value based on a potential difference between the voltage Vc as the voltage value supplied to the input terminal and the voltage value of the drive signal VOUT supplied to the output terminal. In other words, the output switching circuit 252-4 outputs the signal having the constant current value based on the potential difference between the voltage Vb2 and the voltage value of the drive signal VOUT. As a result, the output circuit 250 outputs the drive signal VOUT having the voltage value rising from the voltage Vb2 toward the voltage Vc. Then, when the voltage value of the drive signal VOUT supplied to the output terminal of the constant current circuit ci4 becomes the voltage Vc, the constant current circuit ci4 stops outputting the signal having the constant current value. This makes the voltage value of the drive signal VOUT output by the output circuit 250 constant at the voltage Vc.

When the latch signal LAT subsequently rises, the dot formation period cd ends. Accordingly, when the print data [SIH, SIL]=[0, 1] is input, the drive signal output circuit 200 generates the drive signal VOUT including the drive waveform NVT illustrated in FIG. 6 in the dot formation period cd, and outputs the drive signal VOUT to the ejection unit 600 corresponding thereto. Here, as shown in FIG. 12, the timing at which the change signal CHC rises to define the end of the period pc1 corresponds to the time tc1 shown in FIG. 6, the timing at which the change signal CHC rises to define the end of the period pc2 corresponds to the time tc2 shown in FIG. 6, and the timing at which the change signal CHC rises to define the end of the period pc3 corresponds to the time tc3 shown in FIG. 6.

Figure 13:
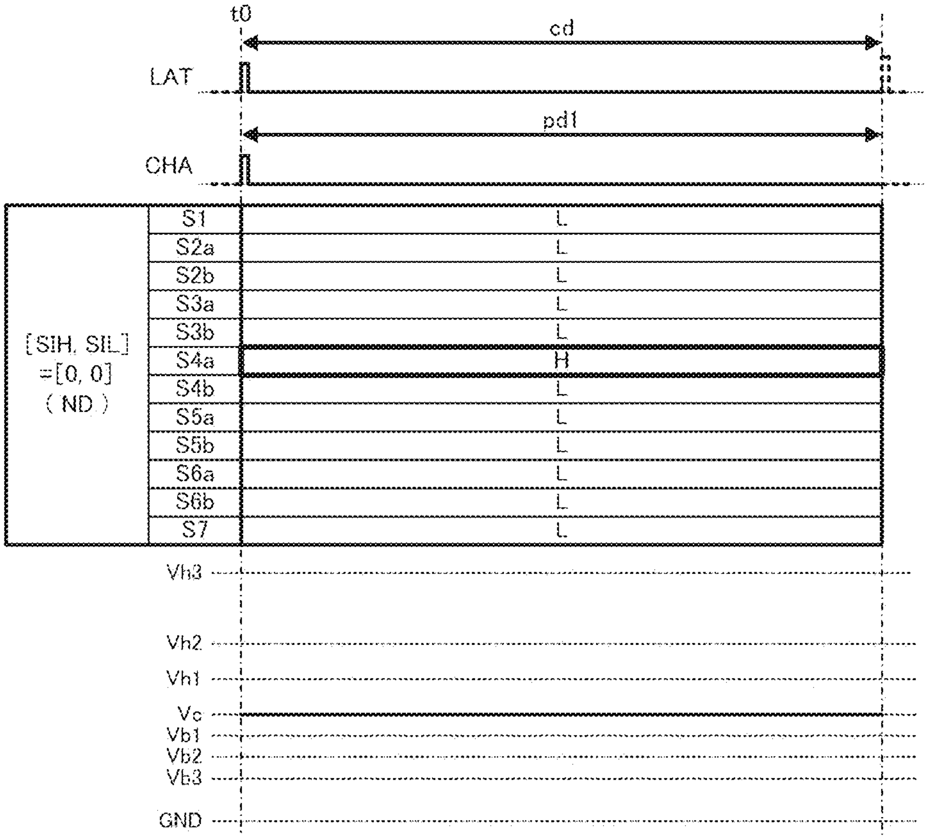
FIG. 13 is a diagram illustrating an example of the operation of the decoder and the signal waveform of the drive signal when the print data [SIH, SIL]=[0, 0] is input.

FIG. 13 is a diagram illustrating an example of the operation of the decoder 216 and the signal waveform of the drive signal VOUT when the print data [SIH, SIL]=[0, 0] is input. As illustrated in FIG. 13, when the latched signal LS including the print data [SIH, SIL]=[0, 0] is input, the decoder 216 generates the voltage selection signals S1, S2*a*, S2*b*, S3*a*, S3*b*, S4*a*, S4*b*, S5*a*, S5*b*, S6*a*, S6*b*, and S7 as the voltage selection signal S in a predetermined logic level in the period pd1 defined by the latch signal LAT and the change signal CHD, and then outputs the voltage selection signals S1, S2*a*, S2*b*, S3*a*, S3*b*, S4*a*, S4*b*, S5*a*, S5*b*, S6*a*, S6*b*, and S7 to the output circuit 250.

Specifically, when the latch signal LAT rises, the period pd1 starts. In the period pd1, the decoder 216 sets the logic level of the voltage selection signal S4*a* to be output to the H level and sets the rest to the L level. That is, in the period pd1, the switch sw4*a* provided to the output switching circuit 252-4 is controlled to make one end and the other end conductive. As a result, the output circuit 250 outputs the drive signal VOUT having the voltage value constant at the voltage Vc. Note that in the period pd1, the decoder 216 may set the logic level of the voltage selection signal S4*b* to be output to the H level, and may set the rest to the L level. That is, in the period pd1, the switch sw4*b* provided to the output switching circuit 252-4 may be controlled to make one end and the other end conductive.

When the latch signal LAT subsequently rises, the dot formation period cd ends. Accordingly, when the print data [SIH, SIL]=[0, 0] is input, the drive signal output circuit 200 generates the drive signal VOUT including the drive waveform ND in the dot formation period cd, and outputs the drive signal VOUT to the ejection unit 600 corresponding thereto.

As described above, the drive signal output circuit 200 in the first embodiment selects or deselects each of the drive voltage signals VHV1, VHV2, VHV3, VCV, VBV1, VBV2, and VBV3 as the drive voltage signal VDRV based on the latch signal LAT, the change signal CH, the clock signal SCK, the print data signal SI, and the waveform selection signal WS to thereby generate the drive signal VOUT corresponding to the voltage values of the drive waveforms DEP, BSD, NVT, and ND and then output the drive signal VOUT to the ejection unit 600 corresponding thereto.

1.5 Functions and Advantages

In the liquid ejection apparatus 1 and the head unit 20 according to the first embodiment configured as described above, the drive signal output circuit 200 includes the output switching circuit 252-1 that outputs a signal having a constant current value based on the drive voltage signal VHV3 the voltage value of which is the voltage Vh3, the output switching circuit 252-2 that outputs a signal having a constant current value based on the drive voltage signal VHV2 the voltage value of which is the voltage Vh2, the output switching circuit 252-3 that outputs a signal having a constant current value based on the drive voltage signal VHV1 the voltage value of which is the voltage Vh1, the output switching circuit 252-4 that outputs a signal having a constant current value based on the drive voltage signal VCV the voltage value of which is the voltage Vc, the output switching circuit 252-5 that outputs a signal having a constant current value based on the drive voltage signal VBV1 the voltage value of which is the voltage Vb1, the output switching circuit 252-6 that outputs a signal having a constant current value based on the drive voltage signal VBV2 the voltage value of which is the voltage Vb2, the output switching circuit 252-7 that outputs a signal having a constant current value based on the drive voltage signal VBV3 the voltage value of which is the voltage Vb3, and the waveform selection control circuit 210 for controlling the output switching circuits 252-1 to 252-7 based on the print data signal SI.

Further, the drive signal output circuit 200 outputs the drive signal VOUT corresponding to the signal having a constant current value based on the drive voltage signal VHV3 output by the output switching circuit 252-1, the signal having a constant current value based on the drive voltage signal VHV2 output by the output switching circuit 252-2, the signal having a constant current value based on the drive voltage signal VHV1 output by the output switching circuit 252-3, the signal having a constant current value based on the drive voltage signal VCV output by the output switching circuit 252-4, the voltage signal VBV1 output by the output switching circuit 252-5, the signal having a constant current value based on the drive voltage signal VBV2 output by the output switching circuit 252-6, and the signal having a constant current value based on the drive voltage signal VBV3 output by the output switching circuit 252-7.

That is, the drive signal output circuit 200 generates the drive signal VOUT the voltage value of which varies among the voltages Vh3, Vh2, Vh1, Vc, Vb1, Vh2, and Vb3 by each of the output switching circuits 252-1 to 252-7 selecting each of the drive voltage signals VHV3, VHV2, VHV1, VCV, VBV1, VBV2, and VBV3, and then outputs the drive signal VOUT to the ejection unit 600. Thus, in the liquid ejection apparatus 1 and the head unit 20, it is not necessary to use an amplifier circuit such as a class-D amplifier or a class-AB amplifier for driving the piezoelectric element 60, and it is possible to realize a reduction in size of the head unit 20 and the liquid ejection apparatus 1.

Further, in the liquid ejection apparatus 1 and the head unit 20 according to the first embodiment, the drive signal output circuit 200 outputs the drive signal VOUT the voltage value of which varies among the voltages Vh3, Vh2, Vh1, Vc, Vb1, Vh2, and Vb3 to each of the ejection units 600[1] to 600[*n*] by each of the output switching circuits 252-1 to 252-7 selecting each of the drive voltage signals VHV3, VHV2, VHV1, VCV, VBV1, VBV2, and VBV3. Therefore, in the liquid ejection apparatus 1 and the head unit 20 according to the first embodiment, it is not necessary to use an amplifier circuit such as a class-D amplifier that performs a switching operation or a class-AB amplifier through which a high current flows, and a loss in the liquid ejection apparatus 1 and the head unit 20 is reduced. As a result, the power consumption in the liquid ejection apparatus 1 and the head unit 20 is reduced.

Further, due to the reduction of the power consumption in the drive signal output circuit 200, the generation of heat in the drive signal output circuit 200 is reduced. This reduces the possibility that the characteristics of the ink stored in the print head 21 change due to the influence of the heat generated by the drive signal output circuit 200. Therefore, in the liquid ejection apparatus 1 and the head unit 20 according to the first embodiment, the drive signal output circuit 200 that outputs the drive signal VOUT can be provided in the vicinity of the ejection unit 600 and on the flexible wiring board 400 that propagates various signals to the ejection unit 600. As a result, the propagation distance at which the drive signal VOUT is propagated between the drive signal output circuit 200 and the ejection unit 600 can be shortened, and the possibility that distortion occurs in the signal waveform of the drive signal VOUT due to the influence of the impedance of the propagation path in which the drive signal VOUT is propagated is reduced. Therefore, the waveform accuracy of the drive signal VOUT supplied to the ejection unit 600 is improved, and the ejection accuracy of the ink ejected from the ejection unit 600 is improved.

Further, since the drive signal output circuit 200 for outputting the drive signal VOUT can be arranged in such vicinity of the ejection unit 600 as on the flexible wiring board 400, the difference between the propagation distance at which the drive signal VOUT[1] output by the drive signal output circuit 200 is propagated to the ejection unit 600[1] and the propagation distance at which the drive signal VOUT[2] output by the drive signal output circuit 200 is propagated to the ejection unit 600[2] is reduced to thereby make it possible to make the propagation distances substantially equal to each other. This reduces the possibility that a signal delay occurs between the drive signal VOUT[1] supplied to the ejection unit 600[1] and the drive signal VOUT[2] supplied to the ejection unit 600[2]. As a result, the ejection accuracy of the ink from the print head 21 including the ejection units 600[1] and 600[2] is improved.

Further, in the liquid ejection apparatus 1 and the head unit 20 according to the first embodiment, the drive signal output circuit 200 outputs the drive signal VOUT corresponding to the signal having a constant current value based on the drive voltage signal VHV3 output by the output switching circuit 252-1, the signal having a constant current value based on the drive voltage signal VHV2 output by the output switching circuit 252-2, the signal having a constant current value based on the drive voltage signal VHV1 output by the output switching circuit 252-3, the signal having a constant current value based on the drive voltage signal VCV output by the output switching circuit 252-4, the signal having a constant current value based on the drive voltage signal VBV1 output by the output switching circuit 252-5, the signal having a constant current value based on the drive voltage signal VBV2 output by the output switching circuit 252-6, and the signal having a constant current value based on the drive voltage signal VBV3 output by the output switching circuit 252-7. That is, the drive signal VOUT controlled to have a constant current value is supplied to the piezoelectric element 60 which is a capacitive load. This reduces the possibility that the distortion occurs in the signal waveform of the drive signal VOUT due to the capacitance component of the piezoelectric element 60 when the voltage value of the drive signal VOUT changes. Therefore, the waveform accuracy of the drive signal VOUT supplied to the ejection unit 600 is improved, and the ejection accuracy of the ink ejected from the ejection unit 600 is improved.

1.6 Modified Examples

In the liquid ejection apparatus 1 according to the first embodiment described above, there is presented the description assuming that the output switching circuit 252-1 provided to the output circuit 250 has a single set of the switch sw1*a* and the constant current circuit ci1 for outputting the signal having a constant current value based on the voltage Vh3 which is the voltage value of the drive voltage signal VHV3 and the voltage value of the drive signal VOUT to the ejection unit 600, but the output switching circuit 252-1 may have a plurality of sets of the switch sw1*a* and the constant current circuit ci1 for outputting the signal having a constant current value based on the voltage Vh3 and the voltage value of the drive signal VOUT to the ejection unit 600.

Similarly, the output switching circuit 252-2 may include a plurality of sets of the switch sw2*a* and the constant current circuit ci2 for outputting the signal having a constant current value based on the voltage Vh2 as the voltage value of the drive voltage signal VHV2 and the voltage value of the drive signal VOUT to the ejection unit 600, the output switching circuit 252-3 may include a plurality of sets of the switch sw3*a* and the constant current circuit ci3 for outputting the signal having a constant current value based on the voltage Vh1 as the voltage value of the drive voltage signal VHV1 and the voltage value of the drive signal VOUT to the ejection unit 600, the output switching circuit 252-4 may include a plurality of sets of the switch sw4*a* and the constant current circuit ci4 for outputting the signal having a constant current value based on the voltage Vc as the voltage value of the drive voltage signal VCV and the voltage value of the drive signal VOUT to the ejection unit 600, the output switching circuit 252-5 may include a plurality of sets of the switch sw5*a* and the constant current circuit ci5 for outputting the signal having a constant current value based on the voltage Vb1 as the voltage value of the drive voltage signal VBV1 and the voltage value of the drive signal VOUT to the ejection unit 600, and the output switching circuit 252-6 may include a plurality of sets of the switch sw6*a* and the constant current circuit ci6 for outputting the signal having a constant current value based on the voltage Vb2 as the voltage value of the drive voltage signal VBV2 and the voltage value of the drive signal VOUT to the ejection unit 600.

Further, in the liquid ejection apparatus 1 according to the first embodiment described above, there is presented the description assuming that the output switching circuit 252-2 provided to the output circuit 250 includes a single set of the switch sw2*b* and the constant current circuit co2 for drawing the signal having a constant current value based on the voltage Vh2 which is the voltage value of the drive voltage signal VHV2 and the voltage value of the drive signal VOUT from the ejection unit 600, but the output switching circuit 252-2 may include a plurality of sets of the switch sw2*b* and the constant current circuit co2 for drawing the signal having a constant current value based on the voltage Vh2 and the voltage value of the drive signal VOUT from the ejection unit 600.

Similarly, the output switching circuit 252-3 may include a plurality of sets of the switch sw3*b* and the constant current circuit co3 for drawing the signal having a constant current value based on the voltage Vh1 as the voltage value of the drive voltage signal VHV1 and the voltage value of the drive signal VOUT from the ejection unit 600, the output switching circuit 252-4 may include a plurality of sets of the switch sw4*b* and the constant current circuit co4 for drawing the signal having a constant current value based on the voltage Vc as the voltage value of the drive voltage signal VCV and the voltage value of the drive signal VOUT from the ejection unit 600, the output switching circuit 252-5 may include a plurality of sets of the switch sw5*b* and the constant current circuit co5 for drawing the signal having a constant current value based on the voltage Vb1 as the voltage value of the drive voltage signal VBV1 and the voltage value of the drive signal VOUT from the ejection unit 600, the output switching circuit 252-6 may include a plurality of sets of the switch sw6*b* and the constant current circuit co6 for drawing the signal having a constant current value based on the voltage Vb2 as the voltage value of the drive voltage signal VBV2 and the voltage value of the drive signal VOUT from the ejection unit 600, and the output switching circuit 252-7 may include a plurality of sets of the switch sw7*b* and the constant current circuit co7 for drawing the signal having a constant current value based on the voltage Vb3 as the voltage value of the drive voltage signal VBV3 and the voltage value of the drive signal VOUT from the ejection unit 600.

Figure 14:
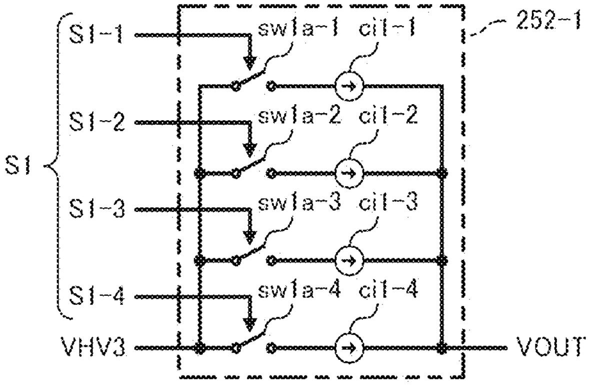
FIG. 14 is a diagram illustrating an example of a configuration of an output switching circuit 252-1 in a modified example.

A specific example of the configuration of the liquid ejection apparatus 1 in the modified example will be described. FIG. 14 is a diagram illustrating an example of the configuration of the output switching circuit 252-1 in the modified example. As illustrated in FIG. 14, the output switching circuit 252-1 in the modified example includes switches sw1*a*-1 to sw1*a*-4 and constant current circuits ci1-1 to ci1-4. Further, voltage selection signals S1-1, S1-2, S1-3, and S1-4 as the voltage selection signal S1 and the drive voltage signal VHV3 are input to the output switching circuit 252-1 in the modified example.

The voltage selection signal S1-1 is input to a control terminal of the switch sw1*a*-1. The voltage selection signal S1-2 is input to a control terminal of the switch sw1*a*-2. The voltage selection signal S1-3 is input to a control terminal of the switch sw1*a*-3. The voltage selection signal S1-4 is input to a control terminal of the switch sw1*a*-4. The drive voltage signal VHV3 is input to one ends of the switches sw1*a*-1 to sw1*a*-4. The other end of the switch sw1*a*-1 is electrically coupled to an input terminal of the constant current circuit ci1-1. The other end of the switch sw1*a*-2 is electrically coupled to an input terminal of the constant current circuit ci1-2. The other end of the switch sw1*a*-3 is electrically coupled to an input terminal of the constant current circuit ci1-3. The other end of the switch sw1*a*-4 is electrically coupled to an input terminal of the constant current circuit ci1-4.

In the output switching circuit 252-1 in the modified example configured as described above, when the voltage selection signal S1-1 at the H level is input to the control terminal of the switch sw1*a*-1, the switch sw1*a*-1 is controlled to make one end and the other end conductive. This supplies the input terminal of the constant current circuit ci1-1 with the drive voltage signal VHV3, and the constant current circuit ci1-1 outputs, from an output terminal, a signal constant in current value based on the voltage Vh3 supplied to the input terminal, and the voltage value at the output terminal.

When the voltage selection signal S1-2 at the H level is input to the control terminal of the switch sw1*a*-2, the switch sw1*a*-2 is controlled to make the one end and the other end conductive. This supplies the input terminal of the constant current circuit ci1-2 with the drive voltage signal VHV3, and the constant current circuit ci1-2 outputs, from an output terminal, a signal constant in current value based on the voltage Vh3 supplied to the input terminal, and the voltage value at the output terminal.

When the voltage selection signal S1-3 at the H level is input to the control terminal of the switch sw1*a*-3, the switch sw1*a*-3 is controlled to make the one end and the other end conductive. This supplies the input terminal of the constant current circuit ci1-3 with the drive voltage signal VHV3, and the constant current circuit ci1-3 outputs, from an output terminal, a signal constant in current value based on the voltage Vh3 supplied to the input terminal, and the voltage value at the output terminal.

When the voltage selection signal S1-4 at the H level is input to the control terminal of the switch sw1*a*-4, the switch sw1*a*-4 is controlled to make the one end and the other end conductive. This supplies the input terminal of the constant current circuit ci1-4 with the drive voltage signal VHV3, and the constant current circuit ci1-4 outputs, from an output terminal, a signal constant in current value based on the voltage Vh3 supplied to the input terminal, and the voltage value at the output terminal.

That is, in the output switching circuit 252-1 in the modified example, a set of the switch sw1*a*-1 and the constant current circuit ci1-1, a set of the switch sw1*a*-2 and the constant current circuit ci1-2, a set of the switch sw1*a*-3 and the constant current circuit ci1-3, and a set of the switch sw1*a*-4 and the constant current circuit ci1-4 are coupled in parallel to each other between a wiring pattern to which the drive voltage signal VHV3 is supplied and a wiring pattern from which the drive signal VOUT is output. Further, by individually switching the conduction states of the switches sw1*a*-1 to sw1*a*-4 based on the logic levels of the voltage selection signals S1-1 to S1-4, whether the output switching circuit 252-1 in the modified example outputs the signal having a constant current value based on the voltage Vh3 and the voltage value of the output terminal is switched.

Here, in the following description, the voltage selection signal S1-1 input to the control terminal of the switch sw1*a*-1, the voltage selection signal S1-2 input to the control terminal of the switch sw1*a*-2, the voltage selection signal S1-3 input to the control terminal of the switch sw1*a*-3, and the voltage selection signal S1-4 input to the control terminal of the switch sw1*a*-4 may be collectively referred to as voltage selection signals S1 [S1-1, S1-2, S1-3, S1-4] in some cases.

When the voltage selection signals S1 [S1-1, S1-2, S1-3, S1-4]=[H, L, L, L] are input to the output switching circuit 252-1 in the modified example configured as described above, the switch sw1*a*-1 is controlled to make one end and the other end conductive, and the switches sw1*a*-2 to sw1*a*-4 are controlled to make one end and the other end non-conductive. On this occasion, the output switching circuit 252-1 outputs the signal constant at a current value defined by the constant current circuit ci1-1 based on the voltage Vh3 and the voltage value at the output terminal to the ejection unit 600.

Further, when the voltage selection signals S1 [S1-1, S1-2, S1-3, S1-4]=[H, H, L, L] are input to the output switching circuit 252-1 in the modified example, the switches sw1*a*-1, sw1*a*-2 are controlled to make one end and the other end conductive, and the switches sw1*a*-3, sw1*a*-4 are controlled to make one end and the other end non-conductive. On this occasion, based on the voltage Vh3 and the voltage value at the output terminal, the output switching circuit 252-1 outputs a signal constant at a current value as a sum of the current value defined by the constant current circuit ci1-1 and the current value defined by the constant current circuit ci1-2 to the ejection unit 600.

Further, when the voltage selection signals S1 [S1-1, S1-2, S1-3, S1-4]=[H, H, H, L] are input to the output switching circuit 252-1 in the modified example, the switches sw1*a*-1 to sw1*a*-3 are controlled to make one end and the other end conductive, and the switch sw1*a*-4 is controlled to make one end and the other end non-conductive. On this occasion, based on the voltage Vh3 and the voltage value at the output terminal, the output switching circuit 252-1 outputs a signal constant at a current value as a sum of the current value defined by the constant current circuit ci1-1, the current value defined by the constant current circuit ci1-2, and the current value defined by the constant current circuit ci1-3 to the ejection unit 600.

Further, when the voltage selection signals S1 [S1-1, S1-2, S1-3, S1-4]=[H, H, H, H] are input to the output switching circuit 252-1 in the modified example, the switches sw1*a*-1 to sw1*a*-4 are controlled to make one end and the other end conductive. On this occasion, based on the voltage Vh3 and the voltage value at the output terminal, the output switching circuit 252-1 outputs a signal constant at a current value as a sum of the current value defined by the constant current circuit ci1-1, the current value defined by the constant current circuit ci1-2, the current value defined by the constant current circuit ci1-3, and the current value defined by the constant current circuit ci1-4 to the ejection unit 600.

This makes it possible for the output switching circuit 252-1 in the modified example to control the current value to be output to the ejection unit 600 in accordance with the logic levels of the voltage selection signals S1 [S1-1, S1-2, S1-3, S1-4] as the voltage selection signal S output by the waveform selection control circuit 210. Here, the switch sw1*a*-1 and the constant current circuit ci1-1 may be configured with individual circuit elements, or may be configured with a single circuit element. Similarly, each of sets of the switch sw1*a*-2 and the constant current circuit ci1-2, the switch sw1*a*-3 and the constant current circuit ci1-3, and the switch sw1*a*-4 and the constant current circuit ci1-4 may be configured with individual circuit elements, or may be configured with a single circuit element.

That is, the output switching circuit 252-1 in the modified example includes the constant current circuit ci1-1 one end of which is supplied with the drive voltage signal VHV3, the other end of which is electrically coupled to the piezoelectric element 60 provided to the ejection unit 600, and which outputs the signal having a constant current value based on the drive voltage signal VHV3, the constant current circuit ci1-2 one end of which is supplied with the drive voltage signal VHV3, the other end of which is electrically coupled to the piezoelectric element 60 provided to the ejection unit 600, and which outputs the signal having a constant current value based on the drive voltage signal VHV3, the constant current circuit ci1-3 one end of which is supplied with the drive voltage signal VHV3, the other end of which is electrically coupled to the piezoelectric element 60 provided to the ejection unit 600, and which outputs the signal having a constant current value based on the drive voltage signal VHV3, and the constant current circuit ci1-4 one end of which is supplied with the drive voltage signal VHV3, the other end of which is electrically coupled to the piezoelectric element 60 provided to the ejection unit 600, and which outputs the signal having a constant current value based on the drive voltage signal VHV3. Further, the current value output from the output switching circuit 252-1 in the modified example is controlled by the waveform selection control circuit 210 controlling whether the constant current circuit ci1-1 outputs the signal having a constant current value based on the drive voltage signal VHV3, whether the constant current circuit ci1-2 outputs the signal having a constant current value based on the drive voltage signal VHV3, whether the constant current circuit ci1-3 outputs the signal having a constant current value based on the drive voltage signal VHV3, and whether the constant current circuit ci1-4 outputs the signal having a constant current value based on the drive voltage signal VHV3, based on the print data signal SI.

Figure 15:
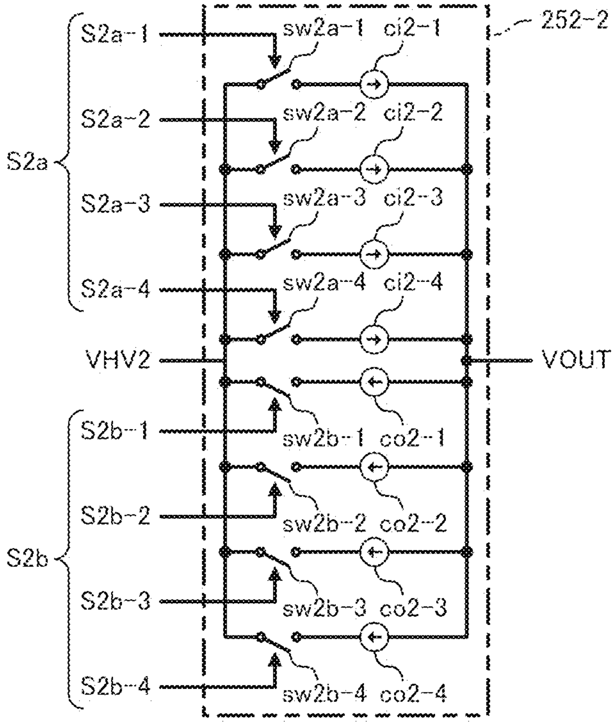
FIG. 15 is a diagram illustrating an example of a configuration of an output switching circuit 252-2 in the modified example.

FIG. 15 is a diagram illustrating an example of the configuration of the output switching circuit 252-2 according to the modified example. As illustrated in FIG. 15, the output switching circuit 252-2 in the modified example includes switches sw2a-1 to sw2a-4, sw2b-1 to sw2b-4 and constant current circuits ci2-1 to ci2-4, co2-1 to co2-4. Further, the voltage selection signals S2a-1, S2a-2, S2a-3, and S2a-4 as the voltage selection signal S2a, the voltage selection signals S2b-1, S2b-2, S2b-3, and S2b-4 as the voltage selection signal S2b, and the drive voltage signal VHV2 are input to the output switching circuit 252-2.

The voltage selection signal S2a-1 is input to a control terminal of the switch sw2a-1. The voltage selection signal S2a-2 is input to a control terminal of the switch sw2a-2. The voltage selection signal S2a-3 is input to a control terminal of the switch sw2a-3. The voltage selection signal S2a-4 is input to a control terminal of the switch sw2a-4. The voltage selection signal S2b-1 is input to a control terminal of the switch sw2b-1. The voltage selection signal S2b-2 is input to a control terminal of the switch sw2b-2. The voltage selection signal S2b-3 is input to a control terminal of the switch sw2b-3. The voltage selection signal S2b-4 is input to a control terminal of the switch sw2b-4. The drive voltage signal VHV2 is input to one ends of the switches sw2a-1 to sw2a-4, sw2b-1 to sw2b-4. The other end of the switch sw2a-1 is electrically coupled to an input terminal of the constant current circuit ci2-1. The other end of the switch sw2a-2 is electrically coupled to an input terminal of the constant current circuit ci2-2. The other end of the switch sw2a-3 is electrically coupled to an input terminal of the constant current circuit ci2-3. The other end of the switch sw2a-4 is electrically coupled to an input terminal of the constant current circuit ci2-4. The other end of the switch sw2b-1 is electrically coupled to an output terminal of the constant current circuit co2-1. The other end of the switch sw2b-2 is electrically coupled to an output terminal of the constant current circuit co2-2. The other end of the switch sw2b-3 is electrically coupled to an output terminal of the constant current circuit co2-3. The other end of the switch sw2b-4 is electrically coupled to an output terminal of the constant current circuit co2-4.

In the output switching circuit 252-2 in the modified example configured as described above, when the voltage selection signal S2a-1 at the H level is input to the control terminal of the switch sw2a-1, the switch sw2a-1 is controlled to make one end and the other end conductive. This supplies the input terminal of the constant current circuit ci2-1 with the drive voltage signal VHV2, and the constant current circuit ci2-1 outputs, from an output terminal, a signal constant in current value based on the voltage Vh2 supplied to the input terminal, and the voltage value at the output terminal.

When the voltage selection signal S2a-2 at the H level is input to the control terminal of the switch sw2a-2, the switch sw2a-2 is controlled to make the one end and the other end conductive. This supplies the input terminal of the constant current circuit ci2-2 with the drive voltage signal VHV2, and the constant current circuit ci2-2 outputs, from an output terminal, a signal constant in current value based on the voltage Vh2 supplied to the input terminal, and the voltage value of the output terminal.

When the voltage selection signal S2a-3 at the H level is input to the control terminal of the switch sw2a-3, the switch sw2a-3 is controlled to make the one end and the other end conductive. This supplies the input terminal of the constant current circuit ci2-3 with the drive voltage signal VHV2, and the constant current circuit ci2-3 outputs, from an output terminal, a signal constant in current value based on the voltage Vh2 supplied to the input terminal, and the voltage value at the output terminal.

When the voltage selection signal S2a-4 at the H level is input to the control terminal of the switch sw2a-4, the switch sw2a-4 is controlled to make the one end and the other end conductive. This supplies the input terminal of the constant current circuit ci2-4 with the drive voltage signal VHV2, and the constant current circuit ci2-4 outputs, from an output terminal, a signal constant in current value based on the voltage Vh2 supplied to the input terminal, and the voltage value at the output terminal.

When the voltage selection signal S2b-1 at the H level is input to the control terminal of the switch sw2b-1, the switch sw2b-1 is controlled to make the one end and the other end conductive. This supplies the output terminal of the constant current circuit co2-1 with the drive voltage signal VHV2, and the constant current circuit co2-1 outputs, from an output terminal, a signal constant in current value based on the voltage value at the input terminal, and the voltage Vh2 supplied to the output terminal.

When the voltage selection signal S2b-2 at the H level is input to the control terminal of the switch sw2b-2, the switch sw2b-2 is controlled to make the one end and the other end conductive. This supplies the output terminal of the constant current circuit co2-2 with the drive voltage signal VHV2, and the constant current circuit co2-2 outputs, from an output terminal, a signal constant in current value based on the voltage value at the input terminal, and the voltage Vh2 supplied to the output terminal.

When the voltage selection signal S2b-3 at the H level is input to the control terminal of the switch sw2b-3, the switch sw2b-3 is controlled to make the one end and the other end conductive. This supplies the output terminal of the constant current circuit co2-3 with the drive voltage signal VHV2, and the constant current circuit co2-3 outputs, from an output terminal, a signal constant in current value based on the voltage value at the input terminal, and the voltage Vh2 supplied to the output terminal.

When the voltage selection signal S2b-4 at the H level is input to the control terminal of the switch sw2b-4, the switch sw2b-4 is controlled to make the one end and the other end conductive. This supplies the output terminal of the constant current circuit co2-4 with the drive voltage signal VHV2, and the constant current circuit co2-4 outputs, from an output terminal, a signal constant in current value based on the voltage value at the input terminal, and the voltage Vh2 supplied to the output terminal.

That is, in the output switching circuit 252-2 in the modified example, a set of the switch sw2a-1 and the constant current circuit ci2-1, a set of the switch sw2a-2 and the constant current circuit ci2-2, a set of the switch sw2a-3 and the constant current circuit ci2-3, a set of the switch sw2a-4 and the constant current circuit ci2-4, a set of the switch sw2b-1 and the constant current circuit co2-1, a set of the switch sw2b-2 and the constant current circuit co2-2, a set of the switch sw2b-3 and the constant current circuit co2-3, and a set of the switch sw2b-4 and the constant current circuit co2-4 are coupled in parallel to each other between a wiring pattern to which the drive voltage signal VHV2 is supplied and the wiring pattern from which the drive signal VOUT is output.

Further, by individually switching the conduction states of the switches sw2a-1 to sw2a-4 based on the logic levels of the voltage selection signals S2a-1 to S2a-4, the output switching circuit 252-2 in the modified example switches whether to output the signal having a constant current value based on the voltage Vh2 and the voltage value at the output terminal, and by individually switching the conduction states of the switches sw2b-1 to sw2b-4 based on the logic levels of the voltage selection signals S2b-1 to S2b-4, the output switching circuit 252-2 in the modified example switches whether to draw the signal having a constant current value based on the voltage value at the input terminal and the voltage Vh2.

Here, in the following description, the voltage selection signal S2a-1 input to the control terminal of the switch sw2a-1, the voltage selection signal S2a-2 input to the control terminal of the switch sw2a-2, the voltage selection signal S2a-3 input to the control terminal of the switch sw2a-3, and the voltage selection signal S2a-4 input to the control terminal of the switch sw2a-4 may be collectively referred to as voltage selection signals S2a [S2a-1, S2a-2, S2a-3, S2a-4] in some cases. Similarly, the voltage selection signal S2b-1 input to the control terminal of the switch sw2b-1, the voltage selection signal S2b-2 input to the control terminal of the switch sw2b-2, the voltage selection signal S2b-3 input to the control terminal of the switch sw2b-3, and the voltage selection signal S2b-4 input to the control terminal of the switch sw2b-4 may be collectively referred to as voltage selection signals S2b [S2b-1, S2b-2, S2b-3, S2b-4] in some cases.

When the voltage selection signals S2a [S2a-1, S2a-2, S2a-3, S2a-4]=[H, L, L, L] are input to the output switching circuit 252-2 in the modified example configured as described above, the switch sw2a-1 is controlled to make one end and the other end conductive, and the switches sw2a-2 to sw2a-4 are controlled to make one end and the other end non-conductive. On this occasion, the output switching circuit 252-2 outputs the signal constant at a current value defined by the constant current circuit ci2-1 based on the voltage Vh2 and the voltage value at the output terminal to the ejection unit 600.

Further, when the voltage selection signals S2a [S2a-1, S2a-2, S2a-3, S2a-4]=[H, H, L, L] are input to the output switching circuit 252-2 in the modified example, the switches sw2a-1, sw2a-2 are controlled to make one end and the other end conductive, and the switches sw2a-3, sw2a-4 are controlled to make one end and the other end non-conductive. On this occasion, based on the voltage Vh2 and the voltage value at the output terminal, the output switching circuit 252-2 outputs a signal constant at a current value as a sum of the current value defined by the constant current circuit ci2-1 and the current value defined by the constant current circuit ci2-2 to the ejection unit 600.

Further, when the voltage selection signals S2a [S2a-1, S2a-2, S2a-3, S2a-4]=[H, H, H, L] are input to the output switching circuit 252-2 in the modified example, the switches sw2a-1 to sw2a-3 are controlled to make one end and the other end conductive, and the switch sw2a-4 is controlled to make one end and the other end non-conductive. On this occasion, based on the voltage Vh2 and the voltage value at the output terminal, the output switching circuit 252-2 outputs a signal constant at a current value as a sum of the current value defined by the constant current circuit ci2-1, the current value defined by the constant current circuit ci2-2, and the current value defined by the constant current circuit ci2-3 to the ejection unit 600.

Further, when the voltage selection signals S2a [S2a-1, S2a-2, S2a-3, S2a-4]=[H, H, H, H] are input to the output switching circuit 252-2 in the modified example, the switches sw2a-1 to sw2a-4 are controlled to make one end and the other end conductive. On this occasion, based on the voltage Vh2 and the voltage value at the output terminal, the output switching circuit 252-2 outputs a signal constant at a current value as a sum of the current value defined by the constant current circuit ci2-1, the current value defined by the constant current circuit ci2-2, the current value defined by the constant current circuit ci2-3, and the current value defined by the constant current circuit ci2-4 to the ejection unit 600.

Further, when the voltage selection signals S2b [S2b-1, S2b-2, S2b-3, S2b-4]=[H, L, L, L] are input to the output switching circuit 252-2 in the modified example, the switch sw2b-1 is controlled to make one end and the other end conductive, and the switches sw2b-2 to sw2b-4 are controlled to make one end and the other end non-conductive. On this occasion, the output switching circuit 252-2 draws the signal constant at a current value defined by the constant current circuit co2-1 based on the voltage value at the input terminal and the voltage Vh2 from the ejection unit 600.

Further, when the voltage selection signals S2b [S2b-1, S2b-2, S2b-3, S2b-4]=[H, H, L, L] are input to the output switching circuit 252-2 in the modified example, the switches sw2b-1, sw2b-2 are controlled to make one end and the other end conductive, and the switches sw2b-3, sw2b-4 are controlled to make one end and the other end non-conductive. On this occasion, the output switching circuit 252-2 draws a signal constant at a current value as a sum of a current value defined by the constant current circuit co2-1 and a current value defined by the constant current circuit co2-2 from the ejection unit 600 based on the voltage value at the input terminal and the voltage Vh2.

Further, when the voltage selection signals S2b [S2b-1, S2b-2, S2b-3, S2b-4]=[H, H, H, L] are input to the output switching circuit 252-2 in the modified example, the switches sw2b-1 to sw2b-3 are controlled to make one end and the other end conductive, and the switch sw2b-4 is controlled to make one end and the other end non-conductive. On this occasion, based on the voltage value at the input terminal and the voltage Vh2, the output switching circuit 252-2 draws a signal constant at a current value as a sum of the current value defined by the constant current circuit co2-1, the current value defined by the constant current circuit co2-2, and the current value defined by the constant current circuit co2-3 from the ejection unit 600.

Further, when the voltage selection signals S2b [S2b-1, S2b-2, S2b-3, S2b-4]=[H, H, H, H] are input to the output switching circuit 252-2 in the modified example, the switches sw2b-1 to sw2b-4 are controlled to make one end and the other end conductive. On this occasion, based on the voltage value at the input terminal and the voltage Vh2, the output switching circuit 252-2 draws a signal constant at a current value as a sum of the current value defined by the constant current circuit co2-1, the current value defined by the constant current circuit co2-2, the current value defined by the constant current circuit co2-3, and the current value defined by the constant current circuit co2-4 from the ejection unit 600.

Thus, the output switching circuit 252-2 in the modified example can control the current value to be output to the ejection unit 600 in accordance with the logic levels of the voltage selection signals S2*a* [S2*a*-1, S2*a*-2, S2*a*-3, S2*a*-4] as the voltage selection signal S output by the waveform selection control circuit 210, and can control the current value to be drawn from the ejection unit 600 in accordance with the logic levels of the voltage selection signals S2*b* [S2*b*-1, S2*b*-2, S2*b*-3, S2*b*-4] as the voltage selection signal S output by the waveform selection control circuit 210. Here, the switch sw2*a*-1 and the constant current circuit ci2-1 may be configured with individual circuit elements, or may be configured with a single circuit element. Similarly, each of sets of the switch sw2*a*-2 and the constant current circuit ci2-2, the switch sw2*a*-3 and the constant current circuit ci2-3, and the switch sw2*a*-4 and the constant current circuit ci2-4 may be configured with individual circuit elements, or may be configured with a single circuit element. Further, the switch sw2*b*-1 and the constant current circuit co2-1 may be configured with individual circuit elements, or may be configured with a single circuit element. Similarly, each of sets of the switch sw2*b*-2 and the constant current circuit co2-2, the switch sw2*b*-3 and the constant current circuit co2-3, and the switch sw2*b*-4 and the constant current circuit co2-4 may be configured with individual circuit elements, or may be configured with a single circuit element.

That is, the output switching circuit 252-2 in the modified example includes the constant current circuit ci2-1 one end of which is supplied with the drive voltage signal VHV2, the other end of which is electrically coupled to the piezoelectric element 60 provided to the ejection unit 600, and which outputs the signal having a constant current value based on the drive voltage signal VHV2, the constant current circuit ci2-2 one end of which is supplied with the drive voltage signal VHV2, the other end of which is electrically coupled to the piezoelectric element 60 provided to the ejection unit 600, and which outputs the signal having a constant current value based on the drive voltage signal VHV2, the constant current circuit ci2-3 one end of which is supplied with the drive voltage signal VHV2, the other end of which is electrically coupled to the piezoelectric element 60 provided to the ejection unit 600, and which outputs the signal having a constant current value based on the drive voltage signal VHV2, and the constant current circuit ci2-4 one end of which is supplied with the drive voltage signal VHV2, the other end of which is electrically coupled to the piezoelectric element 60 provided to the ejection unit 600, and which outputs the signal having a constant current value based on the drive voltage signal VHV2. Further, the current value output from the output switching circuit 252-2 in the modified example is controlled by the waveform selection control circuit 210 controlling whether the constant current circuit ci2-1 outputs the signal having a constant current value based on the drive voltage signal VHV2, whether the constant current circuit ci2-2 outputs the signal having a constant current value based on the drive voltage signal VHV2, whether the constant current circuit ci2-3 outputs the signal having a constant current value based on the drive voltage signal VHV2, and whether the constant current circuit ci2-4 outputs the signal having a constant current value based on the drive voltage signal VHV2, based on the print data signal SI.

Further, the output switching circuit 252-2 in the modified example includes the constant current circuit co2-1 one end of which is supplied with the drive voltage signal VHV2, the other end of which is electrically coupled to the piezoelectric element 60 provided to the ejection unit 600, and which outputs the signal having a constant current value based on the drive voltage signal VHV2, the constant current circuit co2-2 one end of which is supplied with the drive voltage signal VHV2, the other end of which is electrically coupled to the piezoelectric element 60 provided to the ejection unit 600, and which outputs the signal having a constant current value based on the drive voltage signal VHV2, the constant current circuit co2-3 one end of which is supplied with the drive voltage signal VHV2, the other end of which is electrically coupled to the piezoelectric element 60 provided to the ejection unit 600, and which outputs the signal having a constant current value based on the drive voltage signal VHV2, and the constant current circuit co2-4 one end of which is supplied with the drive voltage signal VHV2, the other end of which is electrically coupled to the piezoelectric element 60 provided to the ejection unit 600, and which outputs the signal having a constant current value based on the drive voltage signal VHV2. Further, the current value drawn to the output switching circuit 252-2 in the modified example is controlled by the waveform selection control circuit 210 controlling whether the constant current circuit co2-1 outputs the signal having a constant current value based on the drive voltage signal VHV2, whether the constant current circuit co2-2 outputs the signal having a constant current value based on the drive voltage signal VHV2, whether the constant current circuit co2-3 outputs the signal having a constant current value based on the drive voltage signal VHV2, and whether the constant current circuit co2-4 outputs the signal having a constant current value based on the drive voltage signal VHV2, based on the print data signal SI.

Here, the output switching circuits 252-3 to 252-6 in the modified example only differ in the signal input thereto and the signal output therefrom, and have substantially the same configuration as that of the output switching circuit 252-2 in the modified example. Therefore, the illustration of the configurations of the output switching circuits 252-3 to 252-6 in the modified example is omitted, and the description thereof is simplified.

The output switching 252-3 in the modified example includes a set of a switch sw3*a*-1 and a constant current circuit ci3-1, a set of a switch sw3*a*-2 and a constant current circuit ci3-2, a set of a switch sw3*a*-3 and a constant current circuit ci3-3, a set of a switch sw3*a*-4 and a constant current circuit ci3-4, a set of a switch sw3*b*-1 and a constant current circuit co3-1, a set of a switch sw3*b*-2 and a constant current circuit co3-2, a set of a switch sw3*b*-3 and a constant current circuit co3-3, and a set of a switch sw3*b*-4 and a constant current circuit co3-4 coupled in parallel to each other between a wiring pattern to which the drive voltage signal VHV1 is supplied and the wiring pattern from which the drive signal VOUT is output.

Further, the set of the switch sw3*a*-1 and the constant current circuit ci3-1, the set of the switch sw3*a*-2 and the constant current circuit ci3-2, the set of the switch sw3*a*-3 and the constant current circuit ci3-3, and the set of the switch sw3*a*-4 and the constant current circuit ci3-4 each switch whether to output a signal having a constant current value based on the voltage Vh1 and the voltage value at the output terminal from the output switching circuit 252-3 based on the logic levels of the voltage selection signals S3*a* [S3*a*-1, S3*a*-2, S3*a*-3, S3*a*-4] as the voltage selection signal S. Similarly, the set of the switch sw3*b*-1 and the constant current circuit co3-1, the set of the switch sw3*b*-2 and the constant current circuit co3-2, the set of the switch sw3*b*-3 and the constant current circuit co3-3, and the set of the switch sw3*b*-4 and the constant current circuit co3-4 each switch whether to draw a signal having a constant current value based on the voltage value at the input terminal and the voltage Vh1 into the output switching circuit 252-3 based on the logic levels of the voltage selection signals S3*b* [S3*b*-1, S3*b*-2, S3*b*-3, S3*b*-4] as the voltage selection signal S.

Therefore, the output switching circuit 252-3 in the modified example can control the current value to be output to the ejection unit 600 in accordance with the logic levels of the voltage selection signals S3*a* [S3*a*-1, S3*a*-2, S3*a*-3, S3*a*-4] as the voltage selection signal S output by the waveform selection control circuit 210, and can control the current value to be drawn from the ejection unit 600 in accordance with the logic levels of the voltage selection signals S3*b* [S3*b*-1, S3*b*-2, S3*b*-3, S3*b*-4] as the voltage selection signal S output by the waveform selection control circuit 210.

That is, the output switching circuit 252-3 in the modified example includes the constant current circuit ci3-1 one end of which is supplied with the drive voltage signal VHV1, the other end of which is electrically coupled to the piezoelectric element 60 provided to the ejection unit 600, and which outputs the signal having a constant current value based on the drive voltage signal VHV1, the constant current circuit ci3-2 one end of which is supplied with the drive voltage signal VHV1, the other end of which is electrically coupled to the piezoelectric element 60 provided to the ejection unit 600, and which outputs the signal having a constant current value based on the drive voltage signal VHV1, the constant current circuit ci3-3 one end of which is supplied with the drive voltage signal VHV1, the other end of which is electrically coupled to the piezoelectric element 60 provided to the ejection unit 600, and which outputs the signal having a constant current value based on the drive voltage signal VHV1, and the constant current circuit ci3-4 one end of which is supplied with the drive voltage signal VHV1, the other end of which is electrically coupled to the piezoelectric element 60 provided to the ejection unit 600, and which outputs the signal having a constant current value based on the drive voltage signal VHV1. Further, the current value output from the output switching circuit 252-3 in the modified example is controlled by the waveform selection control circuit 210 controlling whether the constant current circuit ci3-1 outputs the signal having a constant current value based on the drive voltage signal VHV1, whether the constant current circuit ci3-2 outputs the signal having a constant current value based on the drive voltage signal VHV1, whether the constant current circuit ci3-3 outputs the signal having a constant current value based on the drive voltage signal VHV1, and whether the constant current circuit ci3-4 outputs the signal having a constant current value based on the drive voltage signal VHV1, based on the print data signal SI.

Further, the output switching circuit 252-3 in the modified example includes the constant current circuit co3-1 one end of which is supplied with the drive voltage signal VHV1, the other end of which is electrically coupled to the piezoelectric element 60 provided to the ejection unit 600, and which outputs the signal having a constant current value based on the drive voltage signal VHV1, the constant current circuit co3-2 one end of which is supplied with the drive voltage signal VHV1, the other end of which is electrically coupled to the piezoelectric element 60 provided to the ejection unit 600, and which outputs the signal having a constant current value based on the drive voltage signal VHV1, the constant current circuit co3-3 one end of which is supplied with the drive voltage signal VHV1, the other end of which is electrically coupled to the piezoelectric element 60 provided to the ejection unit 600, and which outputs the signal having a constant current value based on the drive voltage signal VHV1, and the constant current circuit co3-4 one end of which is supplied with the drive voltage signal VHV1, the other end of which is electrically coupled to the piezoelectric element 60 provided to the ejection unit 600, and which outputs the signal having a constant current value based on the drive voltage signal VHV1. Further, the current value drawn to the output switching circuit 252-3 in the modified example is controlled by the waveform selection control circuit 210 controlling whether the constant current circuit co3-1 outputs the signal having a constant current value based on the drive voltage signal VHV1, whether the constant current circuit co3-2 outputs the signal having a constant current value based on the drive voltage signal VHV1, whether the constant current circuit co3-3 outputs the signal having a constant current value based on the drive voltage signal VHV1, and whether the constant current circuit co3-4 outputs the signal having a constant current value based on the drive voltage signal VHV1, based on the print data signal SI.

Here, the switch sw3*a*-1 and the constant current circuit ci3-1 may be configured with individual circuit elements, or may be configured with a single circuit element. Similarly, each of sets of the switch sw3*a*-2 and the constant current circuit ci3-2, the switch sw3*a*-3 and the constant current circuit ci3-3, and the switch sw3*a*-4 and the constant current circuit ci3-4 may be configured with individual circuit elements, or may be configured with a single circuit element. Further, the switch sw3*b*-1 and the constant current circuit co3-1 may be configured with individual circuit elements, or may be configured with a single circuit element. Similarly, each of sets of the switch sw3*b*-2 and the constant current circuit co3-2, the switch sw3*b*-3 and the constant current circuit co3-3, and the switch sw3*b*-4 and the constant current circuit co3-4 may be configured with individual circuit elements, or may be configured with a single circuit element.

Further, the output switching circuit 252-4 in the modified example includes a set of a switch sw4*a*-1 and a constant current circuit ci4-1, a set of a switch sw4*a*-2 and a constant current circuit ci4-2, a set of a switch sw4*a*-3 and a constant current circuit ci4-3, a set of a switch sw4*a*-4 and a constant current circuit ci4-4, a set of a switch sw4*b*-1 and a constant current circuit co4-1, a set of a switch sw4*b*-2 and a constant current circuit co4-2, a set of a switch sw4*b*-3 and a constant current circuit co4-3, and a set of a switch sw4*b*-4 and a constant current circuit co4-4 coupled in parallel to each other between a wiring pattern to which the drive voltage signal VCV is supplied and the wiring pattern from which the drive signal VOUT is output.

Further, the set of the switch sw4*a*-1 and the constant current circuit ci4-1, the set of the switch sw4*a*-2 and the constant current circuit ci4-2, the set of the switch sw4*a*-3 and the constant current circuit ci4-3, and the set of the switch sw4*a*-4 and the constant current circuit ci4-4 each switch whether to output a signal having a constant current value based on the voltage Vc and the voltage value at the output terminal from the output switching circuit 252-4 based on the logic levels of the voltage selection signals S4*a* [S4*a*-1, S4*a*-2, S4*a*-3, S4*a*-4] as the voltage selection signal S. Similarly, the set of the switch sw4*b*-1 and the constant current circuit co4-1, the set of the switch sw4*b*-2 and the constant current circuit co4-2, the set of the switch sw4*b*-3 and the constant current circuit co4-3, and the set of the switch sw4*b*-4 and the constant current circuit co4-4 each switch whether to draw a signal having a constant current value based on the voltage value at the input terminal and the voltage Vc into the output switching circuit 252-4 based on the logic levels of the voltage selection signals S4*b* [S4*b*-1, S4*b*-2, S4*b*-3, S4*b*-4] as the voltage selection signal S.

Therefore, the output switching circuit 252-4 in the modified example can control the current value to be output to the ejection unit 600 in accordance with the logic levels of the voltage selection signals S4*a* [S4*a*-1, S4*a*-2, S4*a*-3, S4*a*-4] as the voltage selection signal S output by the waveform selection control circuit 210, and can control the current value to be drawn from the ejection unit 600 in accordance with the logic levels of the voltage selection signals S4*b* [S4*b*-1, S4*b*-2, S4*b*-3, S4*b*-4] as the voltage selection signal S output by the waveform selection control circuit 210.

That is, the output switching circuit 252-4 in the modified example includes the constant current circuit ci4-1 one end of which is supplied with the drive voltage signal VCV, the other end of which is electrically coupled to the piezoelectric element 60 provided to the ejection unit 600, and which outputs the signal having a constant current value based on the drive voltage signal VCV, the constant current circuit ci4-2 one end of which is supplied with the drive voltage signal VCV, the other end of which is electrically coupled to the piezoelectric element 60 provided to the ejection unit 600, and which outputs the signal having a constant current value based on the drive voltage signal VCV, the constant current circuit ci4-3 one end of which is supplied with the drive voltage signal VCV, the other end of which is electrically coupled to the piezoelectric element 60 provided to the ejection unit 600, and which outputs the signal having a constant current value based on the drive voltage signal VCV, and the constant current circuit ci4-4 one end of which is supplied with the drive voltage signal VCV, the other end of which is electrically coupled to the piezoelectric element 60 provided to the ejection unit 600, and which outputs the signal having a constant current value based on the drive voltage signal VCV. Further, the current value output from the output switching circuit 252-4 in the modified example is controlled by the waveform selection control circuit 210 controlling whether the constant current circuit ci4-1 outputs the signal having a constant current value based on the drive voltage signal VCV, whether the constant current circuit ci4-2 outputs the signal having a constant current value based on the drive voltage signal VCV, whether the constant current circuit ci4-3 outputs the signal having a constant current value based on the drive voltage signal VCV, and whether the constant current circuit ci4-4 outputs the signal having a constant current value based on the drive voltage signal VCV, based on the print data signal SI.

Further, the output switching circuit 252-4 in the modified example includes the constant current circuit co4-1 one end of which is supplied with the drive voltage signal VCV, the other end of which is electrically coupled to the piezoelectric element 60 provided to the ejection unit 600, and which outputs the signal having a constant current value based on the drive voltage signal VCV, the constant current circuit co4-2 one end of which is supplied with the drive voltage signal VCV, the other end of which is electrically coupled to the piezoelectric element 60 provided to the ejection unit 600, and which outputs the signal having a constant current value based on the drive voltage signal VCV, the constant current circuit co4-3 one end of which is supplied with the drive voltage signal VCV, the other end of which is electrically coupled to the piezoelectric element 60 provided to the ejection unit 600, and which outputs the signal having a constant current value based on the drive voltage signal VCV, and the constant current circuit co4-4 one end of which is supplied with the drive voltage signal VCV, the other end of which is electrically coupled to the piezoelectric element 60 provided to the ejection unit 600, and which outputs the signal having a constant current value based on the drive voltage signal VCV. Further, the current value drawn to the output switching circuit 252-4 in the modified example is controlled by the waveform selection control circuit 210 controlling whether the constant current circuit co4-1 outputs the signal having a constant current value based on the drive voltage signal VCV, whether the constant current circuit co4-2 outputs the signal having a constant current value based on the drive voltage signal VCV, whether the constant current circuit co4-3 outputs the signal having a constant current value based on the drive voltage signal VCV, and whether the constant current circuit co4-4 outputs the signal having a constant current value based on the drive voltage signal VCV, based on the print data signal SI.

Here, the switch sw4*a*-1 and the constant current circuit ci4-1 may be configured with individual circuit elements, or may be configured with a single circuit element. Similarly, each of sets of the switch sw4*a*-2 and the constant current circuit ci4-2, the switch sw4*a*-3 and the constant current circuit ci4-3, and the switch sw4*a*-4 and the constant current circuit ci4-4 may be configured with individual circuit elements, or may be configured with a single circuit element. Further, the switch sw4*b*-1 and the constant current circuit co4-1 may be configured with individual circuit elements, or may be configured with a single circuit element. Similarly, each of sets of the switch sw4*b*-2 and the constant current circuit co4-2, the switch sw4*b*-3 and the constant current circuit co4-3, and the switch sw4*b*-4 and the constant current circuit co4-4 may be configured with individual circuit elements, or may be configured with a single circuit element.

Further, the output switching circuit 252-5 in the modified example includes a set of a switch sw5*a*-1 and a constant current circuit ci5-1, a set of a switch sw5*a*-2 and a constant current circuit ci5-2, a set of a switch sw5*a*-3 and a constant current circuit ci5-3, a set of a switch sw5*a*-4 and a constant current circuit ci5-4, a set of a switch sw5*b*-1 and a constant current circuit co5-1, a set of a switch sw5*b*-2 and a constant current circuit co5-2, a set of a switch sw5*b*-3 and a constant current circuit co5-3, and a set of a switch sw5*b*-4 and a constant current circuit co5-4 coupled in parallel to each other between a wiring pattern to which the drive voltage signal VBV1 is supplied and the wiring pattern from which the drive signal VOUT is output.

Further, the set of the switch sw5*a*-1 and the constant current circuit ci5-1, the set of the switch sw5*a*-2 and the constant current circuit ci5-2, the set of the switch sw5*a*-3 and the constant current circuit ci5-3, and the set of the switch sw5*a*-4 and the constant current circuit ci5-4 each switch whether to output a signal having a constant current value based on the voltage Vb1 and the voltage value at the output terminal from the output switching circuit 252-5 based on the logic levels of the voltage selection signals S5*a* [S5*a*-1, S5*a*-2, S5*a*-3, S5*a*-4] as the voltage selection signal S. Similarly, the set of the switch sw5*b*-1 and the constant current circuit co5-1, the set of the switch sw5*b*-2 and the constant current circuit co5-2, the set of the switch sw5*b*-3 and the constant current circuit co5-3, and the set of the switch sw5*b*-4 and the constant current circuit co5-4 each switch whether to draw a signal having a constant current value based on the voltage value at the input terminal and the voltage Vb1 into the output switching circuit 252-5 based on the logic levels of the voltage selection signals S5*b* [S5*b*-1, S5*b*-2, S5*b*-3, S5*b*-4] as the voltage selection signal S.

Therefore, the output switching circuit 252-5 in the modified example can control the current value to be output to the ejection unit 600 in accordance with the logic levels of the voltage selection signals S5*a* [S5*a*-1, S5*a*-2, S5*a*-3, S5*a*-4] as the voltage selection signal S output by the waveform selection control circuit 210, and can control the current value to be drawn from the ejection unit 600 in accordance with the logic levels of the voltage selection signals S5*b* [S5*b*-1, S5*b*-2, S5*b*-3, S5*b*-4] as the voltage selection signal S output by the waveform selection control circuit 210.

That is, the output switching circuit 252-5 in the modified example includes the constant current circuit ci5-1 one end of which is supplied with the drive voltage signal VBV1, the other end of which is electrically coupled to the piezoelectric element 60 provided to the ejection unit 600, and which outputs the signal having a constant current value based on the drive voltage signal VBV1, the constant current circuit ci5-2 one end of which is supplied with the drive voltage signal VBV1, the other end of which is electrically coupled to the piezoelectric element 60 provided to the ejection unit 600, and which outputs the signal having a constant current value based on the drive voltage signal VBV1, the constant current circuit ci5-3 one end of which is supplied with the drive voltage signal VBV1, the other end of which is electrically coupled to the piezoelectric element 60 provided to the ejection unit 600, and which outputs the signal having a constant current value based on the drive voltage signal VBV1, and the constant current circuit ci5-4 one end of which is supplied with the drive voltage signal VBV1, the other end of which is electrically coupled to the piezoelectric element 60 provided to the ejection unit 600, and which outputs the signal having a constant current value based on the drive voltage signal VBV1. Further, the current value output from the output switching circuit 252-5 in the modified example is controlled by the waveform selection control circuit 210 controlling whether the constant current circuit ci5-1 outputs the signal having a constant current value based on the drive voltage signal VBV1, whether the constant current circuit ci5-2 outputs the signal having a constant current value based on the drive voltage signal VBV1, whether the constant current circuit ci5-3 outputs the signal having a constant current value based on the drive voltage signal VBV1, and whether the constant current circuit ci5-4 outputs the signal having a constant current value based on the drive voltage signal VBV1, based on the print data signal SI.

That is, the output switching circuit 252-5 in the modified example includes the constant current circuit co5-1 one end of which is supplied with the drive voltage signal VBV1, the other end of which is electrically coupled to the piezoelectric element 60 provided to the ejection unit 600, and which outputs the signal having a constant current value based on the drive voltage signal VBV1, the constant current circuit co5-2 one end of which is supplied with the drive voltage signal VBV1, the other end of which is electrically coupled to the piezoelectric element 60 provided to the ejection unit 600, and which outputs the signal having a constant current value based on the drive voltage signal VBV1, the constant current circuit co5-3 one end of which is supplied with the drive voltage signal VBV1, the other end of which is electrically coupled to the piezoelectric element 60 provided to the ejection unit 600, and which outputs the signal having a constant current value based on the drive voltage signal VBV1, and the constant current circuit co5-4 one end of which is supplied with the drive voltage signal VBV1, the other end of which is electrically coupled to the piezoelectric element 60 provided to the ejection unit 600, and which outputs the signal having a constant current value based on the drive voltage signal VBV1. Further, the current value drawn to the output switching circuit 252-5 in the modified example is controlled by the waveform selection control circuit 210 controlling whether the constant current circuit co5-1 outputs the signal having a constant current value based on the drive voltage signal VBV1, whether the constant current circuit co5-2 outputs the signal having a constant current value based on the drive voltage signal VBV1, whether the constant current circuit co5-3 outputs the signal having a constant current value based on the drive voltage signal VBV1, and whether the constant current circuit co5-4 outputs the signal having a constant current value based on the drive voltage signal VBV1, based on the print data signal SI.

Here, the switch sw5*a*-1 and the constant current circuit ci5-1 may be configured with individual circuit elements, or may be configured with a single circuit element. Similarly, each of sets of the switch sw5*a*-2 and the constant current circuit ci5-2, the switch sw5*a*-3 and the constant current circuit ci5-3, and the switch sw5*a*-4 and the constant current circuit ci5-4 may be configured with individual circuit elements, or may be configured with a single circuit element. Further, the switch sw5*b*-1 and the constant current circuit co5-1 may be configured with individual circuit elements, or may be configured with a single circuit element. Similarly, each of sets of the switch sw5*b*-2 and the constant current circuit co5-2, the switch sw5*b*-3 and the constant current circuit co5-3, and the switch sw5*b*-4 and the constant current circuit co5-4 may be configured with individual circuit elements, or may be configured with a single circuit element.

Further, the output switching circuit 252-6 in the modified example includes a set of a switch sw6*a*-1 and a constant current circuit ci6-1, a set of a switch sw6*a*-2 and a constant current circuit ci6-2, a set of a switch sw6*a*-3 and a constant current circuit ci6-3, a set of a switch sw6*a*-4 and a constant current circuit ci6-4, a set of a switch sw6*b*-1 and a constant current circuit co6-1, a set of a switch sw6*b*-2 and a constant current circuit co6-2, a set of a switch sw6*b*-3 and a constant current circuit co6-3, and a set of a switch sw6*b*-4 and a constant current circuit co6-4 coupled in parallel to each other between a wiring pattern to which the drive voltage signal VBV2 is supplied and the wiring pattern from which the drive signal VOUT is output.

Further, the set of the switch sw6*a*-1 and the constant current circuit ci6-1, the set of the switch sw6*a*-2 and the constant current circuit ci6-2, the set of the switch sw6*a*-3 and the constant current circuit ci6-3, and the set of the switch sw6*a*-4 and the constant current circuit ci6-4 each switch whether to output a signal having a constant current value based on the voltage Vb2 and the voltage value at the output terminal from the output switching circuit 252-6 based on the logic levels of the voltage selection signals S6*a* [S6*a*-1, S6*a*-2, S6*a*-3, S6*a*-4] as the voltage selection signal S. Similarly, the set of the switch sw6*b*-1 and the constant current circuit co6-1, the set of the switch sw6*b*-2 and the constant current circuit co6-2, the set of the switch sw6*b*-3 and the constant current circuit co6-3, and the set of the switch sw6*b*-4 and the constant current circuit co6-4 each switch whether to draw a signal having a constant current value based on the voltage value at the input terminal and the voltage Vb2 into the output switching circuit 252-6 based on the logic levels of the voltage selection signals S6*b* [S6*b*-1, S6*b*-2, S6*b*-3, S6*b*-4] as the voltage selection signal S.

Therefore, the output switching circuit 252-6 in the modified example can control the current value to be output to the ejection unit 600 in accordance with the logic levels of the voltage selection signals S6*a* [S6*a*-1, S6*a*-2, S6*a*-3, S6*a*-4] as the voltage selection signal S output by the waveform selection control circuit 210, and can control the current value to be drawn from the ejection unit 600 in accordance with the logic levels of the voltage selection signals S6*b* [S6*b*-1, S6*b*-2, S6*b*-3, S6*b*-4] as the voltage selection signal S output by the waveform selection control circuit 210.

That is, the output switching circuit 252-6 in the modified example includes the constant current circuit ci6-1 one end of which is supplied with the drive voltage signal VBV2, the other end of which is electrically coupled to the piezoelectric element 60 provided to the ejection unit 600, and which outputs the signal having a constant current value based on the drive voltage signal VBV2, the constant current circuit ci6-2 one end of which is supplied with the drive voltage signal VBV2, the other end of which is electrically coupled to the piezoelectric element 60 provided to the ejection unit 600, and which outputs the signal having a constant current value based on the drive voltage signal VBV2, the constant current circuit ci6-3 one end of which is supplied with the drive voltage signal VBV2, the other end of which is electrically coupled to the piezoelectric element 60 provided to the ejection unit 600, and which outputs the signal having a constant current value based on the drive voltage signal VBV2, and the constant current circuit ci6-4 one end of which is supplied with the drive voltage signal VBV2, the other end of which is electrically coupled to the piezoelectric element 60 provided to the ejection unit 600, and which outputs the signal having a constant current value based on the drive voltage signal VBV2. Further, the current value output from the output switching circuit 252-6 in the modified example is controlled by the waveform selection control circuit 210 controlling whether the constant current circuit ci6-1 outputs the signal having a constant current value based on the drive voltage signal VBV2, whether the constant current circuit ci6-2 outputs the signal having a constant current value based on the drive voltage signal VBV2, whether the constant current circuit ci6-3 outputs the signal having a constant current value based on the drive voltage signal VBV2, and whether the constant current circuit ci6-4 outputs the signal having a constant current value based on the drive voltage signal VBV2, based on the print data signal SI.

Further, the output switching circuit 252-6 in the modified example includes the constant current circuit co6-1 one end of which is supplied with the drive voltage signal VBV2, the other end of which is electrically coupled to the piezoelectric element 60 provided to the ejection unit 600, and which outputs the signal having a constant current value based on the drive voltage signal VBV2, the constant current circuit co6-2 one end of which is supplied with the drive voltage signal VBV2, the other end of which is electrically coupled to the piezoelectric element 60 provided to the ejection unit 600, and which outputs the signal having a constant current value based on the drive voltage signal VBV2, the constant current circuit co6-3 one end of which is supplied with the drive voltage signal VBV2, the other end of which is electrically coupled to the piezoelectric element 60 provided to the ejection unit 600, and which outputs the signal having a constant current value based on the drive voltage signal VBV2, and the constant current circuit co6-4 one end of which is supplied with the drive voltage signal VBV2, the other end of which is electrically coupled to the piezoelectric element 60 provided to the ejection unit 600, and which outputs the signal having a constant current value based on the drive voltage signal VBV2. Further, the current value drawn to the output switching circuit 252-6 in the modified example is controlled by the waveform selection control circuit 210 controlling whether the constant current circuit co6-1 outputs the signal having a constant current value based on the drive voltage signal VBV2, whether the constant current circuit co6-2 outputs the signal having a constant current value based on the drive voltage signal VBV2, whether the constant current circuit co6-3 outputs the signal having a constant current value based on the drive voltage signal VBV2, and whether the constant current circuit co6-4 outputs the signal having a constant current value based on the drive voltage signal VBV2, based on the print data signal SI.

Here, the switch sw6*a*-1 and the constant current circuit ci6-1 may be configured with individual circuit elements, or may be configured with a single circuit element. Similarly, each of sets of the switch sw6*a*-2 and the constant current circuit ci6-2, the switch sw6*a*-3 and the constant current circuit ci6-3, and the switch sw6*a*-4 and the constant current circuit ci6-4 may be configured with individual circuit elements, or may be configured with a single circuit element. Further, the switch sw6*b*-1 and the constant current circuit co6-1 may be configured with individual circuit elements, or may be configured with a single circuit element. Similarly, each of sets of the switch sw6*b*-2 and the constant current circuit co6-2, the switch sw6*b*-3 and the constant current circuit co6-3, and the switch sw6*b*-4 and the constant current circuit co6-4 may be configured with individual circuit elements, or may be configured with a single circuit element.

Figure 16:
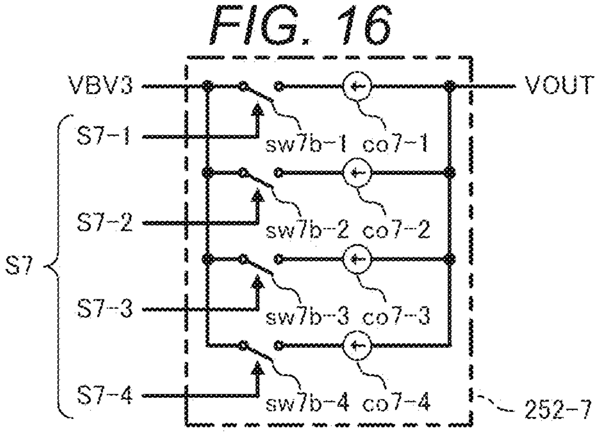
FIG. 16 is a diagram illustrating a configuration of an output switching circuit 252-7 in the modified example.

FIG. 16 is a diagram illustrating a configuration of an output switching circuit 252-7 according to the modified example. As illustrated in FIG. 16, the output switching circuit 252-7 in the modified example includes switches sw7*b*-1 to sw7*b*-4 and constant current circuits co7-1 to co7-4. Further, voltage selection signals S7-1, S7-2, S7-3, and S7-4 as the voltage selection signal S7 and the drive voltage signal VBV3 are input to the output switching circuit 252-7 in the modified example.

The voltage selection signal S7-1 is input to a control terminal of the switch sw7*b*-1. The voltage selection signal S7-2 is input to a control terminal of the switch sw7*b*-2. The voltage selection signal S7-3 is input to a control terminal of the switch sw7*b*-3. The voltage selection signal S7-4 is input to a control terminal of the switch sw7*b*-4. The drive voltage signal VBV3 is input to one ends of the switches sw7*b*-1 to sw7*b*-4. The other end of the switch sw7*b*-1 is electrically coupled to an output terminal of the constant current circuit co7-1. The other end of the switch sw7*b*-2 is electrically coupled to an output terminal of the constant current circuit co7-2. The other end of the switch sw7*b*-3 is electrically coupled to an output terminal of the constant current circuit co7-3. The other end of the switch sw7*b*-4 is electrically coupled to an output terminal of the constant current circuit co7-4.

In the output switching circuit 252-7 in the modified example configured as described above, when the voltage selection signal S7-1 at the H level is input to the control terminal of the switch sw7*b*-1, the switch sw7*b*-1 is controlled to make one end and the other end conductive. This supplies the output terminal of the constant current circuit co7-1 with the drive voltage signal VBV3, and the constant current circuit co7-1 outputs, from an output terminal, a signal constant in current value based on the voltage value at the input terminal, and the voltage Vb3 supplied to the output terminal.

When the voltage selection signal S7-2 at the H level is input to the control terminal of the switch sw7*b*-2, the switch sw7*b*-2 is controlled to make the one end and the other end conductive. This supplies the input terminal of the constant current circuit co7-2 with the drive voltage signal VBV3, and the constant current circuit co7-2 outputs, from an output terminal, a signal constant in current value based on the voltage value at the input terminal, and the voltage Vb3 supplied to the output terminal.

When the voltage selection signal S7-3 at the H level is input to the control terminal of the switch sw7*b*-3, the switch sw7*b*-3 is controlled to make the one end and the other end conductive. This supplies the input terminal of the constant current circuit co7-3 with the drive voltage signal VBV3, and the constant current circuit co7-3 outputs, from an output terminal, a signal constant in current value based on the voltage value at the input terminal, and the voltage Vb3 supplied to the output terminal.

When the voltage selection signal S7-4 at the H level is input to the control terminal of the switch sw7*b*-4, the switch sw7*b*-4 is controlled to make the one end and the other end conductive. This supplies the input terminal of the constant current circuit co7-4 with the drive voltage signal VBV3, and the constant current circuit co7-4 outputs, from an output terminal, a signal constant in current value based on the voltage value at the input terminal, and the voltage Vb3 supplied to the output terminal.

That is, in the output switching circuit 252-7 in the modified example, a set of the switch sw7*b*-1 and the constant current circuit co7-1, a set of the switch sw7*b*-2 and the constant current circuit co7-2, a set of the switch sw7*b*-3 and the constant current circuit co7-3, and a set of the switch sw7*b*-4 and the constant current circuit co7-4 are coupled in parallel to each other between a wiring pattern to which the drive voltage signal VBV3 is supplied and the wiring pattern from which the drive signal VOUT is output. Further, by individually switching the conduction states of the switches sw7*b*-1 to sw7*b*-4 based on the logic levels of the voltage selection signals S7-1 to S7-4, whether the output switching circuit 252-7 in the modified example outputs the signal having a constant current value based on the voltage value of the input terminal and the voltage Vb3 is switched.

Here, in the following description, the voltage selection signal S7-1 input to the control terminal of the switch sw7*b*-1, the voltage selection signal S7-2 input to the control terminal of the switch sw7*b*-2, the voltage selection signal S7-3 input to the control terminal of the switch sw7*b*-3, and the voltage selection signal S7-4 input to the control terminal of the switch sw7*b*-4 may be collectively referred to as voltage selection signals S7 [S7-1, S7-2, S7-3, S7-4] in some cases.

When the voltage selection signals S7 [S7-1, S7-2, S7-3, S7-4]=[H, L, L, L] are input to the output switching circuit 252-7 in the modified example configured as described above, the switch sw7*b*-1 is controlled to make one end and the other end conductive, and the switches sw7*b*-2 to sw7*b*-4 are controlled to make one end and the other end non-conductive. On this occasion, the output switching circuit 252-7 draws the signal constant at a current value defined by the constant current circuit co7-1 based on the voltage value at the input terminal and the voltage Vb3 from the ejection unit 600.

Further, when the voltage selection signals S7 [S7-1, S7-2, S7-3, S7-4]=[H, H, L, L] are input to the output switching circuit 252-7 in the modified example, the switches sw7*b*-1, sw7*b*-2 are controlled to make one end and the other end conductive, and the switches sw7*b*-3, sw7*b*-4 are controlled to make one end and the other end non-conductive. On this occasion, the output switching circuit 252-7 draws a signal constant at a current value as a sum of a current value defined by the constant current circuit co7-1 and a current value defined by the constant current circuit co7-2 from the ejection unit 600 based on the voltage value at the input terminal and the voltage Vb3.

Further, when the voltage selection signals S7 [S7-1, S7-2, S7-3, S7-4]=[H, H, H, L] are input to the output switching circuit 252-7 in the modified example, the switches sw7*b*-1 to sw7*b*-3 are controlled to make one end and the other end conductive, and the switch sw7*b*-4 is controlled to make one end and the other end non-conductive. On this occasion, based on the voltage value at the input terminal and the voltage Vb3, the output switching circuit 252-7 draws a signal constant at a current value as a sum of the current value defined by the constant current circuit co7-1, the current value defined by the constant current circuit co7-2, and the current value defined by the constant current circuit co7-3 from the ejection unit 600.

Further, when the voltage selection signals S7 [S7-1, S7-2, S7-3, S7-4]=[H, H, H, H] are input to the output switching circuit 252-7 in the modified example, the switches sw7*b*-1 to sw7*b*-4 are controlled to make one end and the other end conductive. On this occasion, based on the voltage value at the input terminal and the voltage Vb3, the output switching circuit 252-7 draws a signal constant at a current value as a sum of the current value defined by the constant current circuit co7-1, the current value defined by the constant current circuit co7-2, the current value defined by the constant current circuit co7-3, and the current value defined by the constant current circuit co7-4 from the ejection unit 600.

This makes it possible for the output switching circuit 252-7 in the modified example to control the current value to be drawn from the ejection unit 600 in accordance with the logic levels of the voltage selection signals S7 [S7-1, S7-2, S7-3, S7-4] as the voltage selection signal S output by the waveform selection control circuit 210. Here, the switch sw7*b*-1 and the constant current circuit co7-1 may be configured with individual circuit elements, or may be configured with a single circuit element. Similarly, each of sets of the switch sw7*b*-2 and the constant current circuit co7-2, the switch sw7*b*-3 and the constant current circuit co7-3, and the switch sw7*b*-4 and the constant current circuit co7-4 may be configured with individual circuit elements, or may be configured with a single circuit element.

That is, the output switching circuit 252-7 in the modified example includes the constant current circuit co7-1 one end of which is supplied with the drive voltage signal VBV3, the other end of which is electrically coupled to the piezoelectric element 60 provided to the ejection unit 600, and which outputs the signal having a constant current value based on the drive voltage signal VBV3, the constant current circuit co7-2 one end of which is supplied with the drive voltage signal VBV3, the other end of which is electrically coupled to the piezoelectric element 60 provided to the ejection unit 600, and which outputs the signal having a constant current value based on the drive voltage signal VBV3, the constant current circuit co7-3 one end of which is supplied with the drive voltage signal VBV3, the other end of which is electrically coupled to the piezoelectric element 60 provided to the ejection unit 600, and which outputs the signal having a constant current value based on the drive voltage signal VBV3, and the constant current circuit co7-4 one end of which is supplied with the drive voltage signal the other end of which is electrically coupled to the piezoelectric element 60 provided to the ejection unit 600, and which outputs the signal having a constant current value based on the drive voltage signal VBV3. Further, the current value drawn to the output switching circuit 252-7 in the modified example is controlled by the waveform selection control circuit 210 controlling whether the constant current circuit co7-1 outputs the signal having a constant current value based on the drive voltage signal VBV3, whether the constant current circuit co7-2 outputs the signal having a constant current value based on the drive voltage signal VBV3, whether the constant current circuit co7-3 outputs the signal having a constant current value based on the drive voltage signal VBV3, and whether the constant current circuit co7-4 outputs the signal having a constant current value based on the drive voltage signal VBV3, based on the print data signal SI.

Figure 17:
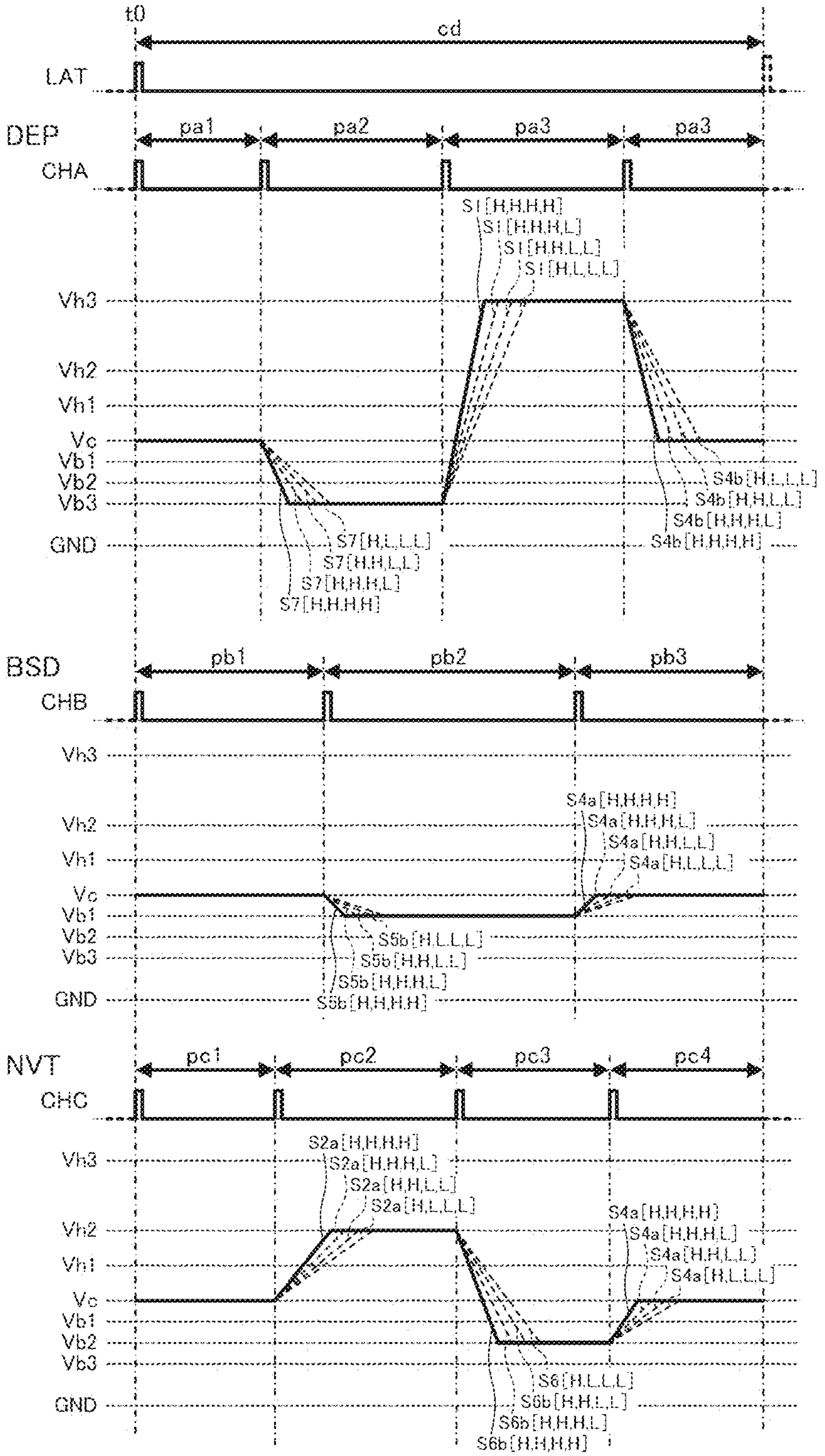
FIG. 17 is a diagram illustrating an example of a relationship between a gradient of the signal waveform of the drive signal and a voltage control signal in the modified example.

In the liquid ejection apparatus 1 in the modified example configured as described above, since each of the output switching circuits 252-1 to 252-7 provided to the output circuit 250 can control the current value supplied to the ejection unit 600 and the current value drawn from the ejection unit 600, it is possible to control the gradient of the signal waveform of the drive signal VOUT to be output. FIG. 17 is a diagram illustrating an example of a relationship between the gradient of the signal waveform of the drive signal VOUT and the voltage control signal in the modified example.

The piezoelectric element 60 to which the drive signal VOUT is supplied is a capacitive load, and therefore the voltage value supplied to the piezoelectric element 60 is an amount of charge stored in the piezoelectric element 60 and is proportional to an amount of the current of the drive signal VOUT supplied to the piezoelectric element 60. Therefore, as in the liquid ejection apparatus 1 in the modified example, the gradient of the signal waveform of the drive signal VOUT output by the drive signal output circuit 200 is controlled by each of the output switching circuits 252-1 to 252-7 provided to the output circuit 250 controlling the current value supplied to the ejection unit 600 and the current value drawn from the ejection unit 600.

For example, in the case of the voltage selection signals S7 [S7-1, S7-2, S7-3, S7-4]=[H, H, H, H], the output switching circuit 252-7 draws the signal constant at the current value as the sum of the current value defined by the constant current circuit co7-1, the current value defined by the constant current circuit co7-2, the current value defined by the constant current circuit co7-3, and the current value defined by the constant current circuit co7-4 from the ejection unit 600 based on the voltage value at the input terminal and the voltage Vb3. In contrast, in the case of the voltage selection signals S7 [S7-1, S7-2, S7-3, S7-4]=[H, L, L, L], the output switching circuit 252-7 draws the signal constant at the current value defined by the constant current circuit co7-1 from the ejection unit 600 based on the voltage value at the input terminal and the voltage Vb3. That is, the amount of the current drawn by the output switching circuit 252-7 from the ejection unit 600 in the case of the voltage selection signals S7 [S7-1, S7-2, S7-3, S7-4]=[H, H, H, H] is larger than the amount of the current drawn by the output switching circuit 252-7 from the ejection unit 600 in the case of the voltage selection signals S7 [S7-1, S7-2, S7-3, S7-4]=[H, L, L, L]. Therefore, as shown in FIG. 17, in the period pa2, by inputting the voltage selection signals S7 [S7-1, S7-2, S7-3, S7-4]=[H, H, H, H] to the output circuit 250 when the voltage value of the drive waveform DEP changes from the voltage Vc to the voltage Vb3, it is possible to steeply change the voltage value of the drive waveform DEP compared to when the voltage selection signals S7 [S7-1, S7-2, S7-3, S7-4]=[H, L, L, L] are input.

Further, for example, in the case of the voltage selection signals S2*a* [S2*a*-1, S2*a*-2, S2*a*-3, S2*a*-4]=[H, H, H, L], the output switching circuit 252-2 supplies the signal constant at the current value as the sum of the current value defined by the constant current circuit ci2-1, the current value defined by the constant current circuit ci2-2, and the current value defined by the constant current circuit ci2-3 to the ejection unit 600 based on the voltage Vh2 and the voltage value at the output terminal. In contrast, in the case of the voltage selection signals S2*a* [S2*a*-1, S2*a*-2, S2*a*-3, S2*a*-4]=[H, H, L, L], the output switching circuit 252-2 supplies the signal constant at the current value as the sum of the current value defined by the constant current circuit ci2-1 and the current value defined by the constant current circuit ci2-2 to the ejection unit 600 based on the voltage Vh2 and the voltage value at the output terminal. That is, an amount of the current supplied by the output switching circuit 252-2 to the ejection unit 600 in the case of the voltage selection signals S2*a* [S2*a*-1, S2*a*-2, S2*a*-3, S2*a*-4]=[H, H, H, L] is larger than an amount of the current supplied by the output switching circuit 252-2 to the ejection unit 600 in the case of the voltage selection signals S2*a* [S2*a*-1, S2*a*-2, S2*a*-3, S2*a*-4]=[H, H, L, L]. Therefore, as shown in FIG. 17, in the period pc2, by inputting the voltage selection signals S2*a* [S2*a*-1, S2*a*-2, S2*a*-3, S2*a*-4]=[H, H, H, L] to the output circuit 250 when the voltage value of the drive waveform NVT changes from the voltage Vc to the voltage Vh2, it is possible to steeply change the voltage value of the drive waveform NVT compared to when the voltage selection signals S2*a* [S2*a*-1, S2*a*-2, S2*a*-3, S2*a*-4]=[H, H, L, L] are input.

As described above, in the liquid ejection apparatus 1 according to the modified example, it is possible to control the gradient of the voltage change in the drive waveforms DEP, BSD, and NVT provided to the drive signal VOUT. Thus, in the liquid ejection apparatus 1 in the modified example, it is possible for the drive signal output circuit 200 to output an optimum waveform of the drive signal VOUT corresponding to the use environment of the liquid ejection apparatus 1 and the physical properties of the ink to be used. Therefore, in the liquid ejection apparatus 1 according to the modified example, it is possible to enhance the versatility of the liquid ejection apparatus 1 in addition to the functions and the advantages described above.

2. Second Embodiment

Then, a configuration of the liquid ejection apparatus 1 according to a second embodiment will be described. The liquid ejection apparatus 1 according to the second embodiment is different from the liquid ejection apparatus 1 according to the first embodiment in the configuration of the output circuit 250 provided to the drive signal output circuit 200. Here, in describing the liquid ejection apparatus 1 according to the second embodiment, substantially the same elements as those of the liquid ejection apparatus 1 according to the first embodiment are denoted by the same reference numerals, and the description thereof will be omitted or simplified. Further, in the liquid ejection apparatus 1 according to the second embodiment, the description will be presented assuming that the waveform selection control circuit 210 provided to the drive signal output circuit 200 generates the voltage selection signals S11 to S17 as the voltage selection signal S based on the latch signal LAT, the change signal CH, the clock signal SCK, the print data signal SI, and the waveform selection signal WS, and outputs the voltage selection signals S11 to S17 to the output circuits 250 corresponding thereto. Further, the description will be presented assuming that the output circuit 250 in the liquid ejection apparatus 1 according to the second embodiment includes an output switching circuit 252*a*-1 corresponding to the output switching circuit 252-1 that selects whether to output the drive voltage signal VHV3, an output switching circuit 252*a*-2 corresponding to the output switching circuit 252-2 that selects whether to output the drive voltage signal VHV2, an output switching circuit 252*a*-3 corresponding to the output switching circuit 252-3 that selects whether to output the drive voltage signal VHV1, an output switching circuit 252*a*-4 corresponding to the output switching circuit 252-4 that selects whether to output the drive voltage signal VCV, an output switching circuit 252*a*-5 corresponding to the output switching circuit 252-5 that selects whether to output the drive voltage signal VBV1, an output switching circuit 252*a*-6 corresponding to the output switching circuit 252-6 that selects whether to output the drive voltage signal VBV2, and an output switching circuit 252*a*-7 corresponding to the output switching circuit 252-7 that selects whether to output the drive voltage signal VBV3 in the liquid ejection apparatus 1 according to the first embodiment.

2.1 Configuration of Output Circuit in Second Embodiment

Figure 18:
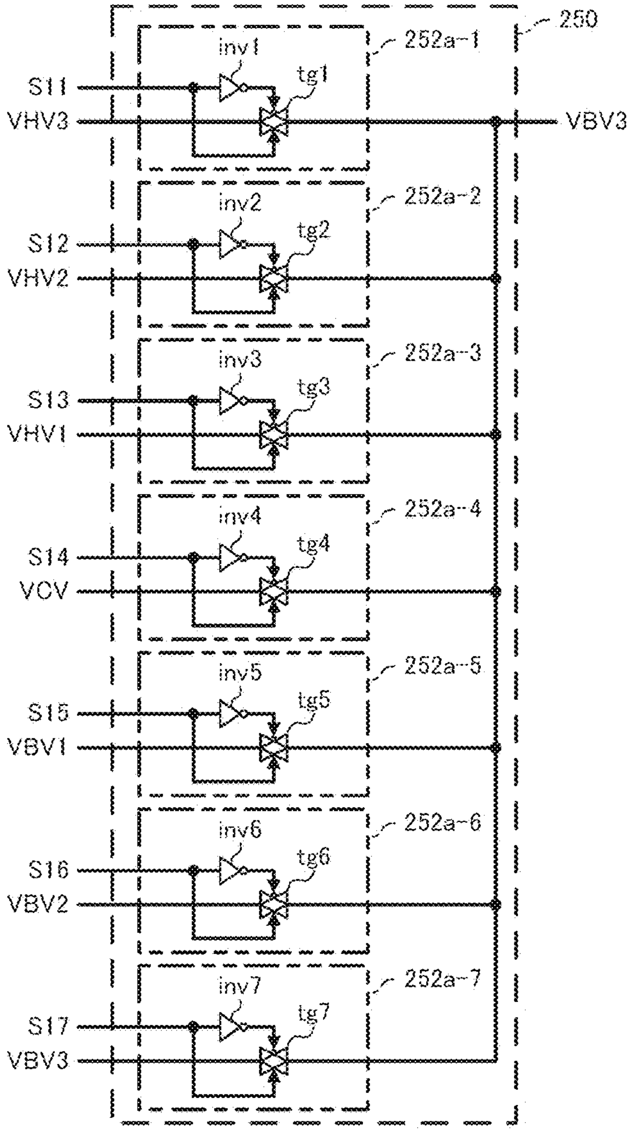
FIG. 18 is a diagram showing an example of a configuration of an output circuit in a second embodiment.

FIG. 18 is a diagram illustrating an example of a configuration of the output circuit 250 in the second embodiment. As illustrated in FIG. 18, the output circuit 250 includes the output switching circuits 252*a*-1 to 252*a*-7 similarly to the first embodiment.

The output switching circuit 252*a*-1 in the second embodiment includes an inverter inv1 and a transfer gate tg1. The voltage selection signal S11 as the voltage selection signal S and the drive voltage signal VHV3 are input to the output switching circuit 252*a*-1. The voltage selection signal S11 is input to a positive control terminal of the transfer gate tg1, and is also input to a negative control terminal marked with a circle of the transfer gate tg1 after being inverted in the logic level by the inverter inv1. Further, the drive voltage signal VHV3 is input to an input terminal of the transfer gate tg1.

When the voltage selection signal S11 at the H level is input to such an output switching circuit 252*a*-1, the input terminal and an output terminal of the transfer gate tg1 become conductive, and when the voltage selection signal S11 at the L level is input, the input terminal and the output terminal of the transfer gate tg1 become non-conductive. That is, when the voltage selection signal S11 at the H level is input to the output switching circuit 252*a*-1, the transfer gate tg1 supplies a current to the ejection unit 600 or draws a current from the ejection unit 600 so that the voltage value of the drive signal VOUT becomes the voltage Vh3 which is the voltage value of the drive voltage signal VHV3.

In other words, the waveform selection control circuit 210 controls the output switching circuit 252*a*-1 based on the print data signal SI, and the output switching circuit 252*a*-1 switches whether to supply the drive voltage signal VHV3 to the ejection unit 600.

The output switching circuit 252*a*-2 in the second embodiment includes an inverter inv2 and a transfer gate tg2. The voltage selection signal S12 as the voltage selection signal S and the drive voltage signal VHV2 are input to the output switching circuit 252*a*-2. The voltage selection signal S12 is input to a positive control terminal of the transfer gate tg2, and is also input to a negative control terminal marked with a circle of the transfer gate tg2 after being inverted in the logic level by the inverter inv2. Further, the drive voltage signal VHV2 is input to an input terminal of the transfer gate tg2.

When the voltage selection signal S12 at the H level is input to such an output switching circuit 252*a*-2, the input terminal and an output terminal of the transfer gate tg2 become conductive, and when the voltage selection signal S12 at the L level is input, the input terminal and the output terminal of the transfer gate tg2 become non-conductive. That is, when the voltage selection signal S12 at the H level is input to the output switching circuit 252*a*-2, the transfer gate tg2 supplies a current to the ejection unit 600 or draws a current from the ejection unit 600 so that the voltage value of the drive signal VOUT becomes the voltage Vh2 which is the voltage value of the drive voltage signal VHV2.

In other words, the waveform selection control circuit 210 controls the output switching circuit 252*a*-2 based on the print data signal SI, and the output switching circuit 252*a*-2 switches whether to supply the drive voltage signal VHV2 to the ejection unit 600.

The output switching circuit 252*a*-3 in the second embodiment includes an inverter inv3 and a transfer gate tg3. The voltage selection signal S13 as the voltage selection signal S and the drive voltage signal VHV1 are input to the output switching circuit 252*a*-3. The voltage selection signal S13 is input to a positive control terminal of the transfer gate tg3, and is also input to a negative control terminal marked with a circle of the transfer gate tg3 after being inverted in the logic level by the inverter inv3. Further, the drive voltage signal VHV1 is input to an input terminal of the transfer gate tg3.

When the voltage selection signal S13 at the H level is input to such an output switching circuit 252*a*-3, the input terminal and an output terminal of the transfer gate tg3 become conductive, and when the voltage selection signal S13 at the L level is input, the input terminal and the output terminal of the transfer gate tg3 become non-conductive. That is, when the voltage selection signal S13 at the H level is input to the output switching circuit 252*a*-3, the transfer gate tg3 supplies a current to the ejection unit 600 or draws a current from the ejection unit 600 so that the voltage value of the drive signal VOUT becomes the voltage Vh1 which is the voltage value of the drive voltage signal VHV1.

In other words, the waveform selection control circuit 210 controls the output switching circuit 252*a*-3 based on the print data signal SI, and the output switching circuit 252*a*-3 switches whether to supply the drive voltage signal VHV1 to the ejection unit 600.

The output switching circuit 252*a*-4 in the second embodiment includes an inverter inv4 and a transfer gate tg4. The voltage selection signal S14 as the voltage selection signal S and the drive voltage signal VCV are input to the output switching circuit 252*a*-4. The voltage selection signal S14 is input to a positive control terminal of the transfer gate tg4, and is also input to a negative control terminal marked with a circle of the transfer gate tg4 after being inverted in the logic level by the inverter inv4. Further, the drive voltage signal VCV is input to an input terminal of the transfer gate tg4.

When the voltage selection signal S14 at the H level is input to such an output switching circuit 252*a*-4, the input terminal and an output terminal of the transfer gate tg4 become conductive, and when the voltage selection signal S14 at the L level is input, the input terminal and the output terminal of the transfer gate tg4 become non-conductive. That is, when the voltage selection signal S14 at the H level is input to the output switching circuit 252*a*-4, the transfer gate tg4 supplies a current to the ejection unit 600 or draws a current from the ejection unit 600 so that the voltage value of the drive signal VOUT becomes the voltage Vc which is the voltage value of the drive voltage signal VCV.

In other words, the waveform selection control circuit 210 controls the output switching circuit 252*a*-4 based on the print data signal SI, and the output switching circuit 252*a*-4 switches whether to supply the drive voltage signal VCV to the ejection unit 600.

The output switching circuit 252*a*-5 in the second embodiment includes an inverter inv5 and a transfer gate tg5. The voltage selection signal S15 as the voltage selection signal S and the drive voltage signal VBV1 are input to the output switching circuit 252*a*-5. The voltage selection signal S15 is input to a positive control terminal of the transfer gate tg5, and is also input to a negative control terminal marked with a circle of the transfer gate tg5 after being inverted in the logic level by the inverter inv5. Further, the drive voltage signal VBV1 is input to an input terminal of the transfer gate tg5.

When the voltage selection signal S15 at the H level is input to such an output switching circuit 252*a*-5, the input terminal and an output terminal of the transfer gate tg5 become conductive, and when the voltage selection signal S15 at the L level is input, the input terminal and the output terminal of the transfer gate tg5 become non-conductive. That is, when the voltage selection signal S15 at the H level is input to the output switching circuit 252*a*-5, the transfer gate tg5 supplies a current to the ejection unit 600 or draws a current from the ejection unit 600 so that the voltage value of the drive signal VOUT becomes the voltage Vb1 which is the voltage value of the drive voltage signal VBV1.

In other words, the waveform selection control circuit 210 controls the output switching circuit 252*a*-5 based on the print data signal SI, and the output switching circuit 252*a*-5 switches whether to supply the drive voltage signal VBV1 to the ejection unit 600.

The output switching circuit 252*a*-6 in the second embodiment includes an inverter inv6 and a transfer gate tg6. The voltage selection signal S16 as the voltage selection signal S and the drive voltage signal VBV2 are input to the output switching circuit 252*a*-6. The voltage selection signal S16 is input to a positive control terminal of the transfer gate tg6, and is also input to a negative control terminal marked with a circle of the transfer gate tg6 after being inverted in the logic level by the inverter inv6. Further, the drive voltage signal VBV2 is input to an input terminal of the transfer gate tg6.

When the voltage selection signal S16 at the H level is input to such an output switching circuit 252*a*-6, the input terminal and an output terminal of the transfer gate tg6 become conductive, and when the voltage selection signal S16 at the L level is input, the input terminal and the output terminal of the transfer gate tg6 become non-conductive. That is, when the voltage selection signal S16 at the H level is input to the output switching circuit 252*a*-6, the transfer gate tg6 supplies a current to the ejection unit 600 or draws a current from the ejection unit 600 so that the voltage value of the drive signal VOUT becomes the voltage Vb2 which is the voltage value of the drive voltage signal VBV2.

In other words, the waveform selection control circuit 210 controls the output switching circuit 252*a*-6 based on the print data signal SI, and the output switching circuit 252*a*-6 switches whether to supply the drive voltage signal VBV2 to the ejection unit 600.

The output switching circuit 252*a*-7 in the second embodiment includes an inverter inv7 and a transfer gate tg7. The voltage selection signal S17 as the voltage selection signal S and the drive voltage signal VBV3 are input to the output switching circuit 252*a*-7. The voltage selection signal S17 is input to a positive control terminal of the transfer gate tg7, and is also input to a negative control terminal marked with a circle of the transfer gate tg7 after being inverted in the logic level by the inverter inv7. Further, the drive voltage signal VBV3 is input to an input terminal of the transfer gate tg7.

When the voltage selection signal S17 at the H level is input to such an output switching circuit 252*a*-7, the input terminal and an output terminal of the transfer gate tg7 become conductive, and when the voltage selection signal S17 at the L level is input, the input terminal and the output terminal of the transfer gate tg7 become non-conductive. That is, when the voltage selection signal S17 at the H level is input to the output switching circuit 252*a*-7, the transfer gate tg7 supplies a current to the ejection unit 600 or draws a current from the ejection unit 600 so that the voltage value of the drive signal VOUT becomes the voltage Vb3 which is the voltage value of the drive voltage signal VBV3.

In other words, the waveform selection control circuit 210 controls the output switching circuit 252*a*-7 based on the print data signal SI, and the output switching circuit 252*a*-7 switches whether to supply the drive voltage signal VBV3 to the ejection unit 600.

Even in the liquid ejection apparatus 1 according to the second embodiment having the output circuit 250 configured as described above, the waveform selection control circuit 210 outputs the voltage selection signals S at predetermined logic levels based on the latch signal LAT, the change signals CHA, CHB, CHC, and CHD, the clock signal SCK, the print data signal SI, and the waveform information signal WI, and the output switching circuits 252*a*-1 to 252*a*-7 select or deselect each of the drive voltage signals VHV1, VHV2, VHV3, VCV, VBV1, VBV2, and VBV3 based on the logic levels of the voltage selection signals S input thereto to thereby generate the drive signal VOUT and then output the drive signal VOUT to the ejection unit 600 corresponding thereto. Thus, even in the liquid ejection apparatus 1 and the head unit 20 according to the second embodiment, substantially the same functions and advantages as those of the liquid ejection apparatus 1 according to the first embodiment can be exerted.

2.2 Modified Example of Output Circuit in Second Embodiment

In the liquid ejection apparatus 1 according to the second embodiment described above, the description is presented assuming that the output switching circuit 252*a*-1 provided to the output circuit 250 has a single set of the transfer gate tg1 and the inverter inv1 to switch the conduction state between the one end and the other end of the transfer gate tg1 to thereby switch whether to output the drive voltage signal VHV3 as the drive signal VOUT, but the output switching circuit 252*a*-1 may include a plurality of sets of the transfer gate tg1 and the inverter inv1.

Similarly, the output switching circuit 252*a*-2 may include a plurality of sets of the transfer gate tg2 and the inverter inv2, the output switching circuit 252*a*-3 may include a plurality of sets of the transfer gate tg3 and the inverter inv3, the output switching circuit 252*a*-4 may include a plurality of sets of the transfer gate tg4 and the inverter inv4, the output switching circuit 252*a*-5 may include a plurality of sets of the transfer gate tg5 and the inverter inv5, the output switching circuit 252*a*-6 may include a plurality of sets of the transfer gate tg6 and the inverter inv6, and the output switching circuit 252*a*-7 may include a plurality of sets of the transfer gate tg7 and the inverter inv7.

Figure 19:
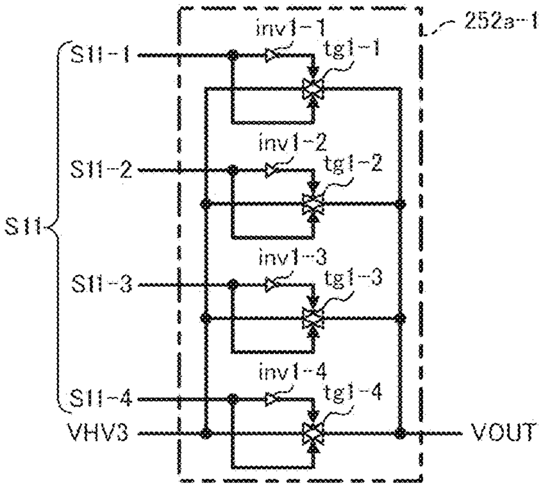
FIG. 19 is a diagram showing an example of a configuration of an output switching circuit in a modified example of the second embodiment.

A specific example of a configuration of a modified example of the liquid ejection apparatus 1 according to the second embodiment will be described. FIG. 19 is a diagram illustrating an example of a configuration of an output switching circuit 252*a*-1 in the modified example of the second embodiment. As shown in FIG. 19, the output switching circuit 252*a*-1 in the modified example of the second embodiment includes transfer gates tg1-1 to tg1-4 and inverters inv1-1 to inv1-4. Further, the voltage selection signals S11-1, S11-2, S11-3, and S11-4 as the voltage selection signal S11 and the drive voltage signal VHV3 are input to the output switching circuit 252*a*-1 in the modified example of the second embodiment.

The voltage selection signal S11-1 is input to a positive control terminal of the transfer gate tg1-1, and is also input to a negative control terminal marked with a circle of the transfer gate tg1-1 after being inverted in the logic level by the inverter inv1-1. Further, the drive voltage signal VHV3 is input to an input terminal of the transfer gate tg1-1. The voltage selection signal S11-2 is input to a positive control terminal of the transfer gate tg1-2, and is also input to a negative control terminal marked with a circle of the transfer gate tg1-2 after being inverted in the logic level by the inverter inv1-2. Further, the drive voltage signal VHV3 is input to an input terminal of the transfer gate tg1-2. The voltage selection signal S11-3 is input to a positive control terminal of the transfer gate tg1-3, and is also input to a negative control terminal marked with a circle of the transfer gate tg1-3 after being inverted in the logic level by the inverter inv1-3. Further, the drive voltage signal VHV3 is input to an input terminal of the transfer gate tg1-3. The voltage selection signal S11-4 is input to a positive control terminal of the transfer gate tg1-4, and is also input to a negative control terminal marked with a circle of the transfer gate tg1-4 after being inverted in the logic level by the inverter inv1-4. Further, the drive voltage signal VHV3 is input to an input terminal of the transfer gate tg1-4. Further, in the output switching circuit 252*a*-2, the output terminals of the transfer gates tg1-1 to tg1-4 are coupled in common. The output switching circuit 252*a*-1 in the modified example of the second embodiment outputs signals at the output terminals of the transfer gates tg1-1 to tg1-4 coupled in common to the ejection unit 600 corresponding thereto as the drive signal VOUT.

When the voltage selection signal S11-1 at the H level is input to the output switching circuit 252*a*-1 in the modified example of the second embodiment configured as described above, the transfer gate tg1-1 is controlled to make the input terminal and an output terminal conductive, and when the voltage selection signal S11-1 at the L level is input, the transfer gate tg1-1 is controlled to make the input terminal and the output terminal non-conductive. Similarly, when the voltage selection signal S11-2 at the H level is input to the output switching circuit 252*a*-1 in the modified example of the second embodiment, the transfer gate tg1-2 is controlled to make the input terminal and an output terminal conductive, and when the voltage selection signal S11-2 at the L level is input, the transfer gate tg1-2 is controlled to make the input terminal and the output terminal non-conductive. Similarly, when the voltage selection signal S11-3 at the H level is input to the output switching circuit 252*a*-1 in the modified example of the second embodiment, the transfer gate tg1-3 is controlled to make the input terminal and an output terminal conductive, and when the voltage selection signal S11-3 at the L level is input, the transfer gate tg1-3 is controlled to make the input terminal and the output terminal non-conductive. Similarly, when the voltage selection signal S11-4 at the H level is input to the output switching circuit 252*a*-1 in the modified example of the second embodiment, the transfer gate tg1-4 is controlled to make the input terminal and an output terminal conductive, and when the voltage selection signal S11-4 at the L level is input, the transfer gate tg1-4 is controlled to make the input terminal and the output terminal non-conductive.

That is, in the output switching circuit 252*a*-1 in the modified example of the second embodiment, the transfer gate tg1-1, the transfer gate tg1-2, the transfer gate tg1-3, and the transfer gate tg1-4 are coupled in parallel to each other between a wiring pattern to which the drive voltage signal VHV3 is supplied and the wiring pattern from which the drive signal VOUT is output. Further, each of the transfer gates tg1-1 to tg1-4 switches whether to output the drive signal VOUT corresponding to the voltage Vh3 based on the logic level of corresponding one of the voltage selection signals S11-1 to S11-4. Here, in the following description, the voltage selection signals S11-1 to S11-4 may be collectively referred to as voltage selection signals S11 [S11-1, S11-2, S11-3, S11-4] in some cases.

When the voltage selection signals S11 [S11-1, S11-2, S11-3, S11-4]=[H, L, L, L] are input to the output switching circuit 252*a*-1 in the modified example of the second embodiment configured as described above, the transfer gate tg1-1 is controlled to make the input terminal and the output terminal conductive, and the transfer gates tg1-2 to tg1-4 are controlled to make the input terminal and the output terminal non-conductive. On this occasion, the voltage value of the drive signal VOUT output by the output switching circuit 252*a*-1 increases or decreases toward the voltage Vh3 in a time according to a time constant defined by a resistance value of an on-resistance of the transfer gate tg1-1 and a capacitance component of the piezoelectric element 60 provided to the ejection unit 600 corresponding thereto.

When the voltage selection signals S11 [S11-1, S11-2, S11-3, S11-4]=[H, H, L, L] are input to the output switching circuit 252*a*-1 in the modified example of the second embodiment, the transfer gates tg1-1, tg1-2 are controlled to make the input terminal and the output terminal conductive, and the transfer gates tg1-3 to tg1-4 are controlled to make the input terminal and the output terminal non-conductive. On this occasion, the voltage value of the drive signal VOUT output by the output switching circuit 252*a*-1 increases or decreases toward the voltage Vh3 in a time according to a time constant defined by a composite resistance value of the resistance value of the on-resistance of the transfer gate tg1-1 and a resistance value of an on-resistance of the transfer gate tg1-2, and the capacitance component of the piezoelectric element 60 provided to the ejection unit 600 corresponding thereto.

When the voltage selection signals S11 [S11-1, S11-2, S11-3, S11-4]=[H, H, H, L] are input to the output switching circuit 252*a*-1 in the modified example of the second embodiment, the transfer gates tg1-1 to tg1-3 are controlled to make the input terminal and the output terminal conductive, and the transfer gate tg1-4 is controlled to make the input terminal and the output terminal non-conductive. On this occasion, the voltage value of the drive signal VOUT output by the output switching circuit 252*a*-1 increases or decreases toward the voltage Vh3 in a time according to a time constant defined by a composite resistance value of the resistance value of the on-resistance of the transfer gate tg1-1, the resistance value of the on-resistance of the transfer gate tg1-2, and a resistance value of an on-resistance of the transfer gate tg1-3, and the capacitance component of the piezoelectric element 60 provided to the ejection unit 600 corresponding thereto.

When the voltage selection signals S11 [S11-1, S11-2, S11-3, S11-4]=[H, H, H, H] are input to the output switching circuit 252*a*-1 in the modified example of the second embodiment, the transfer gates tg1-1 to tg1-4 are controlled to make the input terminal and the output terminal conductive. On this occasion, the voltage value of the drive signal VOUT output by the output switching circuit 252*a*-1 increases or decreases toward the voltage Vh3 in a time according to a time constant defined by a composite resistance value of the resistance value of the on-resistance of the transfer gate tg1-1, the resistance value of the on-resistance of the transfer gate tg1-2, the resistance value of the on-resistance of the transfer gate tg1-3, and a resistance value of an on-resistance of the transfer gate tg1-4, and the capacitance component of the piezoelectric element 60 provided to the ejection unit 600 corresponding thereto.

That is, the output switching circuit 252*a*-1 in the modified example of the second embodiment controls the period of time during which the voltage value of the drive signal VOUT output by the output switching circuit 252*a*-1 changes toward the voltage Vh3, in accordance with the logic levels of the voltage selection signals S11 [S11-1, S11-2, S11-3, S11-4] input thereto.

As described above, the output switching circuit 252*a*-1 in the modified example of the second embodiment includes the transfer gate tg1-1 one end of which is supplied with the drive voltage signal VHV3, and the other end of which is electrically coupled to the ejection unit 600, the transfer gate tg1-2 one end of which is supplied with the drive voltage signal VHV3, and the other end of which is electrically coupled to the ejection unit 600, the transfer gate tg1-3 one end of which is supplied with the drive voltage signal VHV3, and the other end of which is electrically coupled to the ejection unit 600, and the transfer gate tg1-4 one end of which is supplied with the drive voltage signal VHV3, and the other end of which is electrically coupled to the ejection unit 600. Further, by the waveform selection control circuit 210 outputting the voltage selection signal S11-1, the voltage selection signal S11-2, the voltage selection signal S11-3, and the voltage selection signal S11-4 based on the print data signal SI, the conduction state between the one end and the other end of the transfer gate tg1-1 is controlled by the voltage selection signal S11-1, the conduction state between the one end and the other end of the transfer gate tg1-2 is controlled by the voltage selection signal S11-2, the conduction state between the one end and the other end of the transfer gate tg1-3 is controlled by the voltage selection signal S11-3, and the conduction state between the one end and the other end of the transfer gate tg1-4 is controlled by the voltage selection signal S11-4.

Here, the output switching circuits 252*a*-2 to 252*a*-7 in the modified example of the second embodiment only differ in the signal input thereto and the signal output therefrom, and are substantially the same in configuration as the output switching circuit 252*a*-1 in the modified example of the second embodiment. Therefore, an illustration of the configuration of the output switching circuits 252*a*-2 to 252*a*-7 in the modified example of the second embodiment is omitted, and the description thereof will be simplified.

The voltage selection signals S12-1 to S12-4 as the voltage selection signal S12 and the drive voltage signal VHV2 are input to the output switching circuit 252*a*-2 in the modified example of the second embodiment. Further, the output switching circuit 252*a*-2 in the modified example of the second embodiment includes a transfer gate tg2-1, a transfer gate tg2-2, a transfer gate tg2-3, and a transfer gate tg2-4 which are coupled in parallel to each other between a wiring pattern to which the drive voltage signal VHV2 is supplied and the wiring pattern from which the drive signal VOUT is output. Further, each of the transfer gates tg2-1 to tg2-4 provided to the output switching circuit 252*a*-2 in the modified example of the second embodiment switches whether to output the drive signal VOUT corresponding to the voltage Vh2 based on the logic level of corresponding one of the voltage selection signals S12-1 to S12-4. Here, in the following description, the voltage selection signals $12-1 to $12-4 may be collectively referred to as voltage selection signals S12 [S12-1, S12-2, S12-3, S12-4] in some cases.

The output t 252*a*-2 in the modified example of the second embodiment configured as described above controls the time period during which the voltage value of the drive signal VOUT output by the output switching circuit 252*a*-2 changes toward the voltage Vh2 by controlling the conduction states of the respective transfer gates tg2-1 to tg2-4 in accordance with the logic levels of the voltage selection signals S12 [S12-1, S12-2, S12-3, S12-4] input thereto similarly to the output switching circuit 252*a*-1 in the modified example of the second embodiment.

That is, the output switching circuit 252*a*-2 in the modified example of the second embodiment includes the transfer gate tg2-1 one end of which is supplied with the drive voltage signal VHV2, and the other end of which is electrically coupled to the ejection unit 600, the transfer gate tg2-2 one end of which is supplied with the drive voltage signal VHV2, and the other end of which is electrically coupled to the ejection unit 600, the transfer gate tg2-3 one end of which is supplied with the drive voltage signal VHV2, and the other end of which is electrically coupled to the ejection unit 600, and the transfer gate tg2-4 one end of which is supplied with the drive voltage signal VHV2, and the other end of which is electrically coupled to the ejection unit 600. Further, by the waveform selection control circuit 210 outputting the voltage selection signal S12-1, the voltage selection signal S12-2, the voltage selection signal S12-3, and the voltage selection signal S12-4 based on the print data signal SI, the conduction state between the one end and the other end of the transfer gate tg2-1 is controlled by the voltage selection signal S12-1, the conduction state between the one end and the other end of the transfer gate tg2-2 is controlled by the voltage selection signal S12-2, the conduction state between the one end and the other end of the transfer gate tg2-3 is controlled by the voltage selection signal S12-3, and the conduction state between the one end and the other end of the transfer gate tg2-4 is controlled by the voltage selection signal S12-4.

Similarly, the voltage selection signals S13-1 to S13-4 as the voltage selection signal S13 and the drive voltage signal VHV1 are input to the output switching circuit 252*a*-3 in the modified example of the second embodiment. Further, the output switching circuit 252*a*-3 in the modified example of the second embodiment includes a transfer gate tg3-1, a transfer gate tg3-2, a transfer gate tg3-3, and a transfer gate tg3-4 which are coupled in parallel to each other between a wiring pattern to which the drive voltage signal VHV1 is supplied and the wiring pattern from which the drive signal VOUT is output. Further, each of the transfer gates tg3-1 to tg3-4 provided to the output switching circuit 252*a*-3 in the modified example of the second embodiment switches whether to output the drive signal VOUT corresponding to the voltage Vh1 based on the logic level of corresponding one of the voltage selection signals S13-1 to S13-4. Here, in the following description, the voltage selection signals S13-1 to S13-4 may be collectively referred to as voltage selection signals S13 [S13-1, S13-2, S13-3, S13-4] in some cases.

The output switching circuit t 252*a*-3 in the modified example of the second embodiment configured as described above controls the time period during which the voltage value of the drive signal VOUT output by the output switching circuit 252*a*-3 changes toward the voltage Vh1 by controlling the conduction states of the respective transfer gates tg3-1 to tg3-4 in accordance with the logic levels of the voltage selection signals S13 [S13-1, S13-2, S13-3, S13-4] input thereto similarly to the output switching circuit 252*a*-1 in the modified example of the second embodiment.

That is, the output switching circuit 252*a*-3 in the modified example of the second embodiment includes the transfer gate tg3-1 one end of which is supplied with the drive voltage signal VHV1, and the other end of which is electrically coupled to the ejection unit 600, the transfer gate tg3-2 one end of which is supplied with the drive voltage signal VHV1, and the other end of which is electrically coupled to the ejection unit 600, the transfer gate tg3-3 one end of which is supplied with the drive voltage signal VHV1, and the other end of which is electrically coupled to the ejection unit 600, and the transfer gate tg3-4 one end of which is supplied with the drive voltage signal VHV1, and the other end of which is electrically coupled to the ejection unit 600. Further, by the waveform selection control circuit 210 outputting the voltage selection signal S13-1, the voltage selection signal S13-2, the voltage selection signal S13-3, and the voltage selection signal S13-4 based on the print data signal SI, the conduction state between the one end and the other end of the transfer gate tg3-1 is controlled by the voltage selection signal S13-1, the conduction state between the one end and the other end of the transfer gate tg3-2 is controlled by the voltage selection signal S13-2, the conduction state between the one end and the other end of the transfer gate tg3-3 is controlled by the voltage selection signal S13-3, and the conduction state between the one end and the other end of the transfer gate tg3-4 is controlled by the voltage selection signal S13-4.

Similarly, the voltage selection signals S14-1 to S14-4 as the voltage selection signal S14 and the drive voltage signal VCV are input to the output switching circuit 252*a*-4 in the modified example of the second embodiment. Further, the output switching circuit 252*a*-4 in the modified example of the second embodiment includes a transfer gate tg4-1, a transfer gate tg4-2, a transfer gate tg4-3, and a transfer gate tg4-4 which are coupled in parallel to each other between a wiring pattern to which the drive voltage signal VCV is supplied and the wiring pattern from which the drive signal VOUT is output. Further, each of the transfer gates tg4-1 to tg4-4 provided to the output switching circuit 252*a*-4 in the modified example of the second embodiment switches whether to output the drive signal VOUT corresponding to the voltage Vc based on the logic level of corresponding one of the voltage selection signals S14-1 to S14-4. Here, in the following description, the voltage selection signals S14-1 to S14-4 may be collectively referred to as voltage selection signals S14 [S14-1, S14-2, S14-3, S14-4] in some cases.

The output 252*a*-4 in the modified example of the second embodiment configured as described above controls the time period during which the voltage value of the drive signal VOUT output by the output switching circuit 252*a*-4 changes toward the voltage Vc by controlling the conduction states of the respective transfer gates tg4-1 to tg4-4 in accordance with the logic levels of the voltage selection signals S14 [S14-1, S14-2, S14-3, S14-4] input thereto similarly to the output switching circuit 252*a*-1 in the modified example of the second embodiment.

That is, the output switching circuit 252*a*-4 in the modified example of the second embodiment includes the transfer gate tg4-1 one end of which is supplied with the drive voltage signal VCV, and the other end of which is electrically coupled to the ejection unit 600, the transfer gate tg4-2 one end of which is supplied with the drive voltage signal VCV, and the other end of which is electrically coupled to the ejection unit 600, the transfer gate tg4-3 one end of which is supplied with the drive voltage signal VCV, and the other end of which is electrically coupled to the ejection unit 600, and the transfer gate tg4-4 one end of which is supplied with the drive voltage signal VCV, and the other end of which is electrically coupled to the ejection unit 600. Further, by the waveform selection control circuit 210 outputting the voltage selection signal S14-1, the voltage selection signal S14-2, the voltage selection signal S14-3, and the voltage selection signal S14-4 based on the print data signal SI, the conduction state between the one end and the other end of the transfer gate tg4-1 is controlled by the voltage selection signal S14-1, the conduction state between the one end and the other end of the transfer gate tg4-2 is controlled by the voltage selection signal S14-2, the conduction state between the one end and the other end of the transfer gate tg4-3 is controlled by the voltage selection signal S14-3, and the conduction state between the one end and the other end of the transfer gate tg4-4 is controlled by the voltage selection signal S14-4.

Similarly, the voltage selection signals S15-1 to S15-4 as the voltage selection signal S15 and the drive voltage signal VBV1 are input to the output switching circuit 252*a*-5 in the modified example of the second embodiment. Further, the output switching circuit 252*a*-5 in the modified example of the second embodiment includes a transfer gate tg5-1, a transfer gate tg5-2, a transfer gate tg5-3, and a transfer gate tg5-4 which are coupled in parallel to each other between a wiring pattern to which the drive voltage signal VBV1 is supplied and the wiring pattern from which the drive signal VOUT is output. Further, each of the transfer gates tg5-1 to tg5-4 provided to the output switching circuit 252*a*-5 in the modified example of the second embodiment switches whether to output the drive signal VOUT corresponding to the voltage Vb1 based on the logic level of corresponding one of the voltage selection signals S15-1 to S15-4. Here, in the following description, the voltage selection signals S15-1 to S15-4 may be collectively referred to as voltage selection signals S15 [S15-1, S15-2, S15-3, S15-4] in some cases.

The output switching circuit 252*a*-5 in the modified example of the second embodiment configured as described above controls the time period during which the voltage value of the drive signal VOUT output by the output switching circuit 252*a*-5 changes toward the voltage Vb1 by controlling the conduction states of the respective transfer gates tg5-1 to tg5-4 in accordance with the logic levels of the voltage selection signals S15 [S15-1, S15-2, S15-3, S15-4] input thereto similarly to the output switching circuit 252*a*-1 in the modified example of the second embodiment.

That is, the output switching circuit 252*a*-5 in the modified example of the second embodiment includes the transfer gate tg5-1 one end of which is supplied with the drive voltage signal VBV1, and the other end of which is electrically coupled to the ejection unit 600, the transfer gate tg5-2 one end of which is supplied with the drive voltage signal VBV1, and the other end of which is electrically coupled to the ejection unit 600, the transfer gate tg5-3 one end of which is supplied with the drive voltage signal VBV1, and the other end of which is electrically coupled to the ejection unit 600, and the transfer gate tg5-4 one end of which is supplied with the drive voltage signal VBV1, and the other end of which is electrically coupled to the ejection unit 600. Further, by the waveform selection control circuit 210 outputting the voltage selection signal S15-1, the voltage selection signal S15-2, the voltage selection signal S15-3, and the voltage selection signal S15-4 based on the print data signal SI, the conduction state between the one end and the other end of the transfer gate tg5-1 is controlled by the voltage selection signal S15-1, the conduction state between the one end and the other end of the transfer gate tg5-2 is signal S15-2, the controlled by the voltage selection conduction state between the one end and the other end of the transfer gate tg5-3 is controlled by the voltage selection signal S15-3, and the conduction state between the one end and the other end of the transfer gate tg5-4 is controlled by the voltage selection signal S15-4.

Similarly, the voltage selection signals S16-1 to S16-4 as the voltage selection signal S16 and the drive voltage signal VBV2 are input to the output switching circuit 252*a*-6 in the modified example of the second embodiment. Further, the output switching circuit 252*a*-6 in the modified example of the second embodiment includes a transfer gate tg6-1, a transfer gate tg6-2, a transfer gate tg6-3, and a transfer gate tg6-4 which are coupled in parallel to each other between a wiring pattern to which the drive voltage signal VBV2 is supplied and the wiring pattern from which the drive signal VOUT is output. Further, each of the transfer gates tg6-1 to tg6-4 provided to the output switching circuit 252*a*-6 in the modified example of the second embodiment switches whether to output the drive signal VOUT corresponding to the voltage Vb2 based on the logic level of corresponding one of the voltage selection signals S16-1 to S16-4. Here, in the following description, the voltage selection signals S16-1 to S16-4 may be collectively referred to as voltage selection signals S16 [S16-1, S16-2, S16-3, S16-4] in some cases.

The output switching circuit 252*a*-6 in the modified example of the second embodiment configured as described above controls the time period during which the voltage value of the drive signal VOUT output by the output switching circuit 252*a*-6 changes toward the voltage Vb2 by controlling the conduction states of the respective transfer gates tg6-1 to tg6-4 in accordance with the logic levels of the voltage selection signals S16 [S16-1, S16-2, S16-3, S16-4] input thereto similarly to the output switching circuit 252*a*-1 in the modified example of the second embodiment.

That is, the output switching circuit 252*a*-6 in the modified example of the second embodiment includes the transfer gate tg6-1 one end of which is supplied with the drive voltage signal VBV2, and the other end of which is electrically coupled to the ejection unit 600, the transfer gate tg6-2 one end of which is supplied with the drive voltage signal VBV2, and the other end of which is electrically coupled to the ejection unit 600, the transfer gate tg6-3 one end of which is supplied with the drive voltage signal VBV2, and the other end of which is electrically coupled to the ejection unit 600, and the transfer gate tg6-4 one end of which is supplied with the drive voltage signal VBV2, and the other end of which is electrically coupled to the ejection unit 600. Further, by the waveform selection control circuit 210 outputting the voltage selection signal S16-1, the voltage selection signal S16-2, the voltage selection signal S16-3, and the voltage selection signal S16-4 based on the print data signal SI, the conduction state between the one end and the other end of the transfer gate tg6-1 is controlled by the voltage selection signal S16-1, the conduction state between the one end and the other end of the transfer gate tg6-2 is controlled by the voltage selection signal S16-2, the conduction state between the one end and the other end of the transfer gate tg6-3 is controlled by the voltage selection signal S16-3, and the conduction state between the one end and the other end of the transfer gate tg6-4 is controlled by the voltage selection signal S16-4.

Similarly, the voltage selection signals S17-1 to S17-4 as the voltage selection signal S17 and the drive voltage signal VBV3 are input to the output switching circuit 252*a*-7 in the modified example of the second embodiment. Further, the output switching circuit 252*a*-7 in the modified example of the second embodiment includes a transfer gate tg7-1, a transfer gate tg7-2, a transfer gate tg7-3, and a transfer gate tg7-4 which are coupled in parallel to each other between a wiring pattern to which the drive voltage signal VBV3 is supplied and the wiring pattern from which the drive signal VOUT is output. Further, each of the transfer gates tg7-1 to tg7-4 provided to the output switching circuit 252*a*-7 in the modified example of the second embodiment switches whether to output the drive signal VOUT corresponding to the voltage Vb3 based on the logic level of corresponding one of the voltage selection signals S17-1 to S17-4. Here, in the following description, the voltage selection signals S17-1 to S17-4 may be collectively referred to as voltage selection signals S17 [S17-1, S17-2, S17-3, S17-4] in some cases.

The output switching circuit 252*a*-7 in the modified example of the second embodiment configured as described above controls the time period during which the voltage value of the drive signal VOUT output by the output switching circuit 252*a*-7 changes toward the voltage Vb3 by controlling the conduction states of the respective transfer gates tg7-1 to tg7-4 in accordance with the logic levels of the voltage selection signals S17 [S17-1, S17-2, S17-3, S17-4] input thereto similarly to the output switching circuit 252*a*-1 in the modified example of the second embodiment.

That is, the output switching circuit 252*a*-7 in the modified example of the second embodiment includes the transfer gate tg7-1 one end of which is supplied with the drive voltage signal VBV3, and the other end of which is electrically coupled to the ejection unit 600, the transfer gate tg7-2 one end of which is supplied with the drive voltage signal VBV3, and the other end of which is electrically coupled to the ejection unit 600, the transfer gate tg7-3 one end of which is supplied with the drive voltage signal VBV3, and the other end of which i electrically coupled to the ejection unit 600, and the transfer gate tg7-4 one end of which is supplied with the drive voltage signal VBV3, and the other end of which is electrically coupled to the ejection unit 600. Further, by the waveform selection control circuit 210 outputting the voltage selection signal S17-1, the voltage selection signal S17-2, the voltage selection signal S17-3, and the voltage selection signal S17-4 based on the print data signal SI, the conduction state between the one end and the other end of the transfer gate tg7-1 is controlled by the voltage selection signal S17-1, the conduction state between the one end and the other end of the transfer gate tg7-2 is controlled by the voltage selection signal S17-2, the conduction state between the one end and the other end of the transfer gate tg7-3 is controlled by the voltage selection signal S17-3, and the conduction state between the one end and the other end of the transfer gate tg7-4 is controlled by the voltage selection signal S17-4.

In the liquid ejection apparatus 1 in the modified example of the second embodiment configured as described above, it is possible to control the gradient of the signal waveform of the drive signal VOUT by controlling the time period required for the change in the voltage value of the drive signal VOUT output by each of the output switching circuits 252*a*-1 to 252*a*-7 provided to the output circuit 250. Therefore, in addition to the functions and advantages of the liquid ejection apparatus 1 according to the second embodiment described above, the drive signal output circuit 200 can output the optimum waveform of the drive signal VOUT corresponding to the use environment of the liquid ejection apparatus 1 and the physical properties of the ink to be used, and thus, it is possible to enhance the versatility of the liquid ejection apparatus 1.

Here, the drive voltage signal VCV is an example of a first DC voltage signal, the voltage Vc is an example of a first voltage value, any of the drive voltage signals VBV1, VBV2, and VBV3 is an example of a second DC voltage signal, any of the voltages Vb1, Vb2, and Vb3 corresponding thereto is an example of a second voltage value, any of the drive voltage signals VHV1, VHV2, and VHV3 is an example of a third DC voltage signal, any of the voltage Vh1, Vh2, and Vh3 corresponding thereto is an example of a third voltage value. Further, the print data signal SI is an example of an ejection control signal. Further, the output switching circuit 252*a*-4 provided to the output circuit 250 is an example of a first switch circuit, the transfer gate tg4-1 is an example of a first switch element, the transfer gate tg4-2 is an example of a second switch element, the voltage selection signal S14-1 is an example of a first switch control signal, and the voltage selection signal S14-2 is an example of a second switch control signal. Further, any one of the output switching circuits 252*a*-5, 252*a*-6, and 252*a*-7 is an example of a second switch circuit, corresponding one of the transfer gates tg5-1, tg6-1, and tg7-1 is an example of a third switch element, corresponding one of the transfer gates tg5-2, tg6-2, and tg7-2 is an example of a fourth switch element, corresponding one of the voltage selection signals S15-1, S16-1, and S17-1 is an example of a third switch control signal, and corresponding one of the voltage selection signals S15-2, S16-2, and S17-2 is an example of a fourth switch control signal. Further, any one of the output switching circuits 252*a*-1, 252*a*-2, and 252*a*-3 is an example of a third switch circuit, corresponding one of the transfer gates tg1-1, tg2-1, and tg3-1 is an example of a fifth switch element, corresponding one of the transfer gates tg1-2, tg2-2, and tg3-2 is an example of a sixth switch element, corresponding one of the voltage selection signals S11-1, S12-1, and S13-1 is an example of a fifth switch control signal, and corresponding one of the voltage selection signals S11-2, S12-2, and S13-2 is an example of a sixth switch control signal. Further, the drive waveform DEP is an example of an ejection waveform, the drive waveform BSD is an example of a microvibration waveform, and the drive waveform NVT is an example of an inspection waveform.

Although the embodiments and the modified examples are described hereinabove, the present disclosure is not limited to the embodiment and can be implemented in various aspects without departing from the gist thereof. For example, the embodiments described above can appropriately be combined.

The present disclosure includes substantially the same configurations (e.g., configurations having the same functions, methods, and results, and configurations having the same purposes and advantages) as the configurations described in the embodiments. Further, the present disclosure includes configurations obtained by replacing non-essential portions of the configurations described in the embodiments. Furthermore, the present disclosure includes configurations that exert the same functions and advantages or configurations that can achieve the same objects as those of the configurations described in the embodiments. Further, the present disclosure includes configurations obtained by adding a known technique to the configurations described in the embodiments.

The following configurations are derived from the embodiments described above.

One aspect of the head unit includes an ejection unit which includes a piezoelectric element driven by a drive signal, and which is configured to eject a liquid due to drive of the piezoelectric element, and a drive signal output circuit to which a first DC voltage signal having a first voltage value, a second DC voltage signal having a second voltage value, and an ejection control signal are input, and which is configured to output the drive signal, wherein the drive signal output circuit includes a first switch circuit configured to switch whether to supply the first DC voltage signal to the ejection unit, a second switch circuit configured to switch whether to supply the second DC voltage signal to the ejection unit, and a selection control circuit configured to control the first switch circuit and the second switch circuit based on the ejection control signal, and the first switch circuit includes a first switch element one end of which is supplied with the first DC voltage signal, and another end of which is electrically coupled to the ejection unit, and a second switch element one end of which is supplied with the first DC voltage signal, and another end of which is electrically coupled to the ejection unit.

According to this head unit, it is not necessary to use an amplifier circuit in the generation of the first drive signal, and therefore, it is possible to reduce a power loss that may occur in the amplifier circuit.

In one aspect of the head unit described above, the selection control circuit may be configured to output a first switch control signal and a second switch control signal based on the ejection control signal, a conduction state between the one end and the other end of the first switch element may be controlled by the first switch control signal, and a conduction state between the one end and the other end of the second switch element may be controlled by the second switch control signal.

According to this head unit, since the conduction states of the first switch element and the second switch element can be set as desired, it is possible to set the gradient of the signal waveform of the first drive signal as desired. As a result, the number of types of the signal waveform of the first drive signal to be output increases, and the versatility of the head unit is enhanced.

In one aspect of the head unit described above, the second switch circuit may include a third switch element one end of which is supplied with the second DC voltage signal, and another end of which is electrically coupled to the ejection unit, and a fourth switch element one end of which is supplied with the second DC voltage signal, and another end of which is electrically coupled to the ejection unit, the selection control circuit may be configured to output a third switch control signal and a fourth switch control signal based on the ejection control signal, a conduction state between the one end and the other end of the third switch element may be controlled by the third switch control signal, and a conduction state between the one end and the other end of the fourth switch element may be controlled by the fourth switch control signal.

According to this head unit, since the third switch element and the fourth switch element are provided, and the conduction states of the third switch element and the fourth switch element can be set as desired, it is possible to set the gradient of the signal waveform of the first drive signal as desired. As a result, the number of the types of the signal waveform of the first drive signal to be output is increased, and the versatility of the head unit is further enhanced.

In one aspect of the head unit described above, a third DC voltage signal having a third voltage value may further be input to the drive signal output circuit, the drive signal output circuit may include a third switch circuit configured to switch whether to supply the third DC voltage signal to the ejection unit, and the third switch circuit may include a fifth switch element one end of which is supplied with the third DC voltage signal, and another end of which is electrically coupled to the ejection unit, and a sixth switch element one end of which is supplied with the third DC voltage signal, and another end of which is electrically coupled to the ejection unit.

According to this head unit, by generating the first drive signal using the third DC voltage signal having the third voltage value, the number of the types of the signal waveform of the first drive signal to be output is increased, and the versatility of the head unit is further enhanced.

In one aspect of the head unit described above, the selection control circuit may be configured to output a fifth switch control signal and a sixth switch control signal based on the ejection control signal, a conduction state between the one end and the other end of the fifth switch element may be controlled by the fifth switch control signal, and a conduction state between the one end and the other end of the sixth switch element may be controlled by the sixth switch control signal.

According to this head unit, since the conduction states of the fifth switch element and the sixth switch element can be set as desired, it is possible to set the gradient of the signal waveform of the first drive signal as desired. As a result, the number of the types of the signal waveform of the first drive signal to be output is increased, and the versatility of the head unit is further enhanced.

In one aspect of the head unit described above, the drive signal output circuit may be configured to output the drive signal including an ejection waveform which drives the piezoelectric element so that the liquid is ejected from the ejection unit.

In one aspect of the head unit described above, the drive signal output circuit may be configured to output the drive signal including a microvibration waveform which drives the piezoelectric element so that the liquid is not ejected from the ejection unit.

In one aspect of the head unit described above, the drive signal output circuit may be configured to output the drive signal including an inspection waveform for inspecting a state of the ejection unit.

In one aspect of the head unit described above, the first voltage value and the second voltage value may be changeable.

One aspect of the liquid ejection apparatus includes an ejection unit which includes a piezoelectric element driven by a drive signal, and which is configured to eject a liquid due to drive of the piezoelectric element, a drive signal output circuit to which a first DC voltage signal having a first voltage value, a second DC voltage signal having a second voltage value, and an ejection control signal are input, and which is configured to output the drive signal, and a control circuit configured to output the ejection control signal, wherein the drive signal output circuit includes a first switch circuit configured to switch whether to supply the first DC voltage signal to the ejection unit, a second switch circuit configured to switch whether to supply the second DC voltage signal to the ejection unit, and a selection control circuit configured to control the first switch circuit and the second switch circuit based on the ejection control signal, and the first switch circuit includes a first switch element one end of which is supplied with the first DC voltage signal, and another end of which is electrically coupled to the ejection unit, and a second switch element one end of which is supplied with the first DC voltage signal, and another end of which is electrically coupled to the ejection unit.

According to this liquid ejection apparatus, it is not necessary to use an amplifier circuit in the generation of the first drive signal, and therefore, it is possible to reduce a power loss that may occur in the amplifier circuit.

In one aspect of the liquid ejection apparatus described above, the selection control circuit may be configured to output a first switch control signal and a second switch control signal based on the ejection control signal, a conduction state between the one end and the other end of the first switch element may be controlled by the first switch control signal, and a conduction state between the one end and the other end of the second switch element may be controlled by the second switch control signal.

According to this liquid ejection apparatus, since the conduction states of the first switch element and the second switch element can be set as desired, it is possible to set the gradient of the signal waveform of the first drive signal as desired. As a result, the number of types of the signal waveform of the first drive signal to be output increases, and the versatility of the head unit is enhanced.

In one aspect of the liquid ejection apparatus described above, the second switch circuit may include a third switch element one end of which is supplied with the second DC voltage signal, and another end of which is electrically coupled to the ejection unit, and a fourth switch element one end of which is supplied with the second DC voltage signal, and another end of which is electrically coupled to the ejection unit, the selection control circuit may be configured to output a third switch control signal and a fourth switch control signal based on the ejection control signal, a conduction state between the one end and the other end of the third switch element may be controlled by the third switch control signal, and a conduction state between the one end and the other end of the fourth switch element may be controlled by the fourth switch control signal.

According to this liquid ejection apparatus, since the third switch element and the fourth switch element are provided, and the conduction states of the third switch element and the fourth switch element can be set as desired, it is possible to set the gradient of the signal waveform of the first drive signal as desired. As a result, the number of the types of the signal waveform of the first drive signal to be output is increased, and the versatility of the head unit is further enhanced.

In one aspect of the liquid ejection apparatus described above, a third DC voltage signal having a third voltage value may further be input to the drive signal output circuit, the drive signal output circuit may include a third switch circuit configured to switch whether to supply the third DC voltage signal to the ejection unit, and the third switch circuit may include a fifth switch element one end of which is supplied with the third DC voltage signal, and another end of which is electrically coupled to the ejection unit, and a sixth switch element one end of which is supplied with the third DC voltage signal, and another end of which is electrically coupled to the ejection unit.

According to this liquid ejection apparatus, by generating the first drive signal using the third DC voltage signal having the third voltage value, the number of the types of the signal waveform of the first drive signal to be output is increased, and the versatility of the head unit is further enhanced.

In one aspect of the liquid ejection apparatus described above, the selection control circuit may be configured to output a fifth switch control signal and a sixth switch control signal based on the ejection control signal, a conduction state between the one end and the other end of the fifth switch element may be controlled by the fifth switch control signal, and a conduction state between the one end and the other end of the sixth switch element may be controlled by the sixth switch control signal.

According to this liquid ejection apparatus, since the conduction states of the fifth switch element and the sixth switch element can be set as desired, it is possible to set the gradient of the signal waveform of the first drive signal as desired. As a result, the number of the types of the signal waveform of the first drive signal to be output is increased, and the versatility of the head unit is further enhanced.

In one aspect of the liquid ejection apparatus described above, the drive signal output circuit may be configured to output the drive signal including an ejection waveform which drives the piezoelectric element so that the liquid is ejected from the ejection unit.

In one aspect of the liquid ejection apparatus described above, the drive signal output circuit may be configured to output the drive signal including a microvibration waveform which drives the piezoelectric element so that the liquid is not ejected from the ejection unit.

In one aspect of the liquid ejection apparatus described above, the drive signal output circuit may be configured to output the drive signal including an inspection waveform for inspecting a state of the ejection unit.

In one aspect of the liquid ejection apparatus described above, the first voltage value and the second voltage value may be changeable.

What is claimed is:

1. A head unit comprising:

an ejection unit which includes a piezoelectric element driven by a drive signal, and which is configured to eject a liquid due to drive of the piezoelectric element; and a drive signal output circuit to which a first DC voltage signal having a first voltage value, a second DC voltage signal having a second voltage value, and an ejection control signal are input, and which is configured to output the drive signal, wherein the drive signal output circuit includes a first switch circuit configured to switch whether to supply the first DC voltage signal to the ejection unit, a second switch circuit configured to switch whether to supply the second DC voltage signal to the ejection unit, and a selection control circuit configured to control the first switch circuit and the second switch circuit based on the ejection control signal, and the first switch circuit includes a first switch element one end of which is supplied with the first DC voltage signal, and another end of which is electrically coupled to the ejection unit, and a second switch element one end of which is supplied with the first DC voltage signal, and another end of which is electrically coupled to the ejection unit.

2. The head unit according to claim 1, wherein the selection control circuit is configured to output a first switch control signal and a second switch control signal based on the ejection control signal, a conduction state between the one end and the other end of the first switch element is controlled by the first switch control signal, and a conduction state between the one end and the other end of the second switch element is controlled by the second switch control signal.

3. The head unit according to claim 2, wherein the second switch circuit includes a third switch element one end of which is supplied with the second DC voltage signal, and another end of which is electrically coupled to the ejection unit, and a fourth switch element one end of which is supplied with the second DC voltage signal, and another end of which is electrically coupled to the ejection unit, the selection control circuit is configured to output a third switch control signal and a fourth switch control signal based on the ejection control signal, a conduction state between the one end and the other end of the third switch element is controlled by the third switch control signal, and a conduction state between the one end and the other end of the fourth switch element is controlled by the fourth switch control signal.

4. The head unit according to claim 3, wherein a third DC voltage signal having a third voltage value is further input to the drive signal output circuit, the drive signal output circuit includes a third switch circuit configured to switch whether to supply the third DC voltage signal to the ejection unit, and the third switch circuit includes a fifth switch element one end of which is supplied with the third DC voltage signal, and another end of which is electrically coupled to the ejection unit, and a sixth switch element one end of which is supplied with the third DC voltage signal, and another end of which is electrically coupled to the ejection unit.

5. The head unit according to claim 1, wherein the selection control circuit is configured to output a fifth switch control signal and a sixth switch control signal based on the ejection control signal, a conduction state between the one end and the other end of the fifth switch element is controlled by the fifth switch control signal, and a conduction state between the one end and the other end of the sixth switch element is controlled by the sixth switch control signal.

6. The head unit according to claim 1, wherein the drive signal output circuit is configured to output the drive signal including an ejection waveform which drives the piezoelectric element so that the liquid is ejected from the ejection unit.

7. The head unit according to claim 1, wherein the drive signal output circuit is configured to output the drive signal including a microvibration waveform which drives the piezoelectric element so that the liquid is not ejected from the ejection unit.

8. The head unit according to claim 1, wherein the drive signal output circuit is configured to output the drive signal including an inspection waveform for inspecting a state of the ejection unit.

9. The head unit according to claim 1, wherein the first voltage value and the second voltage value are changeable.

10. A liquid ejection apparatus comprising:

an ejection unit which includes a piezoelectric element driven by a drive signal, and which is configured to eject a liquid due to drive of the piezoelectric element;

a drive signal output circuit to which a first DC voltage signal having a first voltage value, a second DC voltage signal having a second voltage value, and an ejection control signal are input, and which is configured to output the drive signal; and a control circuit configured to output the ejection control signal, wherein the drive signal output circuit includes a first switch circuit configured to switch whether to supply the first DC voltage signal to the ejection unit, a second switch circuit configured to switch whether to supply the second DC voltage signal to the ejection unit, and a selection control circuit configured to control the first switch circuit and the second switch circuit based on the ejection control signal, and the first switch circuit includes a first switch element one end of which is supplied with the first DC voltage signal, and another end of which is electrically coupled to the ejection unit, and a second switch element one end of which is supplied with the first DC voltage signal, and another end of which is electrically coupled to the ejection unit.

11. The liquid ejection apparatus according to claim 10, wherein the selection control circuit is configured to output a first switch control signal and a second switch control signal based on the ejection control signal, a conduction state between the one end and the other end of the first switch element is controlled by the first switch control signal, and a conduction state between the one end and the other end of the second switch element is controlled by the second switch control signal.

12. The liquid ejection apparatus according to claim 11, wherein the second switch circuit includes a third switch element one end of which is supplied with the second DC voltage signal, and another end of which is electrically coupled to the ejection unit, and a fourth switch element one end of which is supplied with the second DC voltage signal, and another end of which is electrically coupled to the ejection unit, the selection control circuit is configured to output a third switch control signal and a fourth switch control signal based on the ejection control signal, a conduction state between the one end and the other end of the third switch element is controlled by the third switch control signal, and a conduction state between the one end and the other end of the fourth switch element is controlled by the fourth switch control signal.

13. The liquid ejection apparatus according to claim 12, wherein a third DC voltage signal having a third voltage value is further input to the drive signal output circuit, the drive signal output circuit includes a third switch circuit configured to switch whether to supply the third DC voltage signal to the ejection unit, and the third switch circuit includes a fifth switch element one end of which is supplied with the third DC voltage signal, and another end of which is electrically coupled to the ejection unit, and a sixth switch element one end of which is supplied with the third DC voltage signal, and another end of which is electrically coupled to the ejection unit.

14. The liquid ejection apparatus according to claim 13, wherein the selection control circuit is configured to output a fifth switch control signal and a sixth switch control signal based on the ejection control signal, a conduction state between the one end and the other end of the fifth switch element is controlled by the fifth switch control signal, and a conduction state between the one end and the other end of the sixth switch element is controlled by the sixth switch control signal.

15. The liquid ejection apparatus according to claim 10, wherein the drive signal output circuit is configured to output the drive signal including an ejection waveform which drives the piezoelectric element so that the liquid is ejected from the ejection unit.

16. The liquid ejection apparatus according to claim 10, wherein the drive signal output circuit is configured to output the drive signal including a microvibration waveform which drives the piezoelectric element so that the liquid is not ejected from the ejection unit.

17. The liquid ejection apparatus according to claim 10, wherein the drive signal output circuit is configured to output the drive signal including an inspection waveform for inspecting a state of the ejection unit.

18. The liquid ejection apparatus according to claim 10, wherein the first voltage value and the second voltage value are changeable.

* * * * *